(12) United States Patent
Klassen

(10) Patent No.: US 10,145,424 B2
(45) Date of Patent: *Dec. 4, 2018

(54) WAVE ACTUATOR

(71) Applicant: Genesis Advanced Technology Holdings Inc., Langley (CA)

(72) Inventor: James Brent Klassen, Langley (CA)

(73) Assignee: Genesis Advanced Technology Holdings Inc., Langley (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/598,149

(22) Filed: May 17, 2017

(65) Prior Publication Data

US 2017/0254367 A1 Sep. 7, 2017

Related U.S. Application Data

(63) Continuation of application No. 15/130,922, filed on Apr. 15, 2016, now Pat. No. 9,683,612.

(60) Provisional application No. 62/148,175, filed on Apr. 15, 2015, provisional application No. 62/149,594, filed on Apr. 18, 2015, provisional application No. 62/151,284, filed on Apr. 22, 2015.

(51) Int. Cl.
| | | |
|---|---|---|
| *H02N 2/10* | (2006.01) | |
| *F16D 11/14* | (2006.01) | |
| *F16D 13/22* | (2006.01) | |
| *F16D 13/64* | (2006.01) | |
| *F16D 27/00* | (2006.01) | |
| *F16D 11/00* | (2006.01) | |

(52) U.S. Cl.
CPC .............. *F16D 11/14* (2013.01); *F16D 13/22* (2013.01); *F16D 13/64* (2013.01); *F16D 27/004* (2013.01); *H02N 2/10* (2013.01); *F16D 2011/008* (2013.01); *F16D 2500/1022* (2013.01)

(58) Field of Classification Search
CPC .. H02N 2/10; H02N 2/12; H02N 2/16; H02N 2/163; H02N 2/166; H01L 41/08
USPC ....................................... 310/323.01–323.21
See application file for complete search history.

(56) References Cited

U.S. PATENT DOCUMENTS

| | | | |
|---|---|---|---|
| 3,389,274 A | 6/1968 | Robertson | |
| 3,964,316 A | 6/1976 | Abe | |
| 5,034,606 A | 7/1991 | Shirasaki | |
| 5,148,068 A | 9/1992 | Kushida et al. | |
| 5,264,755 A * | 11/1993 | Hettlage | H02K 7/065 310/323.21 |
| 5,726,519 A | 3/1998 | Gonnard et al. | |

(Continued)

FOREIGN PATENT DOCUMENTS

| | | |
|---|---|---|
| CA | 2 813 000 A1 | 4/2012 |
| CA | 2 877 403 A1 | 12/2013 |

(Continued)

OTHER PUBLICATIONS

Uchino, K., "Piezoelectric ultrasonic motors: overview", Smart Mater. Struct. 7 (1998), 13 pgs.

(Continued)

*Primary Examiner* — Derek Rosenau
(74) *Attorney, Agent, or Firm* — Seed Intellectual Property Law Group LLP

(57) ABSTRACT

A two dimensional structure such as a disk or belt is shaped or distorted to form a buckling wave. At least one contact touches the wave, with two contacts squeezing the wave between them providing a firmer connection. The wave is propagated along the structure by any of a variety of means including magnets or piezo actuators. This movement of the wave moves the contacts relative to the two dimensional structure, providing a high leverage ratio.

18 Claims, 57 Drawing Sheets

(56) References Cited

U.S. PATENT DOCUMENTS

| | | |
|---|---|---|
| 5,834,878 A | 11/1998 | Nakanishi |
| 6,155,220 A | 12/2000 | Marriott |
| 6,437,485 B1 | 8/2002 | Johansson |
| 6,664,771 B2 | 12/2003 | Baudendistel |
| 7,161,278 B2 | 1/2007 | Johansson |
| 7,247,116 B2 | 7/2007 | Stoianovici et al. |
| 7,999,422 B2 | 8/2011 | Dorel |
| 2008/0193307 A1 | 8/2008 | Elata et al. |
| 2010/0084946 A1* | 4/2010 | Park ................ G02B 7/08 310/323.03 |
| 2011/0221305 A1 | 9/2011 | Moon et al. |
| 2013/0220074 A1 | 8/2013 | Benjamin et al. |

FOREIGN PATENT DOCUMENTS

| | | |
|---|---|---|
| EP | 0 569 673 A1 | 11/1993 |
| EP | 2 460 198 B1 | 4/2016 |
| JP | 61-16059 A | 1/1986 |
| JP | 2000-262077 | 9/2000 |
| WO | 2010/000302 A1 | 1/2010 |
| WO | 2011/012532 A1 | 2/2011 |
| WO | 2015/168787 A1 | 11/2015 |
| WO | 2015/168793 A2 | 11/2015 |

OTHER PUBLICATIONS

Thurston, W. P., "Hyperbolic Structures on 3-Manifolds, I: Deformation of Acylindrical Manifolds", arXiv:math/9801019v1 [math.GT] Jan. 6, 1998, 26 pgs.

Zhu, Hai-Lin, et al. "Minimal Tooth Number of Flexspline in Harmonic Gear Drive with External Wave Generator", Gear Technology, Oct. 2013, [www.geartechnology.com], 5 pgs.

International Search Report and Written Opinion of the International Searching Authority, dated Jun. 23, 2016, for corresponding International Application No. PCT/CA2016/050445, 10 pages.

* cited by examiner

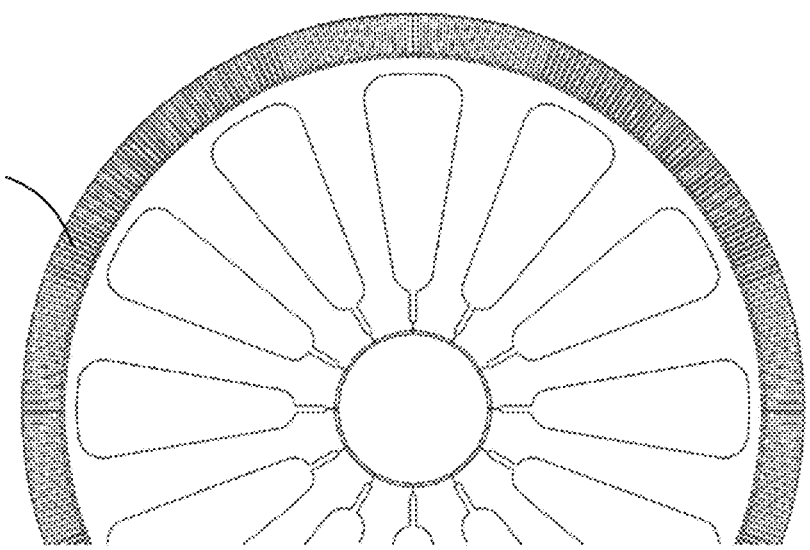
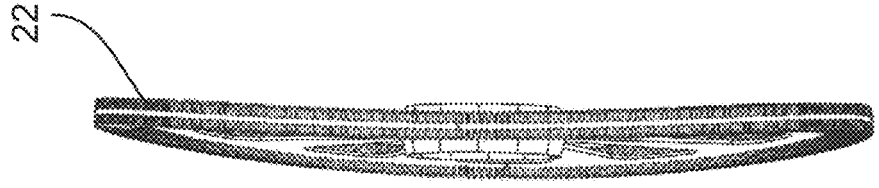
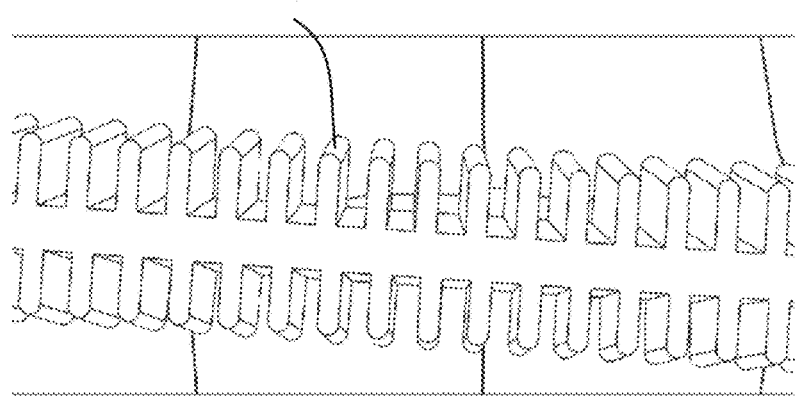

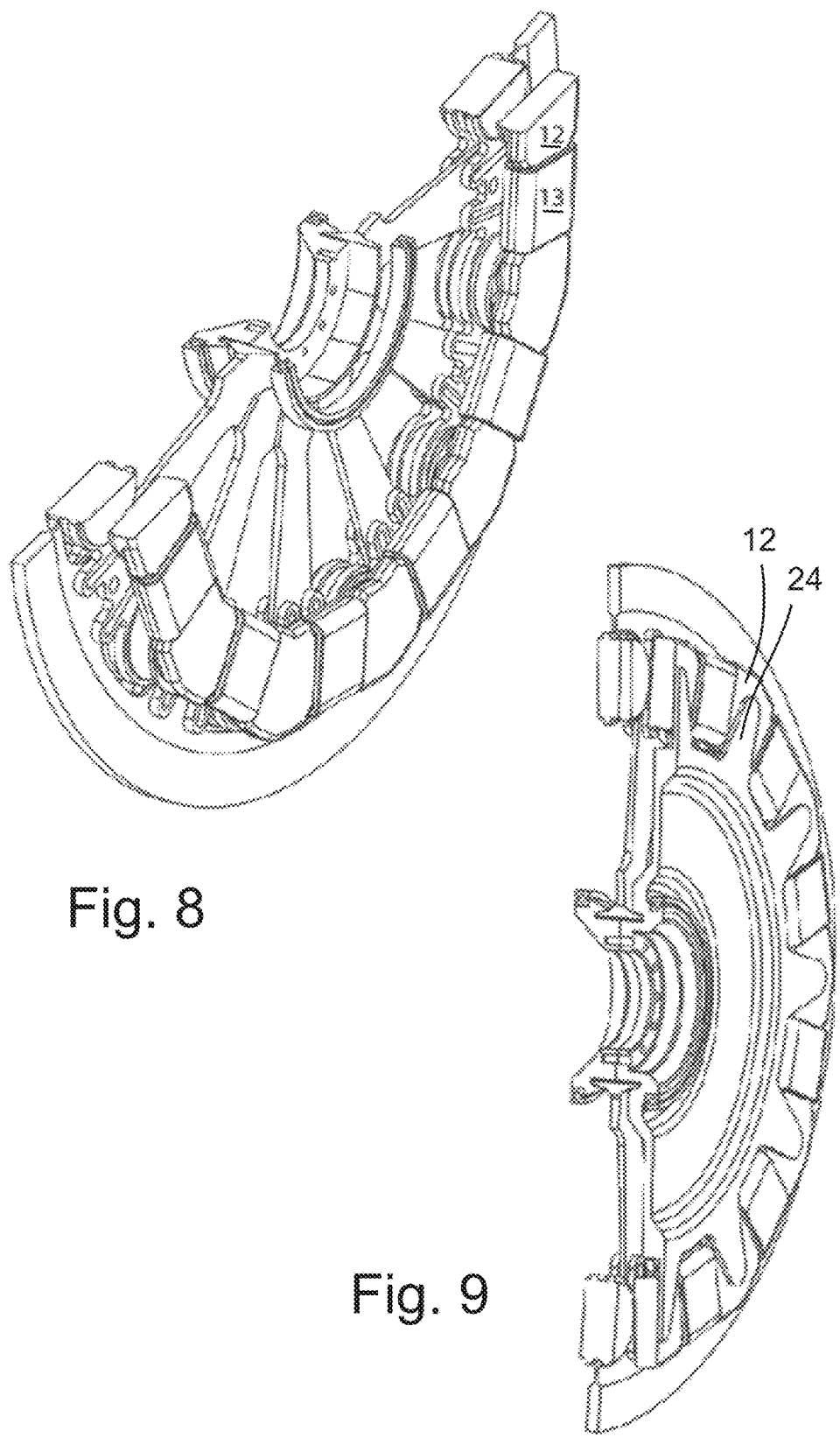

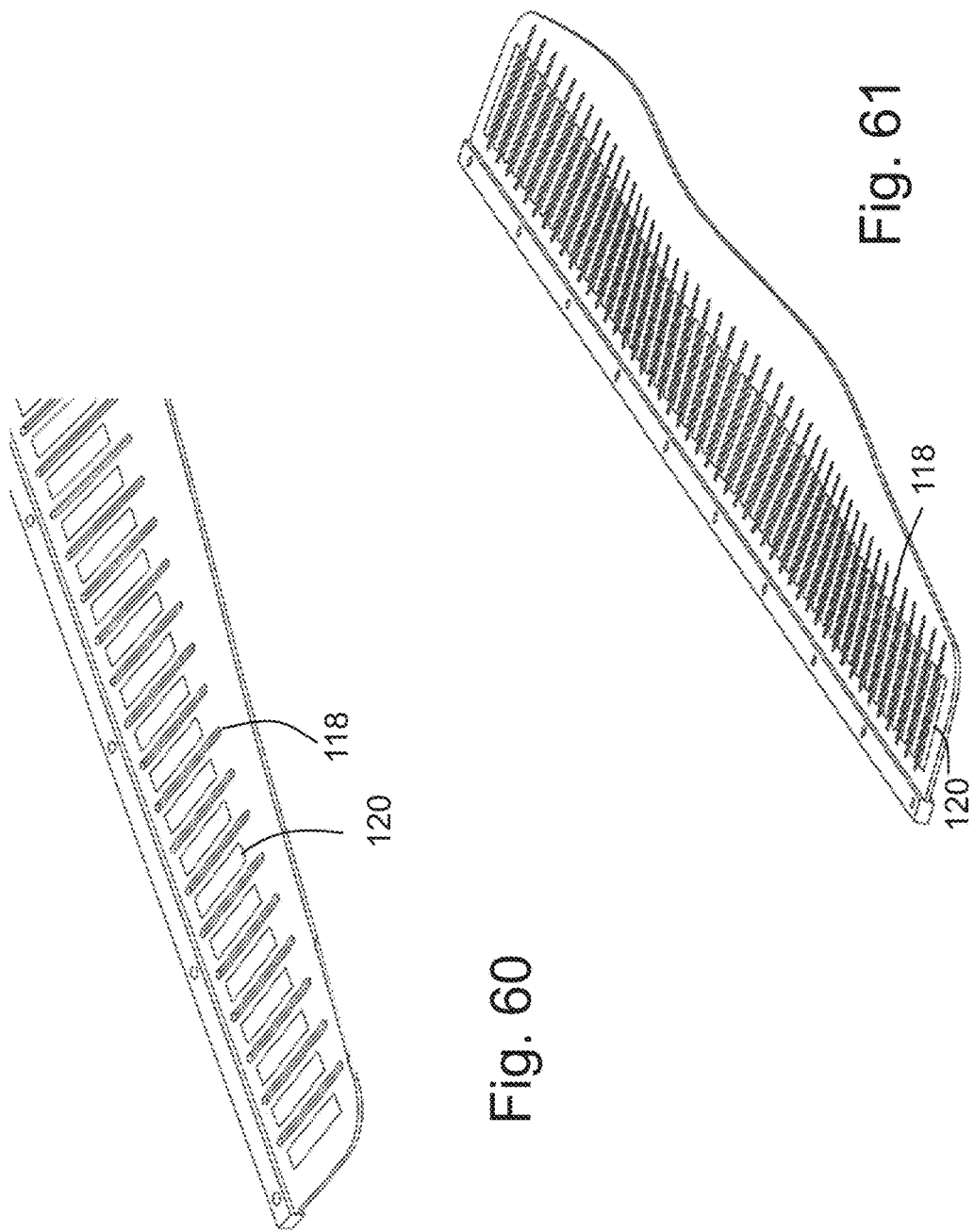

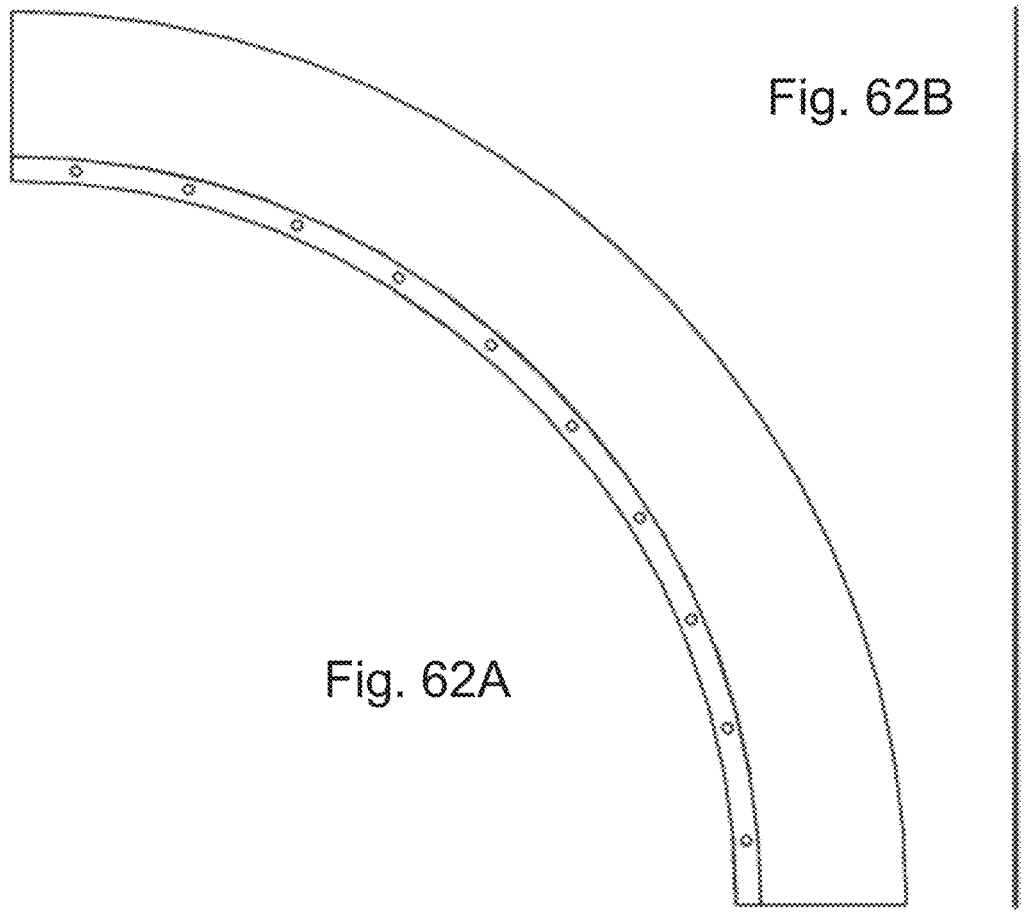

WAVE ACTUATOR

TECHNICAL FIELD

Actuators.

BACKGROUND

The inventor has previously disclosed actuators using flexible splines, for example in PCT Application Publication No. WO 2015/168793. A new actuator is disclosed.

SUMMARY

Disclosed herein is a device and method for making a device that uses a propagating wave to actuate an output member.

In an embodiment, there is disclosed a wave actuator comprising a two dimensional structure having at least a portion pre-stressed in compression in a first direction of the two dimensional structure to form a wave shape having waves along the first direction; an output arranged in contact with the waves of the wave shape, the output and the two-dimensional structure movably arranged in relation to one another; and a wave propagator arranged to propagate the waves along the first direction to move the output relative to the two dimensional structure.

In an embodiment, there is disclosed a method of making a wave actuator, the method comprising providing a disk with a circumference in an initial state, loading the disk in tension across the disk and compression along the circumference to cause the disk to buckle and form a wave shape with waves: and constraining the disk between output members with the output members contacting the disk at one or more wave apexes such that force can be transferred from the disk to the output members when a wave is propagated along the disk.

In an embodiment, there is disclosed a torque transfer device comprising a wave disk, the wave disk having an axis, the wave disk being preloaded in tension radially and in compression along the outer circumference such that a circumferential buckling effect is produced to generate an axial wave with two or more wave crests and troughs; one or more output contact rings attached coaxially to a rotating output member and axially preloaded against the axial wave apexes; and a propagating means to circumferentially propagate the wave to impart rotation and torque from the wave disk to the output members.

In various embodiments, there may be included one or more of: the output comprises a first output member and a second output member, the wave shape being constrained between the first output member and the second output member; the first output member is rigidly connected to the second output member; the wave shape comprises a first contact surface that contacts the first output member and a second contact surface that contacts the second output member, one of the contact surfaces being offset in a direction generally perpendicular to the two-dimensional structure to cause the wave actuator to differentially move the first output member and the second output member; a slot in the one of the contact surfaces that is offset in the direction generally perpendicular to the two-dimensional structure; the wave propagator comprises piezo actuators or electromagnets, in various configurations, the output is in friction or geared contact with the waves of the wave shape; the disk has axially elongated teeth; a reference member, the wave shape being constrained between the output and the reference member; grooves extending generally in the first direction in each of the disk and the output; the tensioning member comprises generally radial spokes in tension; the two dimensional structure is a belt.

These and other aspects of the device and method are set out in the claims.

BRIEF DESCRIPTION OF THE FIGURES

Embodiments will now be described with reference to the figures, in which like reference characters denote like elements, by way of example, and in which:

FIGS. 6A-6C are axial, perspective, and close up radial views respectively of an embodiment of a wave disk having lobed output rings;

FIG. 8 is a cutaway perspective view of the embodiment of FIG. 7 also showing electromagnets arranged to move the permanent magnets;

FIG. 9 is a cutaway perspective view of a wave disk having electromagnets;

FIG. 60 is a partial view of a schematic of a wave foil;

FIG. 61 is a partial view of the schematic of the wave foil of FIG. 60, showing the wave of the wave foil;

FIGS. 62A and 62B are respectively a top view and an end view of a 90 degree arc foil;

DETAILED DESCRIPTION

Figure 1:
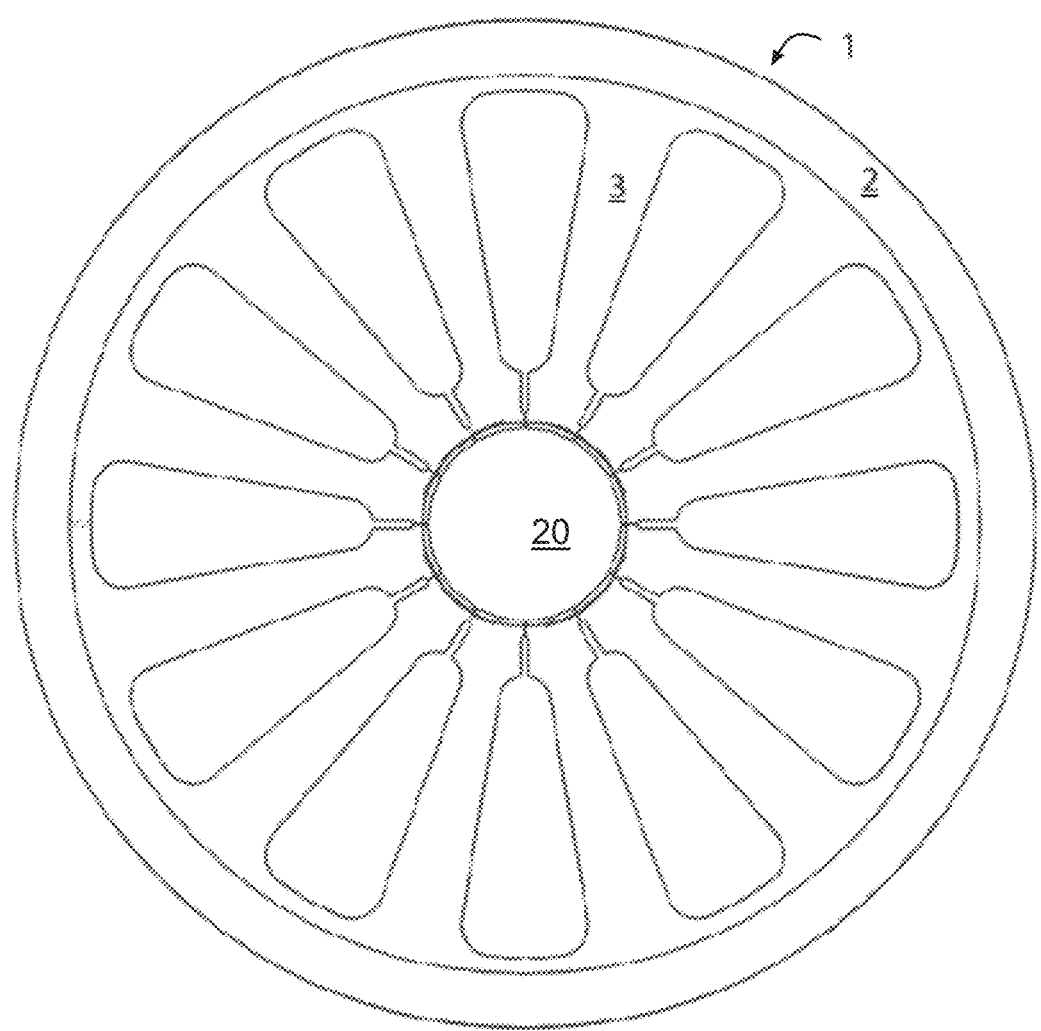
FIG. 1 is an axial view of an embodiment of a wave disk.

Immaterial modifications may be made to the embodiments described here without departing from what is covered by the claims.

A wave actuator may comprise a two dimensional structure having at least a portion pre-stressed in compression in a first direction of the two dimensional structure to form a wave shape having waves along the first direction, an output arranged in contact with the waves of the wave shape, the output and the two-dimensional structure movably arranged in relation to one another, and a wave propagator arranged to propagate the waves along the first direction to move the output relative to the two dimensional structure. The two dimensional structure may be, for example, a disk or a belt. The two dimensional structure can be sheet-like, but may have cut-outs and may also comprise spokes or other linear members. It may have a complicated structure including extensions perpendicular to the generally two dimensional structure.

For a disk the circumferential compressive load is the result of an evenly distributed radially tensioned disk or spoke or flexure array etc. That is, a disk should have a rotationally symmetric radial loading of the disk section radially inward from the ring.

The two dimensional structure need not be flat or planar; a bent two-dimensional structure is still two dimensional. The output typically has a two dimensional surface generally parallel to the two dimensional structure taken as a whole, but may not be parallel locally to the two dimensional structure due to the wave shape. Compression of the wave shape against the surface may in turn press the wave shape into conformity with the surface locally where it contacts the surface. Where the two dimensional structure is a disk, typically the pre-stressing in compression is a circumferential pre-stressing in compression forcing a circumferential waves about the disk, the propagation of the waves and the resulting movement of the output also being circumferential. Where the two dimensional structure is a belt, typically the compression is along an edge of the belt to form a wave shape along the edge of the belt, the propagation of the waves and the resulting movement of the output also being along the edge, thus typically along the length of the belt for a consistent width belt with edges parallel to the length of the belt. An arc-shaped two dimensional structure can be considered to be a curved belt. The pre-stressing in compression of a circumferential portion of a disk can be accomplished, for example, by tensioning members acting to constrain the radial width of the circumferential portion. The radial width can also be constrained by radial compression from the outside, though this is a less typical embodiment. The pre-stressing in compression for a belt can be accomplished, for example, by constraining the length of the belt using a tensioning member. The tensioning member can be, for example, offset from the edge of the belt to avoid interfering with waves formed at the edge of the belt. Typically the wave shape is constrained between two output surfaces for better traction.

The output surfaces can be rigidly connected to each other. The output may be fixed or the two dimensional structure may be fixed or neither may be fixed. The output surfaces may be movable with respect to one another and the two dimensional structure configured to differentially move the output surfaces. Where one output surface is movable with respect to another, one may act as a reference for the output of the other, the desired motion being the motion of the output relative to the reference. The configuration of the two dimensional structure to differentially move the output surfaces may be accomplished for example by offsetting one side of the two dimensional structure at a portion that contacts an output surface in a direction perpendicular to the two dimensional structure. In the case of a disk, this perpendicular offset is an axial offset.

In an embodiment of wave actuator, the wave actuator includes a circular wave disk which is circumferentially pre-stressed in compression and radially constrained to prevent outward displacement of the disk outer diameter (OD) and with a flexible member/s so as to generate an axial wave shape around the OD. This wave is, in one example, similar in shape to a hyperbolic paraboloid, but unlike a more common hyperbolic paraboloid, it is not a rigid shape. Rather, when constructed according to the principles of this disclosure, a wave apex does not have a biased angular position around the circumference and can be propagated in the circumferential direction with minimal force and minimal mechanical loss. The disk will always revert to a two wave (two peaks and two troughs) shape when not axially loaded against the output disks. Only when axial preload is applied to the two wave shape will it transition into a shape with greater than two waves. Axially loading disks or rings or other output members are necessary for all wave numbers above two and they are not necessarily shown in each drawing.

Figure 10:
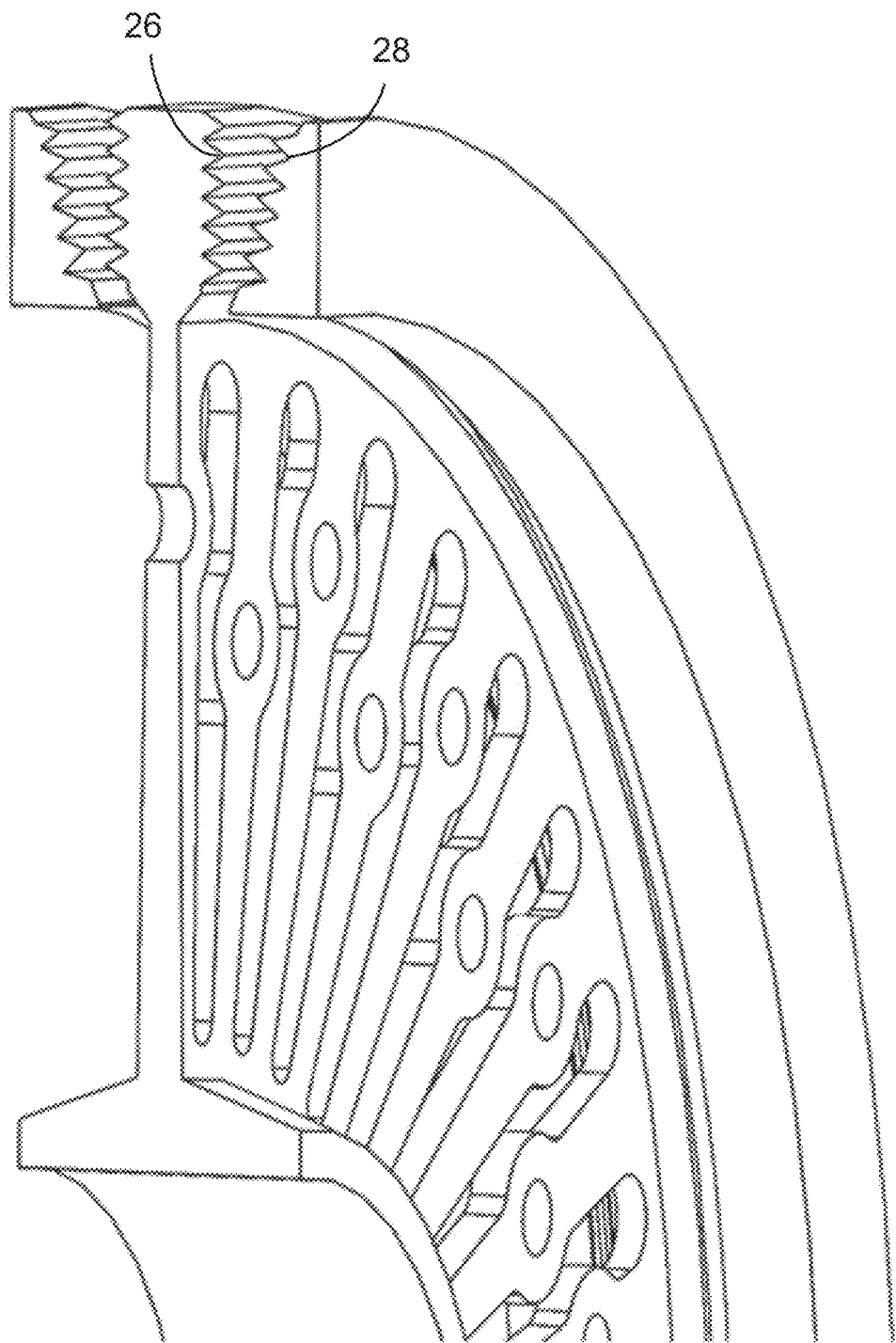
FIG. 10 is a cutaway perspective view of a wave disk device with ridges and matching grooves on the contacting surfaces of the wave disk and the output members.
Figure 11:
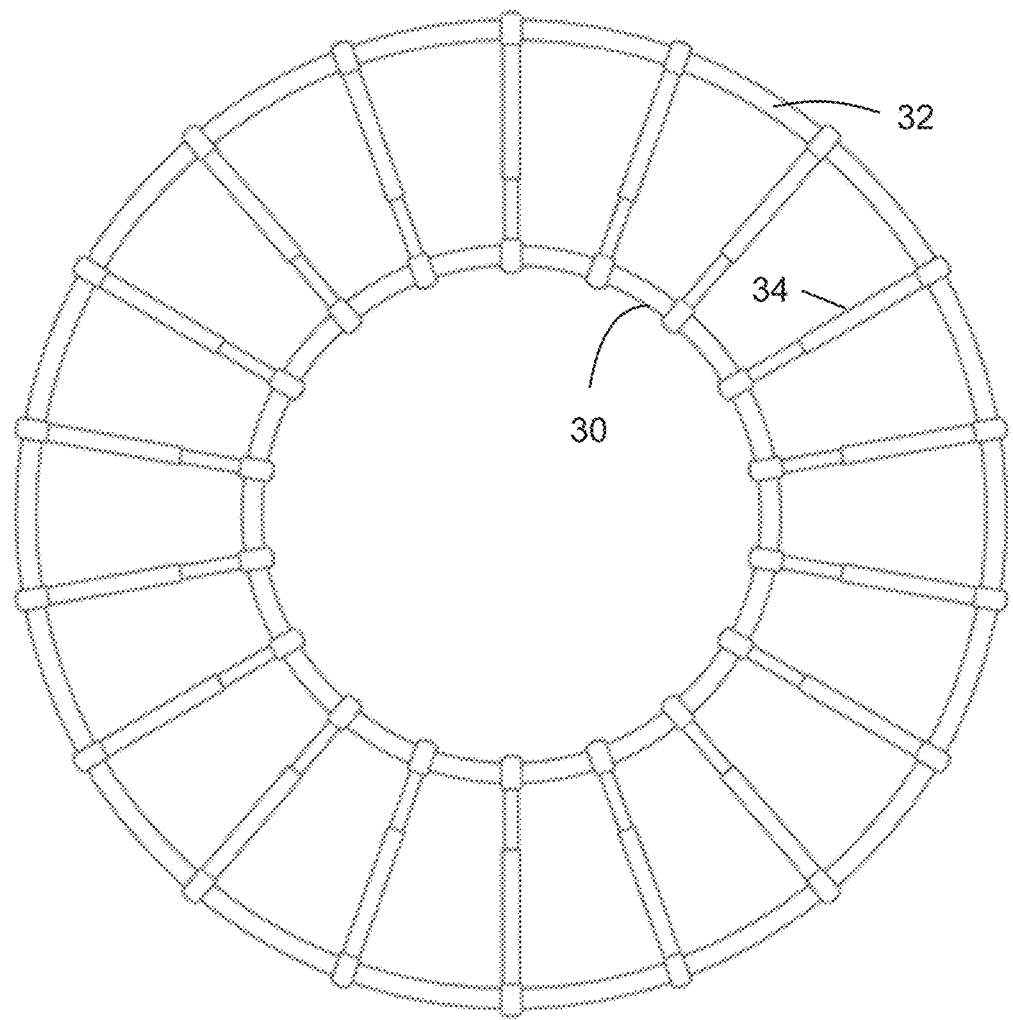
FIG. 11 is a schematic illustration showing an axial view of an embodiment of a wave disk, not yet pre-loaded to obtain a wave shape.
Figures 12, 13:
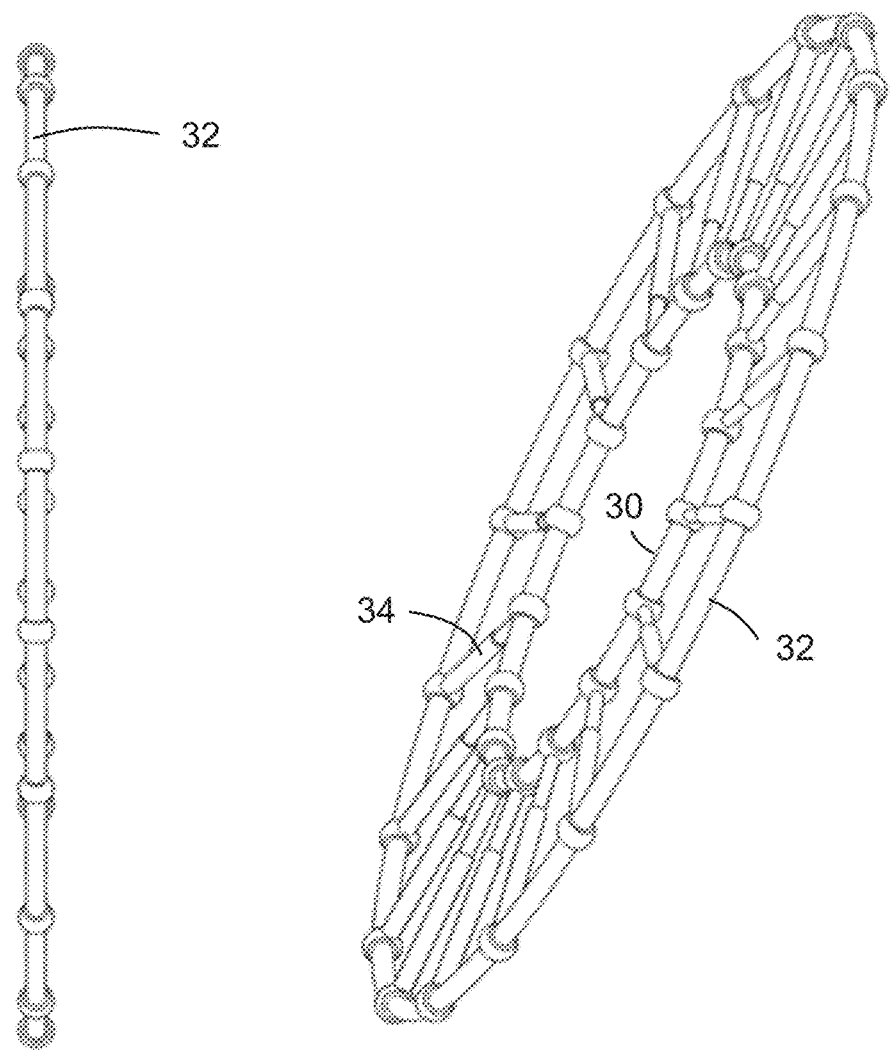
FIG. 12 is a schematic illustration showing a radial view of the embodiment of FIG. 11.
FIG. 13 is a schematic illustration showing a perspective view of the embodiment of FIG. 11.

An exemplary embodiment of the device comprises one or more wave disks having the following features: a preferably but not necessarily axially thicker ring section at or near the OD of the disk; a center axis with or without a through hole (for the purpose of clarity in this disclosure, the center axis area will use a through hole for most embodiments and will be referred to as the inner diameter (ID)); a disk area preferably but not necessarily axially thinner than the OD ring section which is able to bend in one or both axial directions but not substantially in the circumferential direction as the wave is propagated; the disk preferably has a means of centering the disk on the rotational axis of the device such as but not limited to with a bushing/s or bearing/s between the disk and an output member, or teeth or lobes on the disk that mesh with teeth or lobes or meshing circumferential grooves on the disk and on an output member such that the disk is constrained from movement in all radial directions; and the exemplary wave disk having one or more contact surfaces on one or more axially facing surfaces of a disk which transmit rotation and torque from the disk to a mating surface on an output member. This surface interface can be, but is not limited to a traction interface, a geared or lobed interface, a generally planar surface on the disk at the contact position, a generally conical surface on the disk at the contact position, a generally toroidal surface on the disk at the contact position, or a ridged surface as shown in FIG. 10 with one or more circumferentially aligned ridges 26 and/or grooves 28 that increase the contact surface area and increase the surface contact pressure as a result of a wedging effect between the disk and housing member ridges 26 and grooves 28. This exemplary embodiment also has means of propagating one or more wave apexes in either circumferential direction to change the angular position of a contact between a disk and a housing member including, but not limited to: electromagnets pulling directly on a soft metallic material attached to the disk (or the disk itself being made of a soft magnetic material such as, but not limited to 4340 steel), electromagnets pulling on permanent magnets attached to any portion of a disk which moves in a direction when a wave is propagated, piezo ceramic material pulling and/or pushing and/or causing elastic deformation of any portion of a disk which moves in a direction when a wave is propagated, thermal expansion and/or contraction of any portion of a disk which moves in a direction when a wave is propagated, hydraulic pressure acting on any portion of a disk which moves in a direction when a wave is propagated, aero dynamic forces and/or pressure of a gas acting on any portion of a disk which moves in a direction when a wave is propagate, electro-reactive materials acting on any portion of a disk which moves in a direction when a wave is propagated, or a wide range of actuators or actuating materials or devices that can also be used to propagate a wave on a disk. Generally speaking, any point on a disk that moves in a direction when a wave is propagated can be used as an actuation point by exerting a force on that point with an actuating means. The other attachment point for an actuator or actuator means can be on the disk itself or on a housing member or on an output member. This exemplary embodiment also has one or more output members having a preferably circular contact section at a similar radial dimension of the disk contact section facing toward and meshing with the disk so as to transmit torque form the disk to the output member. Two surfaces on the output members may be provided on either axial end of a disk and axially spaced to contact the disk on both axial sides of the disk. Axial spacing of the output members may be arranged to axially preload the apexes of the disk so the contact surfaces are always preloaded. Furthermore, more than one of the above disks may be sandwiched between more than one set of output members to increase the torque capacity.

Some potential variations include: a disk can be used as a reference member with both axial ends of said disk transmitting torque to axially inward facing surfaces on an output member that are fixed to each other. In this configuration, it is preferable for the disk to be symmetrical across a plane that is perpendicular to the rotational axis. A disk can be asymmetrical on either side of a plane that is perpendicular to the rotational axis (such as, but not limited to, for example with a contact surface of the ring being axially further from the disk material inward from the OD ring) such that one contact surface on one axial end has a different disk-to-output member contact patch speed ratio than the opposing disk-to-output member contact patch speed ratio. In this case, each of the two output members may have a different speed ratio relative to the disk as the disk wave propagates while said disk can be free floating or attached to a different input or output. This configuration would preferably use a bearing between opposing output members to provide axial loading of the surfaces. More briefly described variations are: multiple stages used in series or parallel; use of the device as a motor or generator, use as a speed increaser or decreaser, direct drive of the wave disk with actuators as described above, drive of the wave disk with a rotary input such as to generate electricity or other mode of power; and a variable ratio output may be achievable by varying the axial displacement of the disk relative to one or both output members or the output member axial spacing.

Non-Limiting Example of One of Many Ways to Construct the Present Device

Figure 2:
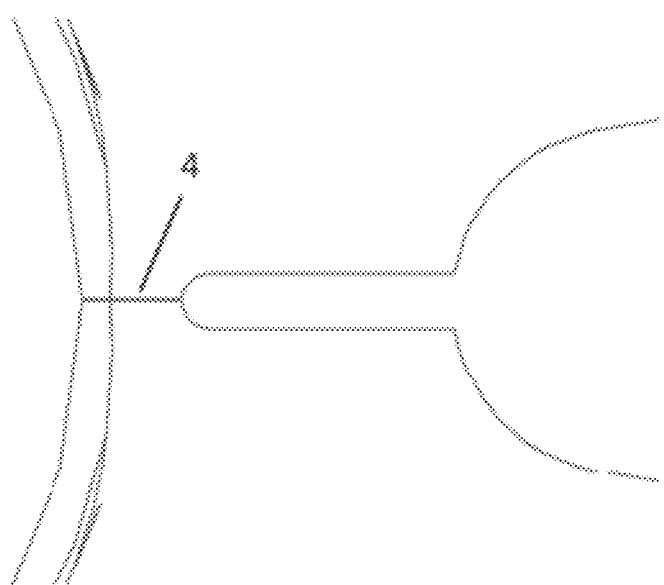
FIG. 2 is a detail view of a radial slot between spokes of the wave disk of FIG. 1.

An exemplary embodiment of wave disk 1 has an array of radial blade/spokes 3 as shown in FIG. 1. The disk 1 can be a number of different materials or different sizes, but in this non-limiting example, the wave disk is 8" in diameter and is made of titanium. The inner diameter (ID) hub 20 is radially slotted to allow inward radial displacement of the spokes without interference between the spokes. As shown in FIG. 2, with the spokes in the drawn-in position, the generally radial slots 4 between the spokes allow the spokes to be drawn radially inward a desired distance without interference with each other.

Figure 3:
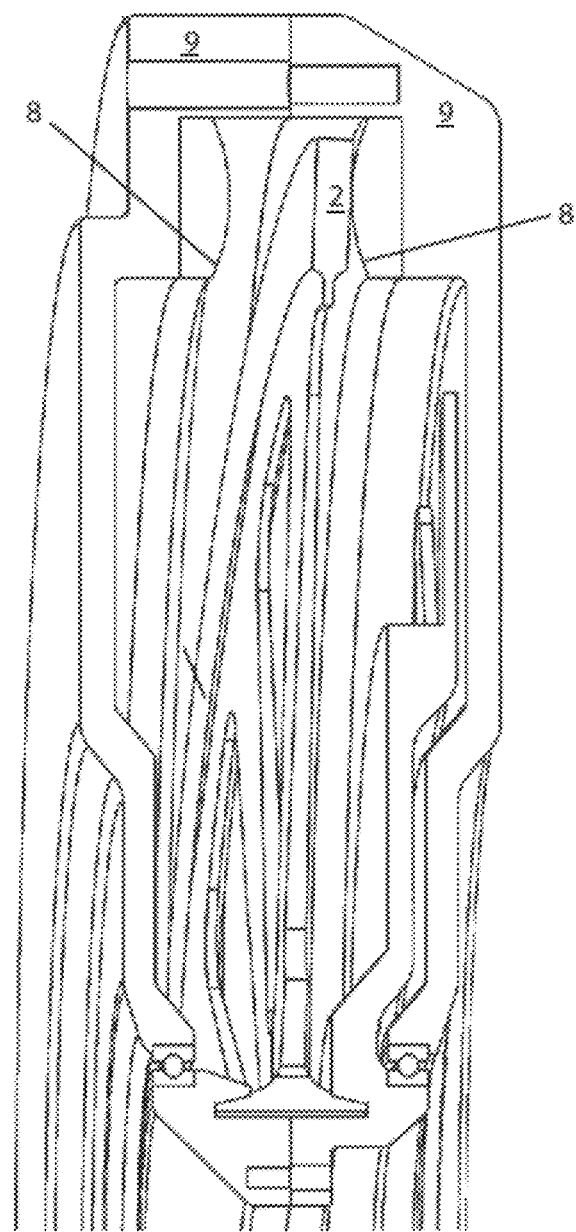
FIG. 3 is a perspective section view of a device including the wave disk of FIG. 1.
Figure 4:
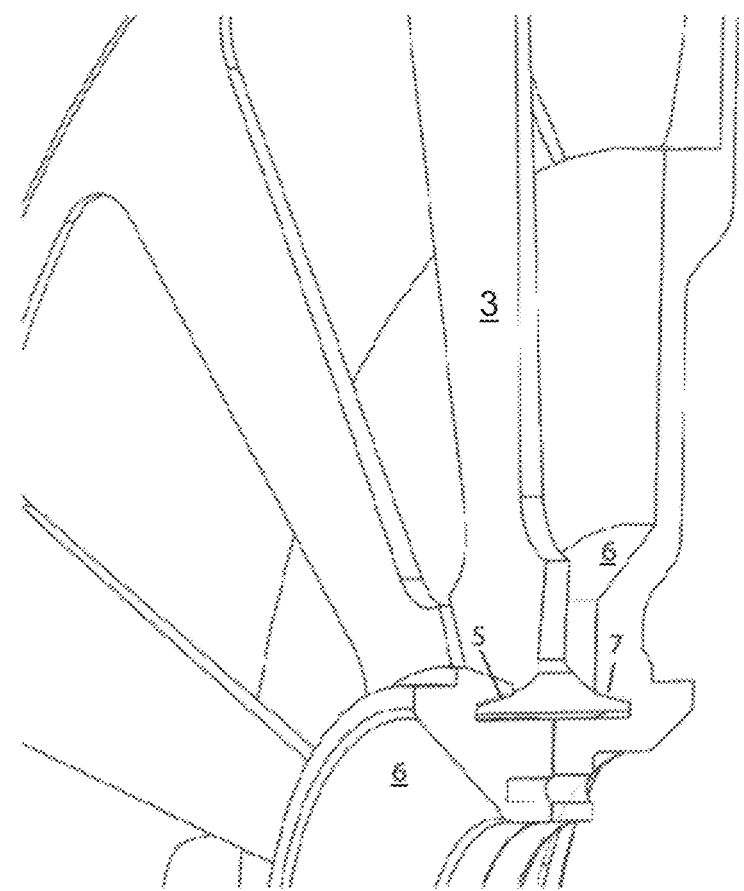
FIG. 4 is a close-up section view of the wave disk of FIG. 1.
Figure 5A:
FIGS. 5A-5C are side, 45 degree angle, and top views respectively of the wave disk of FIG. 1 showing the wave shape.
Figure 5B:
Figure 5C:

As shown in FIG. 3, preferably curved or conical surfaces 8 on output members 9 are drawn axially inward with, for example, bolts (not shown) to rigidly connect the two output members. The conical surfaces 8 axially compress the wave disk OD ring 2 generating preferably axially preloaded contact between the wave disk OD ring 2 and the output contact surfaces 8. Radial displacement can be accomplished in a number of ways. In this exemplary embodiment, as shown in FIG. 4, two preferably conical sleeves 5 are axially drawn radially inward (using bolts or threads or other means—not shown in images) around conical sleeves 7 on the ID hub and generate a resulting radially inward force and displacement of between 0.002" and 0.020" (although higher or lower displacements may work for some geometries and applications). This pulls the ID of the spokes inward and creates inward radial tension on the spokes. In this schematic image, the tapered surfaces 7 of the disk are shown interfering. The outer diameter (OD) ring section 2 is not circumferentially interrupted like the spokes and is therefore resistant to compression in the circumferential direction. It is also preferably thicker than the spokes 3. The inward tension on the spokes results in a circumferential compression loading of the OD ring causing it to buckle into a circumferential wave with an axial magnitude of between 0.002" and 0.2" (although greater or smaller wave magnitudes are possible and may be useful for some applications). The resulting wave shape, when not axially preloaded against the output members, is similar to a hyperbolic paraboloid with two wave crests and two wave troughs as shown in FIGS. 5A-5C.

As shown in FIG. 3, a pair of preferably symmetrical output surfaces 8 are fixed to an output housing member 9 so they rotate together as one piece about the center axis of the actuator. These two surfaces are drawn together in the axial direction by bolts or other means (not shown in images) with the wave disk sandwiched in-between them. If the wave disk has axial lobes or teeth 22 (as shown in FIGS. 6A-6C) then the required preload may be just high enough to keep the lobes engaged under maximum torque. FIGS. 6A-6C show an example of a lobed surface with elongated lobes that engage with lobed output rings. The teeth on one side of the disk may be at a different radial position from teeth on the other side. If the contact surfaces are designed for traction torque transfer, the preload force are preferably higher than is necessary with gears or lobes. In this exemplary embodiment, two waves result from the circumferential buckling. Up to a critical axial preload, the wave disk will maintain two wave peaks and two wave troughs. With additional axial preload, the wave disk will find a lower energy shape with three waves. With still higher axial preload the wave disk will find a lower energy shape with four lobes.

Additional waves will continue to form with additional preload and/or axial displacement of the output members. The advantages of additional waves include smaller airgaps between wave disk and electromagnets if electromagnetically driven and increased total contact surface area as axial preload increases.

The wave disk is preferably held coaxially to the output members by a low friction bearing. A flange for attachment to the fixed member of the actuated assembly (such as, but not limited to a robot base as one non-limiting example) is included in the wave disk ID assembly construction. A flange for attachment of the output member (such as, but not limited to a robot arm) is included in the geometry of the output member.

Figure 7:
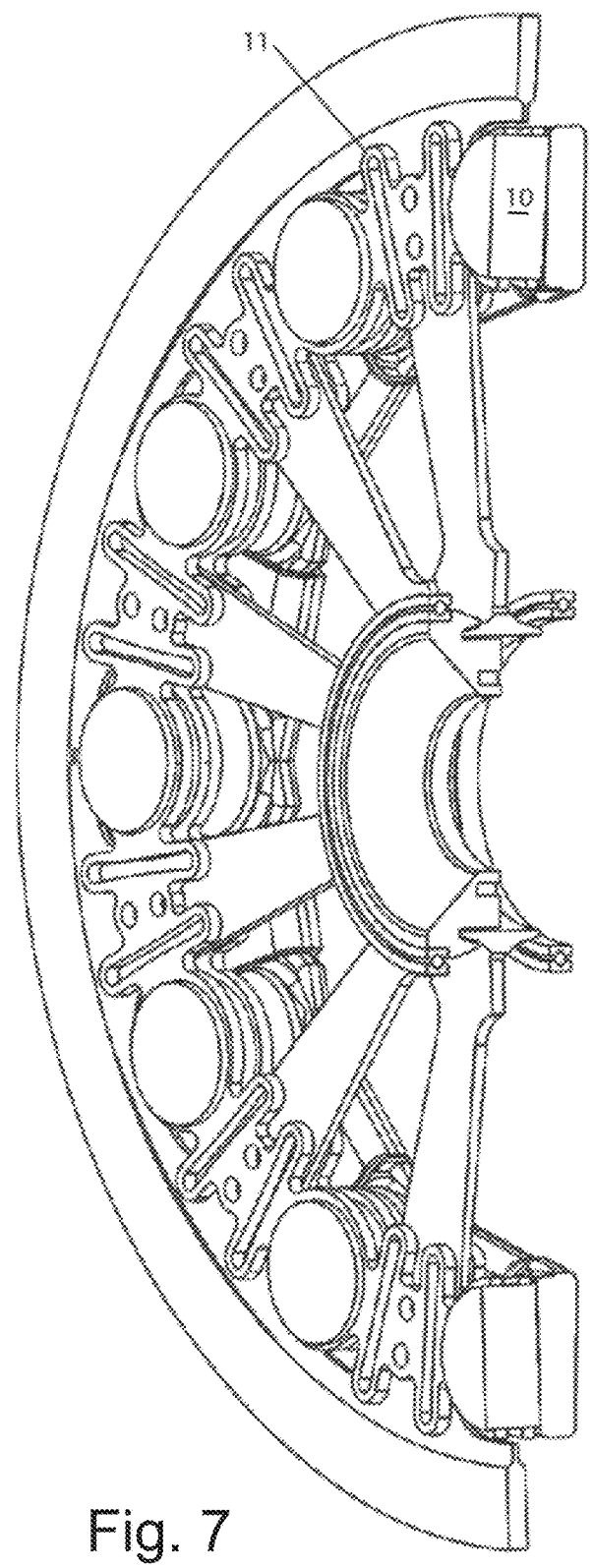
FIG. 7 is a cutaway perspective view of an embodiment of a wave disk having permanent magnets.

As shown in FIG. 8 and FIG. 9, an array of electro magnets 12 is preferably attached to disks 24 that are fixed to the ID hub of the wave disk. They can also be attached to the output members. The electromagnets can be used on one or both sides of the disk but only one side is shown here. These electromagnets exert a magnetic force directly on the wave disk (embodiment not shown) or on permanent magnets 10 imbedded in the disk or attached to the disk, or held to the disk with a flexible ring 11 (preferably but not necessarily made of titanium) as shown in FIG. 7. Commutating the EM coils 13 of the electromagnets draws and/or repels the permanent magnets toward or away from the coils in the axial direction and in so doing, propagate the wave. As the wave propagates, the difference between the circumferential length of the disk OD ring contact surface and the output contact circle defines the reduction ratio between the wave orbit and the output rotation. Ratios of between 100:1 and up to 1000:1 are believed possible with greater and lesser ratios possible under certain conditions with specific materials and geometry. The permanent magnets can be neodymium or other types of magnets. The titanium disk is beneficial in this configuration because it is highly flexible and resists the development of eddy currents. The flexible coupling ring 11 could be made of many different materials. Titanium is considered to be a preferable material. The ring coupling may be attached to the disk with fasteners such as bolts (not shown here) connected for example to the spokes.

The device may have multiple wave disks, and need not have a through hole.

Forged Plastic Disk (Non-Limiting Example)

Another exemplary embodiment uses a disk made of polycarbonate or other polymer with high strength, low creep modulus, and ability to retain a high percentage of its strength after plastic deformation, which is initially manufactured as a rotationally symmetric disk shape with a rotationally uninterrupted hub, a spoke array which is circumferentially interrupted, and preferably axially thicker OD ring section that is not circumferentially interrupted. The OD ring is then axially compressed between two dies beyond its compression strength limit. The plastic deformation of the OD ring elongates the ring in the circumferential direction. This produces a circumferential compression (as a result of the spokes resisting radially outward movement of the now larger OD ring, which then results in a circumferential wave deformation (within the elastic limit of the disk) when the die force is removed due to circumferential buckling.

As with other embodiments in this disclosure, this wave can then be commutated by any number of actuation means such as with electro magnets or piezo actuators or any of the types of actuators described in this disclosure. Piezo actuators may be arranged radially within the disk, for example along the axial surface of the spokes or disk and/or circumferentially and/or at an angle between these two extremes. Radial piezoelectric transducers will propagate a circumferential wave. There is a distinct advantage to radial piezoelectric transducers ("piezos") in that the radial deflection near the ID is near zero. This provides the opportunity to use piezos with very small deflection (which is characteristic of the strongest piezo material). The bending deflection of the radial spokes increases radially outwardly. This also provides the opportunity to use thicker piezo (or other electro reactive or magnetostrictive, etc.) materials toward the ID for greater force in areas of lower deflection where the thicker material doesn't need to bend as much.

This design is not limited to plastic and can also be used with, for example, metal. See, e.g., FIGS. 15-26 and the corresponding description.

Injection Molded with Magnetic OD Ring (Non-Limiting Example)

Another exemplary embodiment uses a thermoplastic disk (although many other materials which contract when cooled may be used) which is injection molded (for example) in a rotationally symmetric disk shape (with no wave shape). It has a rotationally uninterrupted hub and may have a spoke array which is circumferentially interrupted, or it may have a rotationally uninterrupted disk shape, and preferably axially thicker OD ring section that is not circumferentially interrupted. A solid metal ring such as, but not limited to a steel ring having a higher compression strength and a lower coefficient of thermal expansion, is placed in the mold before the plastic is injected and held with spacers so it is completely encased in plastic when the mold is filled. The plastic is preferably cooled to room temperature while the mold is closed. When the mold is opened, the contraction of the plastic will generate a radially inward force on the OD ring. The less compressible OD ring insert will, as a result, be loaded in circumferential compression and, with adequate contraction of the disk, be caused to buckle in the circumferential direction. The resulting circumferential wave creation (within the elastic limit of the plastic disk and steel or other OD ring material insert) can then be axially compressed between two output member contact faces. Propagating the wave will transmit torque from the wave disk to the output member/s. Further description can be found in relation to FIGS. 36-39.

As with other embodiments in this disclosure, this wave can then be commutated by any number of actuation means such as with electro magnets or piezo actuators or any of the types of actuators described in this disclosure.

For the above non-limiting examples, and for the many other ways this device can be constructed according to the basic principles of this disclosure, the circumferential compression of the preferably, but not necessarily axially thicker OD ring of the disk can be accomplished in a number of ways including but not limited to the following: first, tensioning the area of the disk inward from the OD ring. This can be done a number of ways including, but not limited to: radially tensioned radial spokes or blades, radially tensioned filaments such as but not limited to cables or wires or belts or chains that connect an OD ring to and ID ring in a generally radial filament alignment, thermally shrinking the ID of the disk, or mechanically shrinking the ID of the disk such as, but not limited to using a tapered ring which elastically and/or plastically deforms the disk ID radially inwards. Second, axially compressing the OD ring section such as but not limited to by: drop forging the OD ring in the axial direction to cause plastic deformation of the OD ring, forging the OD ring in the axial direction to cause plastic deformation of the OD ring, roll forming the OD ring in the circumferential direction to cause plastic deformation of the OD ring, or forging or drop forging or rolling the OD ring and areas radially inward from the OD ring, preferably with progressively less axial plastic deformation of the inward areas closer to the ID to create a progressively more circumferential compression of the disk toward the OD. Third, imbedding a ring of higher compression stiffness material near the OD of the disk that resists compression of the disk in the circumferential direction and creating radial tension on the lower stiffness material such as, but not limited to by injection molding a ring of material into the OD area of a thermoplastic disk with a high enough molding temperature and high enough thermal expansion coefficient that when cooled, the contracting thermoplastic (or other suitable material) draws the OD of the disk inward. The circumferentially stiffer ring material resists circumferential compression and the OD of the disk finds a lower energy shape similar to a hyperbolic paraboloid. Or, by using a thermoplastic or other material that shrinks when cooled or as it sets (if a thermoset material with a high shrinkage rate), it is preferable to let the disk cool completely before demolding so the disk does not bias to a particular wave location. The circumferentially less compressible ring can be a segmented array of materials such as, but not limited to an array of permanent magnets that can also be used for actuation.

Additional Variations

Variations include more than two positive and negative waves per disk such as if the disk is axially compressed beyond the distance where the lowest energy shape causes the disk to maintain a two wave shape. In this case the disk will find a lower energy shape with a greater number of waves around its circumference. Specifically, as the axial distance between the output contact faces is reduced, the wave disk will transition from two waves (two apexes in one axial direction and two wave apexes in the opposite axial direction, to three waves and then, at greater displacement, four waves and then five waves and so on. This is considered to be a beneficial effect in that greater axial compression results in the following complementary effects (described here in the example of three waves as compared to two waves).

With three waves, the axial displacement of the rotor is reduced which reduces the maximum airgap between the disk and an electromagnet actuator array. This increases the magnetic force available to propagate the wave. With three waves compared to two waves, an electromagnet array, or other actuation method can be acting on three areas instead of two. With three waves instead of two, the elastic deflection of the disk will be reduced making it better suited to actuation with high force but low displacement actuation materials such as piezo ceramics. With three waves instead of two, it is believed possible to reduce the contact pressure for a given total axial load, which may allow the use of lower hardness materials for traction interfaces between the wave disk and output members. This may allow the use of resilient materials such as, but not limited to high friction coefficient rubber or polyurethane or other polymers. Increasing the number of waves for a given total preload force, more evenly distributes the contact forces of the wave disk on the output members. This reduces the required stiffness of these parts allow for lower mass.

Figure 71:
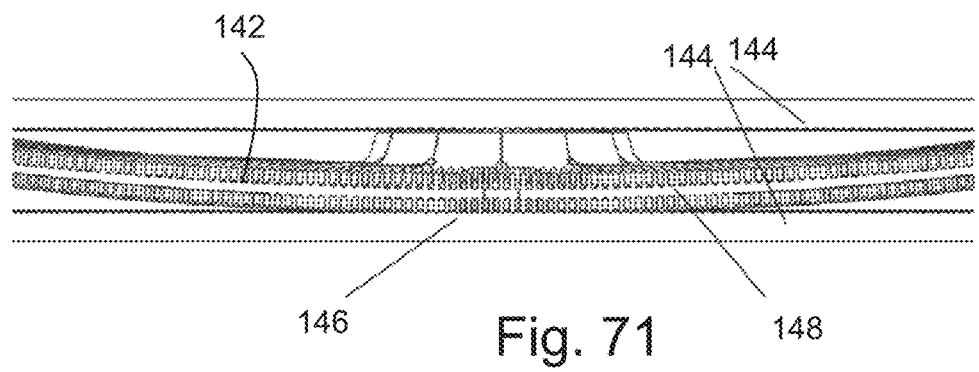
FIG. 71 is a radial view of partial assembly of a lobed wave disk and lobed output rings illustrating axially elongated disk lobes with lobes on one axial side of the wave disk being longer than the lobes on the opposite side to produce differential rotation of planar contact members.
Figure 72:
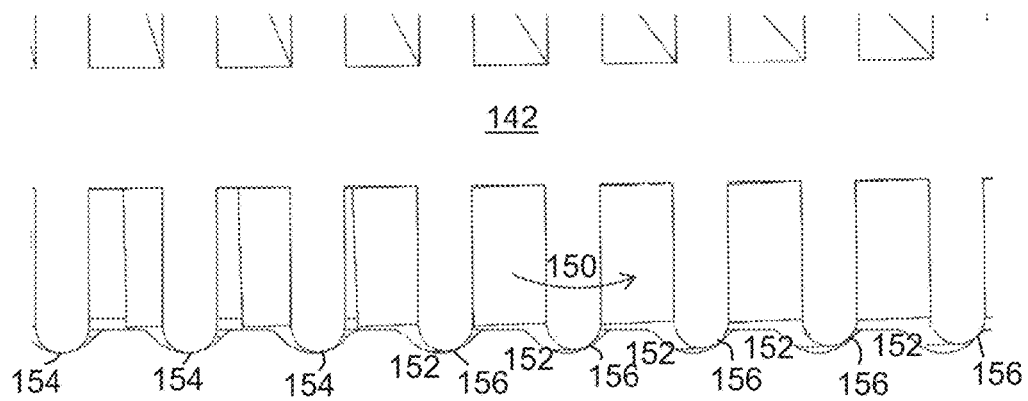
FIG. 72 is a detail view of the partial assembly of FIG. 71.

Also shown in FIGS. 71 and 72 is an example of a lobed surface with elongated lobes that splay apart before engagement to engagement with lobed output rings with reduced sliding contact. In an exemplary embodiment of the device, the smooth surfaces of the outer region of a wave disc contacts axisymmetric smooth surfaces, referred to as plates, on both sides at equal distances from the center plane of the wave disc. The two plates are connected rotationally. When viewed along its axis of rotation the wave disc is generally circular in shape and may have a hole through its center. When there is a hole through the center, its diameter is referred to as the ID. The wave disc is made by reducing the ID of a flat disc component in order to reduce the mean radius of the continuous ring of material around its periphery. The distance along the rim of the wave disc is then greater than the circumference of a circle of the projected radius and, when unrestrained, this excess material naturally deforms the wave disc into a shape similar to that of a hyperbolic paraboloid, with two crests in one axial direction from its central point and two crests in the other axial direction. The waves of this free shape have no preferential circumferential position, and so they can be displaced, as a group, to a new position by applying minimal axial (or somewhat axial or perpendicular) force at any surface not lying on a plane normal to the axis of symmetry. When compressed between two plates the initial contact occurs at two crests on each side, but as the distance between the plates reduces the quantity of waves automatically increases incrementally at discrete positions. Because the deformed shape of the wave disc can be displaced circumferentially without sliding, very little force is required to move the deformation around. The developed length of the outer portion of the wave disc contacting the two plates is longer than the developed length of the corresponding contact region on the plates, therefore every time the set of waves makes a full rotation relative to the outer plates the wave disc makes much less than one rotation. Electromagnets mounted on carrier plates that are connected to the inner portion of the wave disc sequentially attract and repel, in a generally axial direction, permanent magnets mounted around the wave disc to force the deformation to rotate around the axis. The differential rotation between the plates and the wave disc can be used as a rotary actuator or motor. As the force compressing the flex wave is increased the flex wave flattens, so the developed length of the outer portion of the wave disc gets closer in value to the developed length of the corresponding contact region on the plates, resulting in an increased gear ratio. This increase continues until, with the wave disc flattened, the gear ratio becomes infinite. Thus the gear ratio can be varied by changing the distance between the plates.

In an alternative embodiment, the surfaces of the wave disc and the plates have lobes orientated essentially radially to provide positive engagement. The lobes of the wave disc may be extended in the axial direction to enable the transition from curved to flat shape of the wave disc to splay the lobes prior to engagement with the lobes of the plate as a result of the smaller circumferential radius of curvature prior to the wave disk flattening against the output member/s.

In an alternative embodiment, the surfaces of the wave disc and the plates have V shaped ribs orientated circumferentially to provide increased friction and a self-centering action of the wave disk with the output members. The distance between the peaks of the ribs of the wave disc reduces during the transition from curved to flat shape as the wave disc engages with the plate to increase friction and increases during the transition from flat to curved as the wave disc disengages from the plate.

In an alternative embodiment, there are two or more wave disc and plate sets with the wave disc ID's connected to increase the torque capacity.

In an alternative embodiment, there are two or more wave disc and plate sets with the ID of the wave disc connected to the plates of the next wave disc and plate set to increase the overall reduction ratio.

In an alternative embodiment, the plates are not constrained to rotate together. The plates are positioned to not be symmetric about the center of the wave disc. The asymmetry of the plates generates differential rotation between them. The rotation of the wave disc can be used just to generate differential rotation between the two plates or it can be used to generate rotation at a secondary speed. Differential rotation of the two output members in this way, is expected to provide extremely high reduction ratios.

In an alternative embodiment, electromagnets mounted on carrier plates that are connected to the inner portion of the wave disc sequentially attract and repel, in an axial direction, pieces of steel mounted around the wave disc to force the deformation to rotate around the axis.

In an alternative embodiment, electromagnets mounted on carrier plates that are connected to the inner portion of the wave disc sequentially attract and repel, in a radial direction, pieces of steel mounted around the wave disc to force the deformation to rotate around the axis.

In an alternative embodiment, electromagnets mounted on carrier plates that are connected to the inner portion of the wave disc sequentially attract and repel, in a radial direction, permanent magnets mounted around the wave disc to force the deformation to rotate around the axis.

In an alternative embodiment, electromagnets mounted on carrier plates that are connected to the inner portion of the wave disc sequentially attract and repel, in a circumferential direction, pieces of steel mounted around the wave disc to force the deformation to rotate around the axis.

In an alternative embodiment, electromagnets mounted on carrier plates that are connected to the inner portion of the wave disc sequentially attract and repel, in a circumferential direction, permanent magnets mounted around the wave disc to force the deformation to rotate around the axis.

In an alternative embodiment, the shape of the wave disc is generated by mechanically expanding material at the outer region of the wave disc in a circumferential direction whilst leaving the material closer to the centerline substantially unchanged. Electromagnets or other actuators can act from one area of the wave disk to another area of the wave disk to cause bending of local areas to propagate wave motion. This bending displacement can be radial or circumferential or in between, as long as this area would natural bend during wave propagation.

In an alternative embodiment, the shape of the wave disc is generated by mechanically contracting material at the inner region of the wave disc in a circumferential direction whilst leaving the material at the outer region substantially unchanged.

In an alternative embodiment, the wave disc is based upon a conical profile.

In an alternative embodiment, only one plate is used.

An embodiment of a wave disk has an ID 30 and an OD 32 and the ID is in circumferential compression and the disk material outward from the ID, here comprising spokes 34, is axially flexible enough to allow the ID to buckle from its circumferential compression loading into an axial/circumferential wave shape. The wave shape is then constrained between one or more contacting rings that are fixed to the output member.

The embodiment may be modified according to any of the variations described in this disclosure as applied to the buckled OD disk configurations.

The schematic illustration of FIGS. 11-14 show the creation of the circumferential wave shape according to one exemplary variation of the present device.

Many of the variations of the present device that are described here have features that can be applied to other embodiments with different features. This disclosure describes examples of the variety of features of the present device in a variety of embodiments and variations that may be combined.

Other variations to this device are possible and conceived by the inventor. This disclosure is intended as an overview of the basic working principles and does not describe in detail all the ways these basic principles can be combined or configured.

An example of a variation not illustrated here is a multiple disk configuration where more than one disk are arranged as an axial array. The disks can be in parallel to increase torque or they can be in series to increase reduction ratio.

The size of the devices illustrated here are in the 3" to 10" range but much smaller devices and much larger devices are envisioned by the inventor. Micro machine (MEMS) actuators can be constructed according to the principles of this device using silicone and other materials that can be formed by forging or by CTE differentials etc.

Very large actuators of one to ten meters in diameter or larger according to the present disclosure are envisioned for large scale applications such as, but not limited to telescope rotation stages or large machinery requiring rotary motion. In these cases, combining the features of certain embodiments such as a very high number of waves with a circumferentially grooved interface between the wave ring and the output members can allow a very large diameter with no additional centering bearings and a very large ID opening.

A circumferentially uninterrupted ring resists compression in the circumferential direction. The OD ring 32, in this schematic of FIGS. 11-14, represents an actual ring or simply the OD section of the disk. Compression loading of the ring in the circumferential direction can be accomplished a number of different ways. In this case, radially inward force is applied to the OD ring by reducing the length of the generally radial spokes 34. The spokes can radiate from a centrally located point (in which case they would be truly radially aligned. It is beneficial in many applications to provide a center though hole in the actuator so an ID ring is shown. The ID ring can be rigid or flexible in the axial direction but is preferably rigid to allow attachment of a reference member such as, but not limited to a robotic base.

Figure 14:
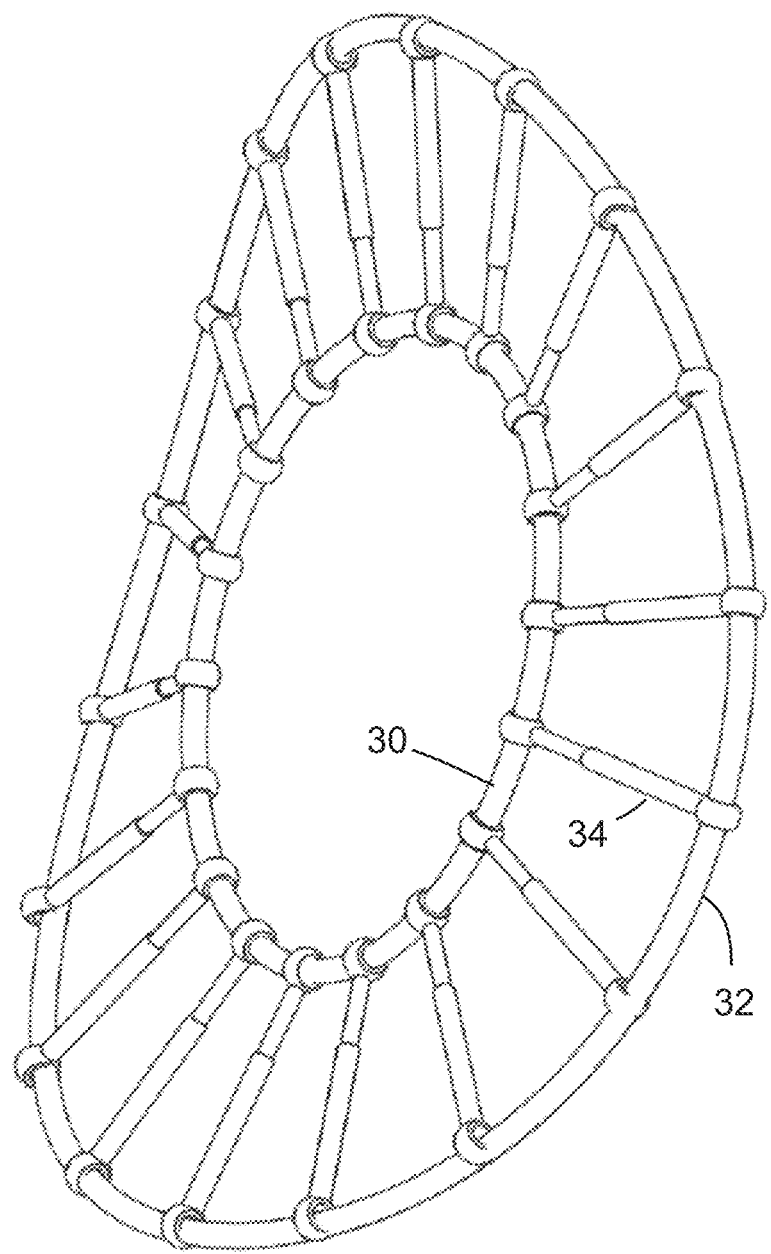
FIG. 14 is a schematic illustration showing a perspective view of the embodiment of FIG. 11 now preloaded to obtain a wave shape.
Figure 15:
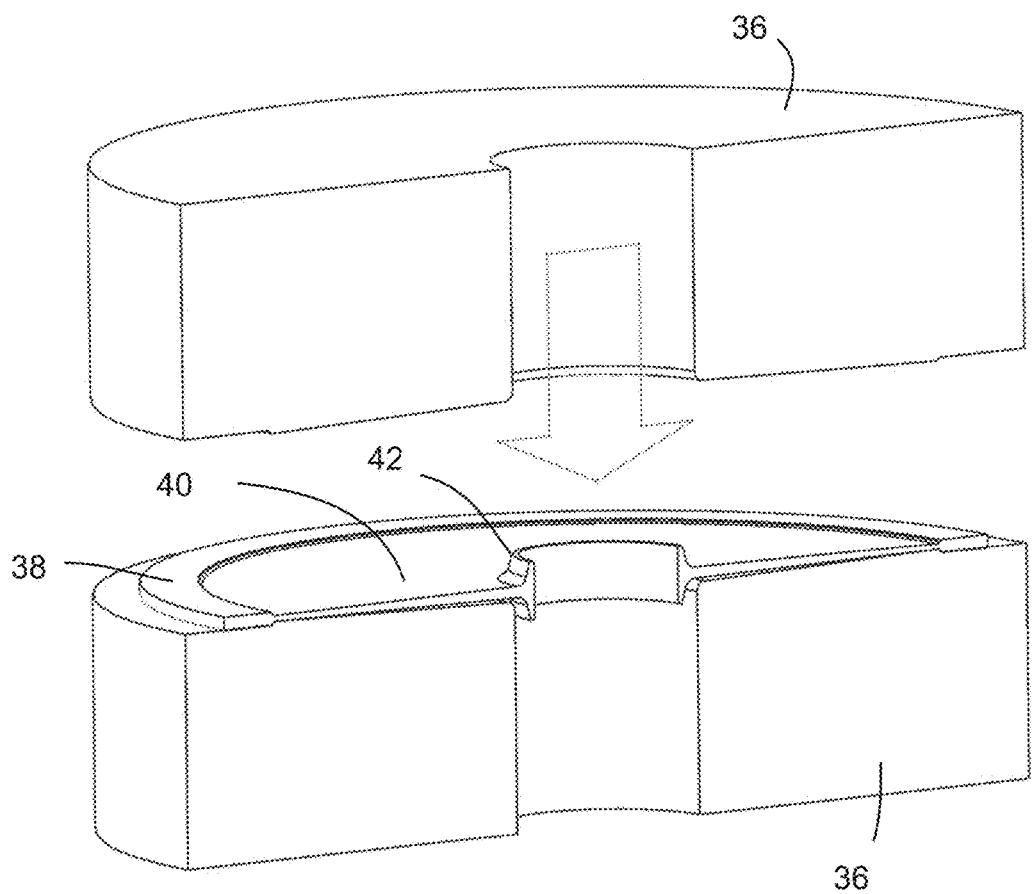
FIG. 15 is a perspective section view of a disk positioned for the outer ring to be compressed and circumferentially elongated between two mandrels.
Figure 16:
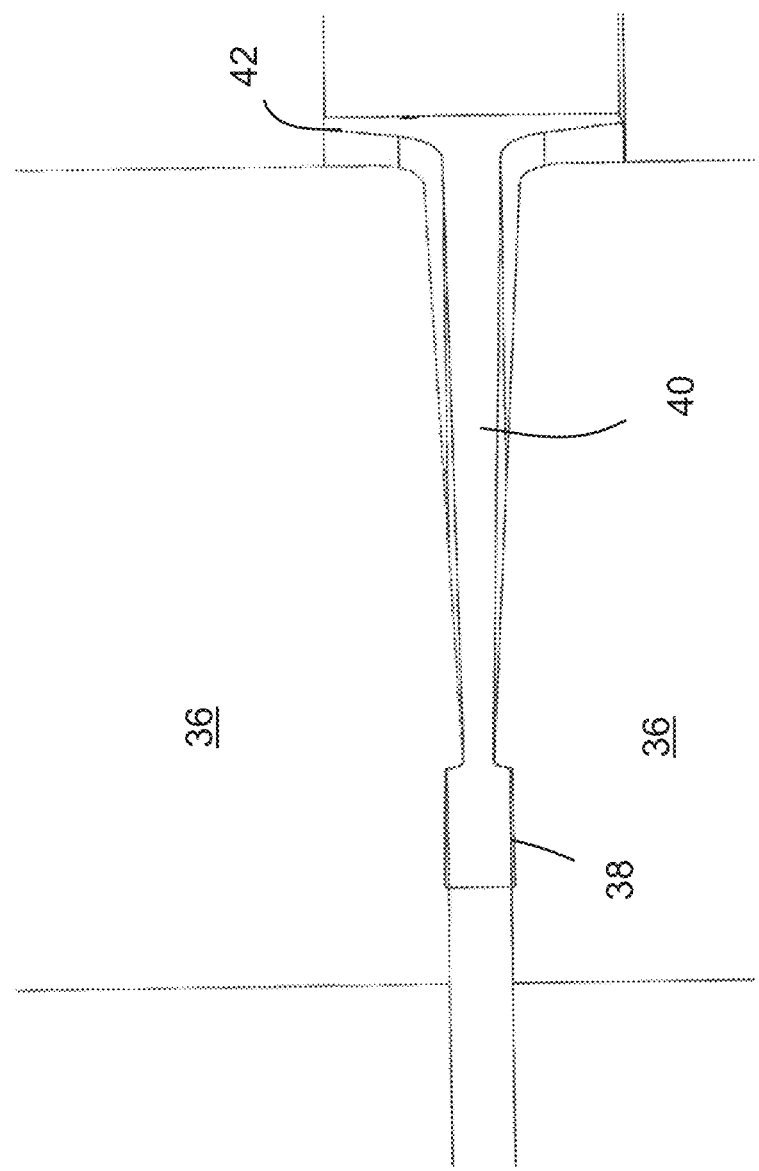
FIG. 16 is a close-up section view of the outer ring of the disk of FIG. 15 undergoing compression between the two mandrels.
Figure 17:
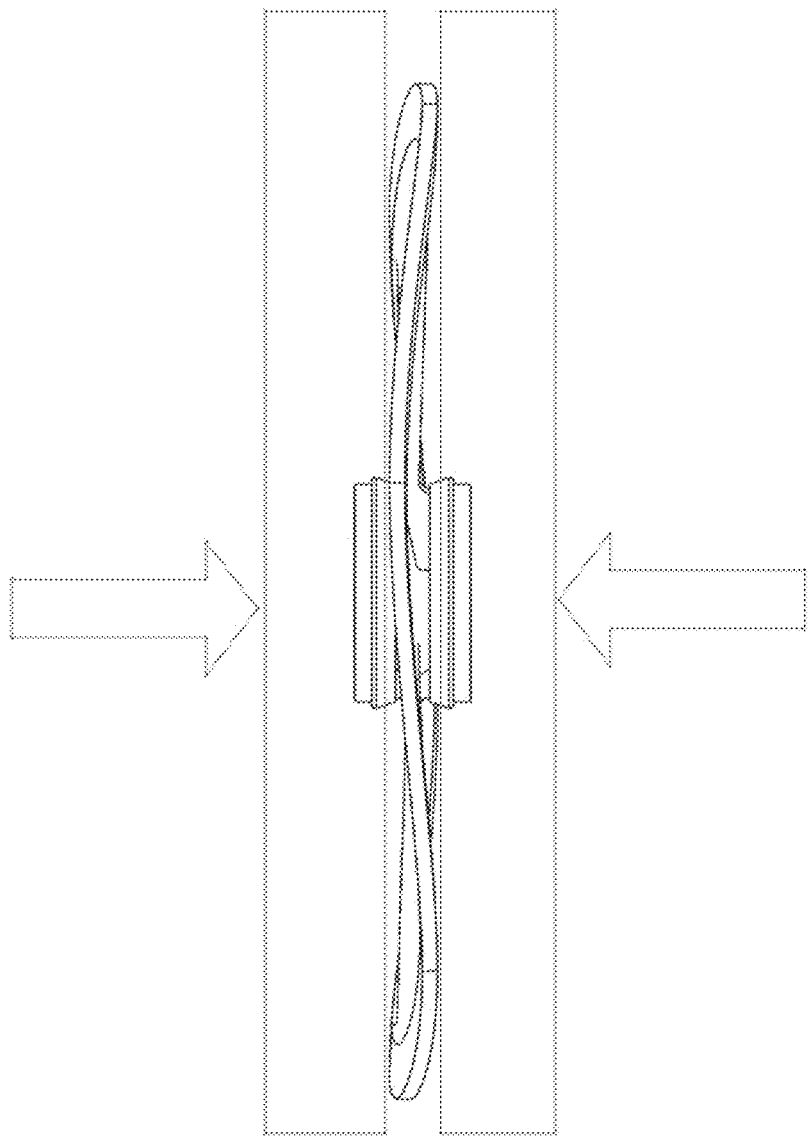
FIG. 17 is a cutaway view of the disk of FIG. 16, post compression, being exposed to an axial preload to obtain a three wave shape.
Figure 18:
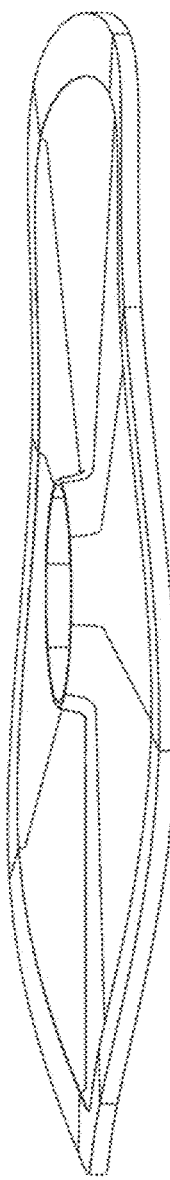
FIG. 18 shows the disk of FIG. 17 with four waves.
Figure 19:
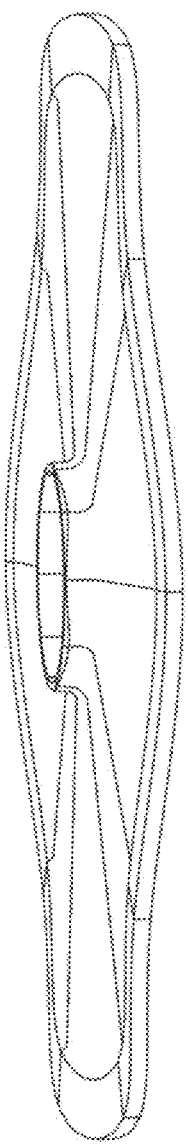
FIG. 19 shows the disk of FIG. 17 with five waves.
Figure 20:
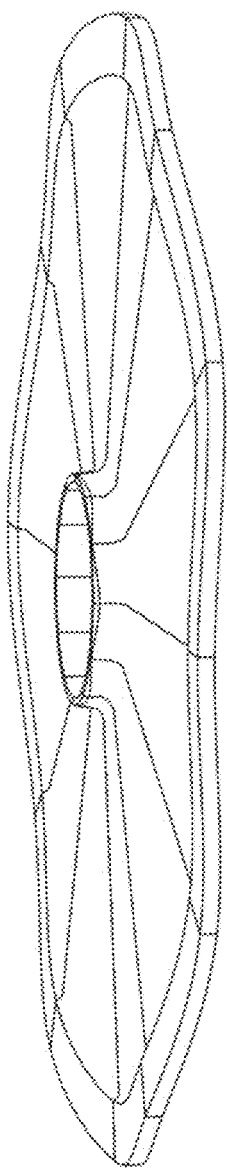
FIG. 20 shows the disk of FIG. 17 with six waves.
Figure 21:
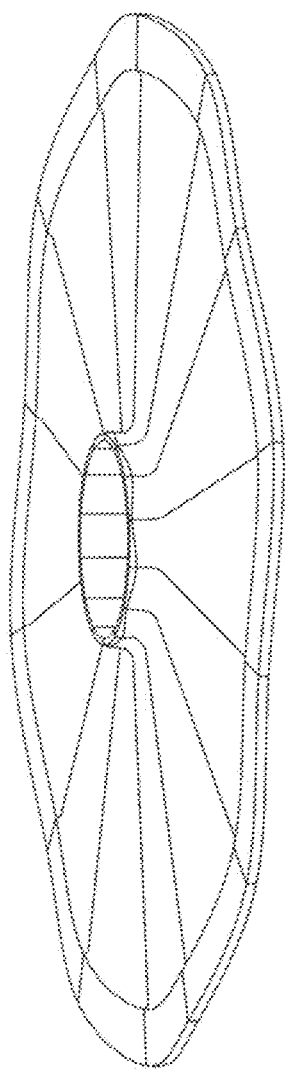
FIG. 21 shows the disk of FIG. 17 with seven waves.
Figure 22:
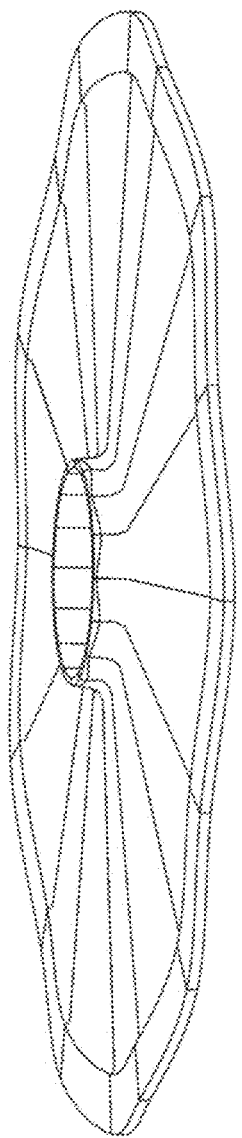
FIG. 22 shows the disk of FIG. 17 with eight waves.
Figure 23:
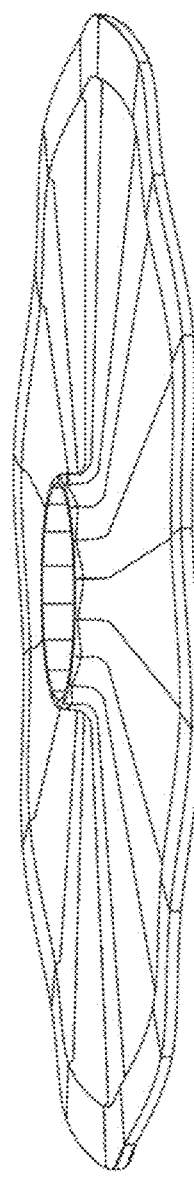
FIG. 23 shows the disk of FIG. 17 with nine waves.
Figure 24:
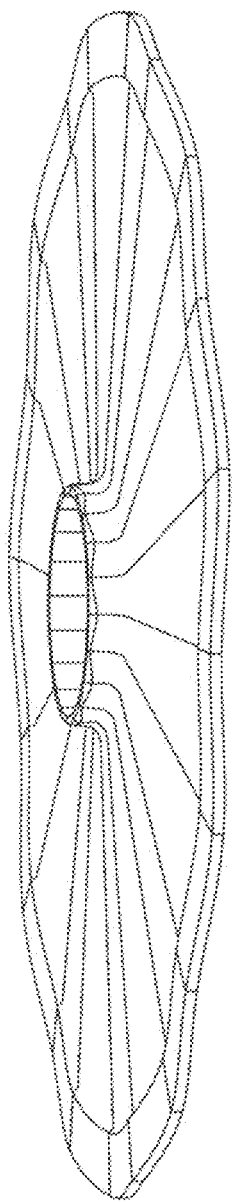
FIG. 24 shows the disk of FIG. 17 with ten waves.

When the radial length of the spokes is shortened, the OD disk finds a lower energy shape as something similar to a hyperbolic paraboloid, as shown in FIG. 14.

The spokes 34 in this schematic are preferably linked to the rings with a low friction ball joint. Non-limiting examples of other spoke constructions include cables or strings or wires or flexures which create radial tension inward on the OD ring and which allow axial movement of the ring so the wave can be propagated.

In another non-limiting example of the present device, as shown in a circular and rotationally symmetric disk of material is manufactured for example by molding or turning on a lathe or casting etc. from a flexible material such as, but not limited to metal or plastic or a composite or ceramic. Metal materials are considered to be well suited for this device because they exhibit adequate flexibility and strength in both compression and tension and does not creep or cold flow. Creep and cold flow are detrimental characteristics in this application because the disk is preloaded and a material which cold flows will be more prone to bias toward a wave position if it is left at that position for an extended period of time. Plastic is generally less expensive and lighter than steel but is more prone to cold flow (creep) and hysteresis losses. Nitinol is useful here because of its very high fatigue life and high elongation limit.

The disk is then pressed or forged between two mandrels 36 (section view shown in FIG. 15) that are shaped to cause sufficient interference with, and thus to exert enough force on, the OD ring 38 to deform the OD ring (and preferably the outermost section of the disk 40 inward of the OD ring but progressively less axial compression and plastic deformation of the disk 40 toward the ID hub area 42.) The component of this is plastic deformation which elongates the OD ring 38 in the circumferential direction which results in a radial tensioning of the disk section 40 inward of the OD ring. When the mandrel is removed, the disk will naturally buckle around the OD in the circumferential direction resulting in a shape similar to a hyperbolic paraboloid with two positive wave apexes and two negative wave apexes as shown in other examples in this disclosure.

By applying an axial load to the disk from preferably, but not necessarily, both axial sides of the disk, and preferably to just the OD ring area with a circular surface such as but not limited to a planar surface, the circumferential wave will compress axially and provide a preloaded traction or geared or lobed interface at two contact zones on one side of the disk and two contact zones on the other (geared or lobed interface may or may not be preloaded). If this axial preload is increased to beyond the load carrying capacity of the two wave shape, the disk will naturally find a lower energy shape which is more able to support the increased load as a three wave OD ring shape as shown schematically in FIG. 17.

If this axial preload is increased to beyond the load carrying capacity of the three wave shape, the disk will naturally find a lower energy shape which is more able to support the increased axial load as a four wave OD ring shape as shown here schematically (without the preloading output ring members). Note that the radial lines on these schematic disk images are only to indicate the apex position of the waves. The disk is preferably made of one piece of material with no seems or joints. Cut outs or spokes may be beneficial in some applications, but the OD ring preferably has at least one reasonably uninterrupted ring around its circumference to provide adequate circumferential compressive strength, stiffness, and smooth interaction with output disks during wave propagation.

As the axial loading of the disk is increased (axial load preferably provided by an output contact ring (only shown in some of these images) it will produce increased axial displacement of the output rings and increased axial compression of the wave shape and the disk will continue to increase the number of waves.

FIGS. 18-25 are a non-limiting example of increased wave numbers, from 4 to 11 consecutively, that will occur as preload is increased. The examples show up to an 11 wave disk shape but larger number of waves are possible and may be beneficial in certain applications where greater load carrying capability and/or reduction ratio are required and/or very large diameter actuators of the present device. The larger the number of waves, the smaller the individual wave, and the OD disk may need to be axially thinner to allow the smaller waves to form as the number of waves increases. For example, it may be that the disk shown may not be sufficiently thin to reach the number of waves shown in the figures, and may stop increasing in number of waves at, for example, six or seven waves due to misalignment or variations in manufacturing tolerances.

Figure 25:
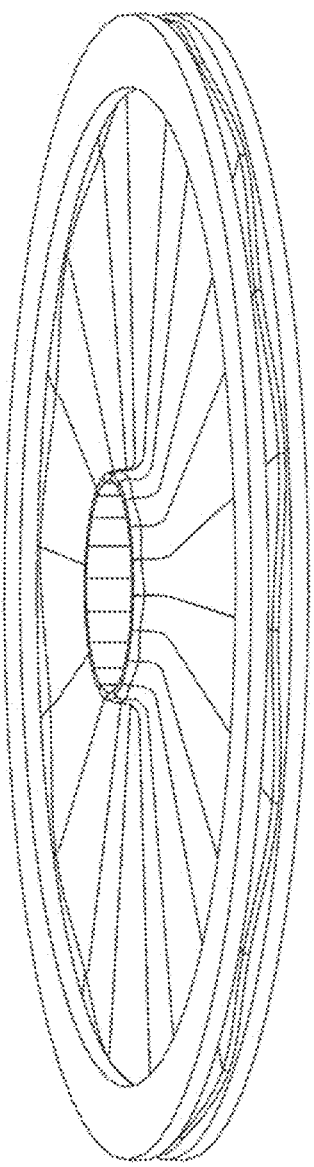
FIG. 25 shows the disk of FIG. 17 with eleven waves and positioned between axial load members.
Figure 26:
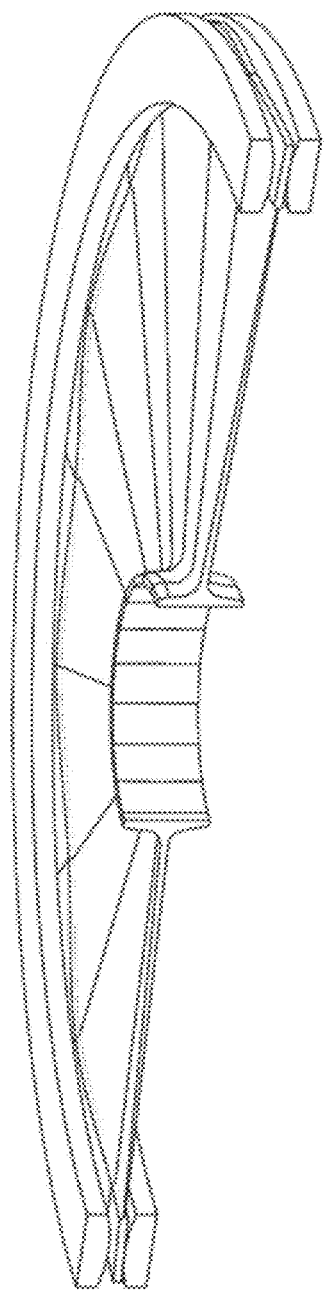
FIG. 26 is a section view of the disk and load members of FIG. 25.
Figure 27:
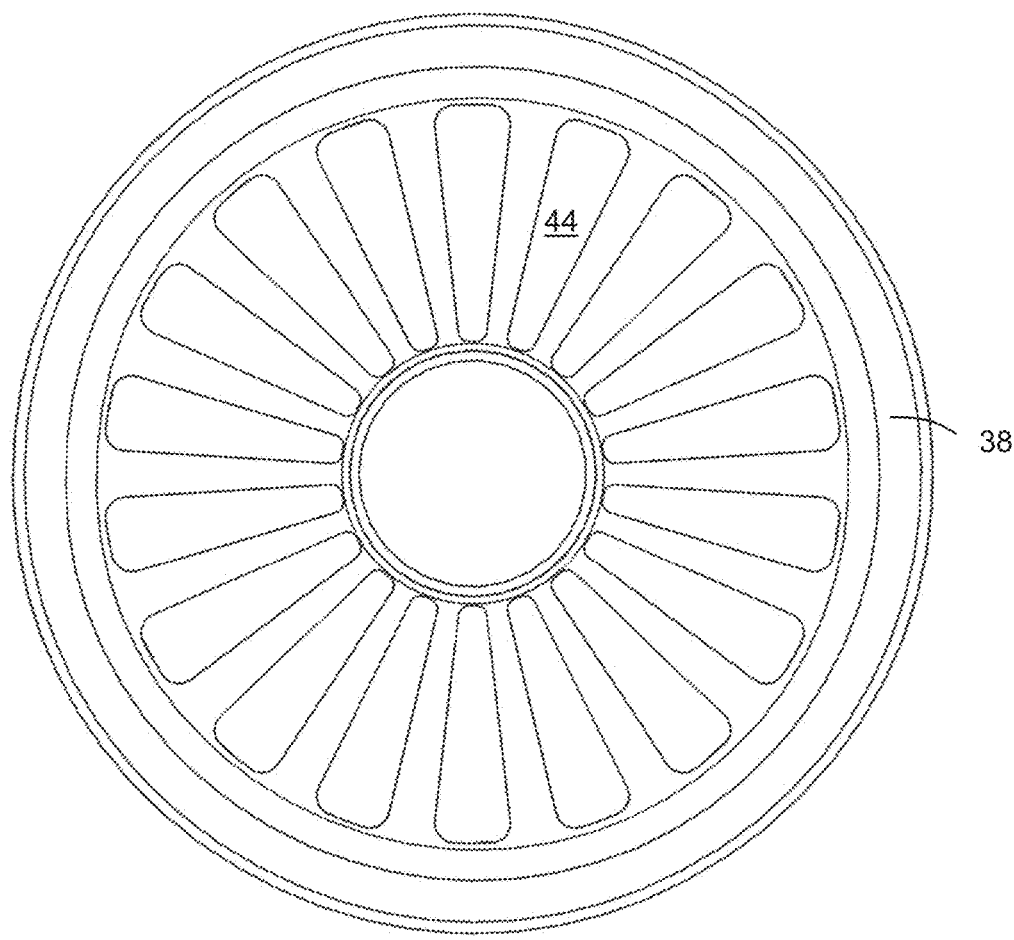
FIG. 27 is an axial view of an embodiment of a disk having cut-outs.
Figure 28:
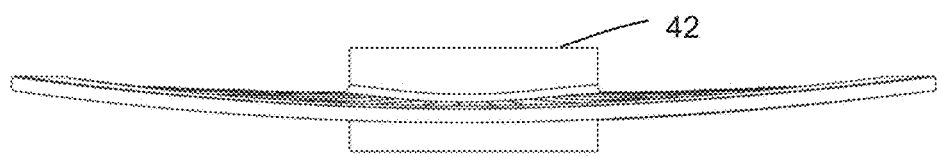
FIG. 28 is a radial view of the embodiment of FIG. 27.
Figure 29:
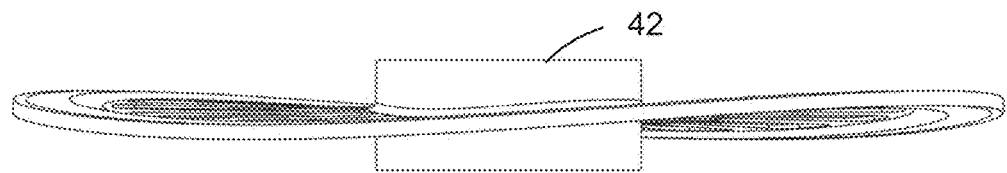
FIG. 29 is another radial view of the embodiment of FIG. 27, at an angle more clearly showing the disk with no preload showing the at-rest two wave shape.
Figure 30:
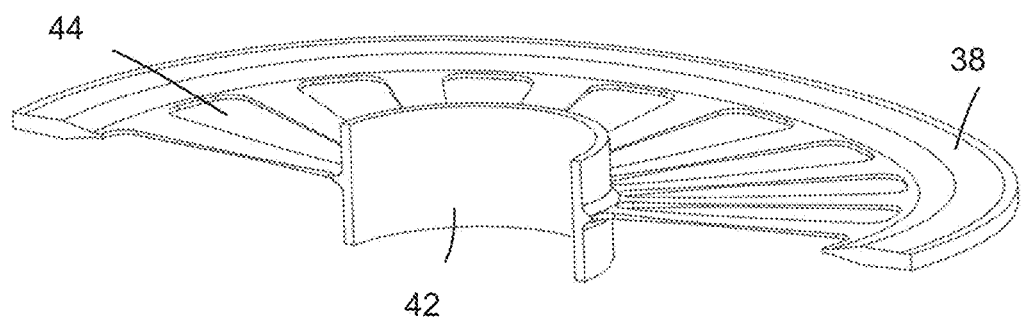
FIG. 30 is a section perspective view of the embodiment of FIG. 27.
Figure 31:
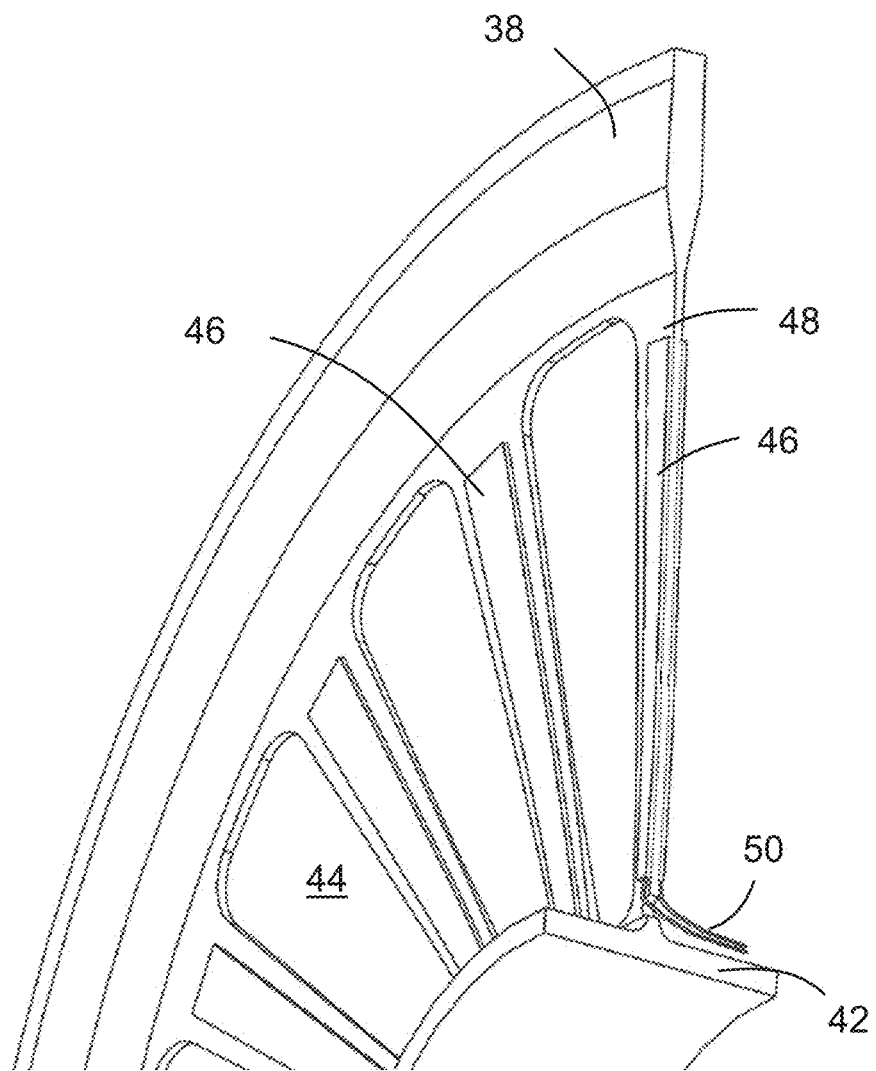
FIG. 31 is a section perspective view of the embodiment of FIG. 27 with piezo strips added to propagate the wave.
Figure 32:
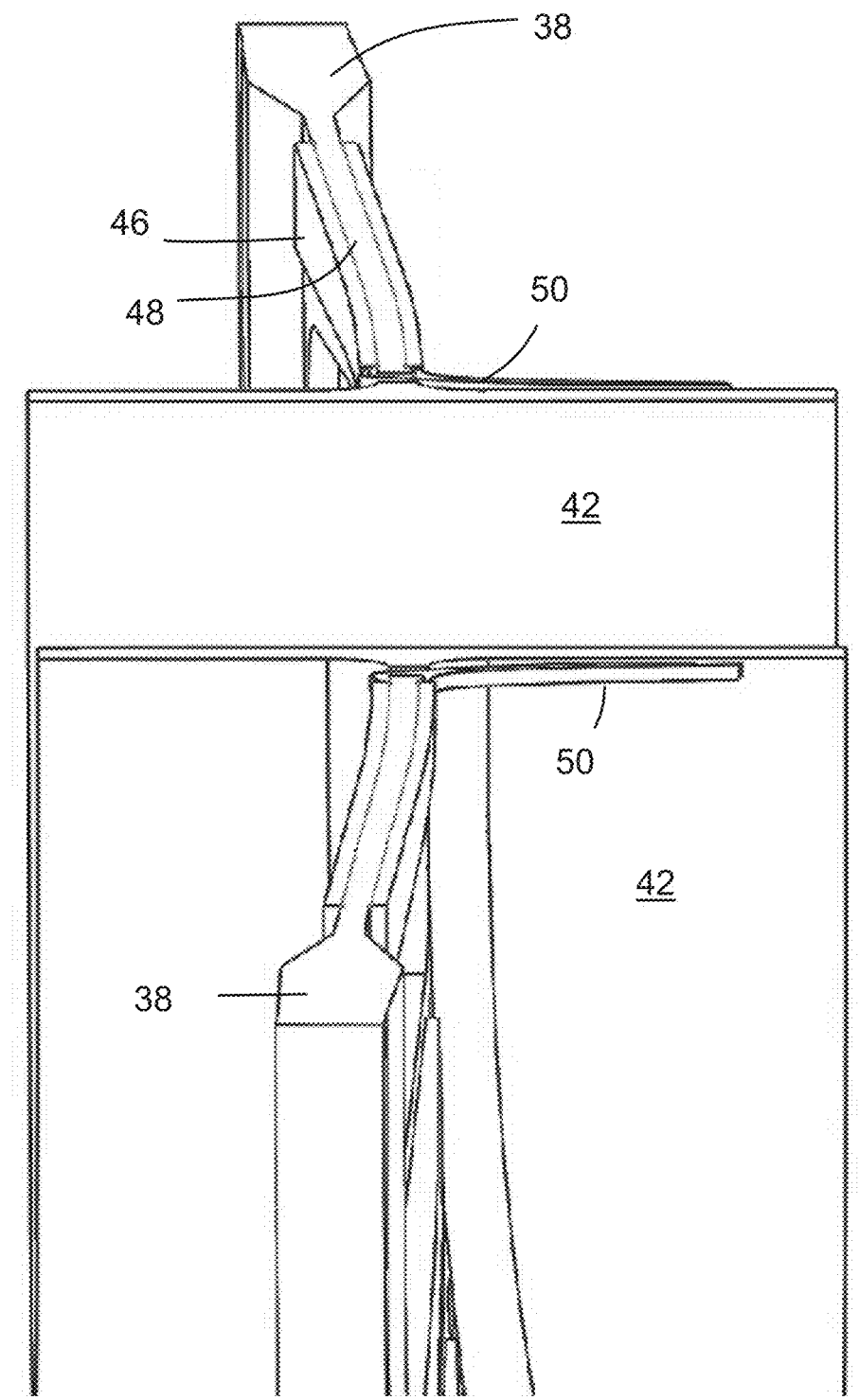
FIG. 32 is a cutaway perspective view of the embodiment of FIG. 31 showing the maximum elastic bending deflection of the spokes.

FIG. 25 shows the disk with eleven waves and with the axial load members constraining the disk. The axial load members are preferably shaped to allow unimpeded rolling wave contact propagation with minimal sliding. This allows the axial load members to act as output members to provide output rotation and torque for a variety of applications. The axial load members would typically act as output rings and be fixed to a housing member (not shown). FIG. 26 shows a section view of FIG. 25.

In the exemplary embodiment of FIGS. 27-30, the inner disk area has cut-outs 44 that allow the inner disk area to be more flexible. This reduces the forces on the OD ring that would prevent it from buckling. A limitation of the cut-outs is the reduction of toque transfer capability though the spokes to the ID hub, so this must be designed with the maximum torque requirement in mind.

The example in FIGS. 27-30 is shown as a two wave disk shape, but it can also be preloaded into a shape with a greater number of waves.

An exemplary method of propagating the wave form is shown in FIGS. 31-35. An array of electro-reactive strips 46 such as but not limited to piezo ceramics are fixed to one or both side of a disk. These may be in any orientation or angle and may be of virtually any shape as long as they can be energized in such a way as to impart a force on the wave disk that would cause it to propagate the wave to exert torque on the output members. In this non-limited example, piezo ceramic strips are adhered to the spoke blades 48 on both sides of the disk. The piezo strips are energized alternately from one side to the other to impart local radial bending moments on the disk. The piezo strips are preferably wire connected near the ID hub where the movement is minimal to reduce fatigue stress on the wire and connections.

The piezo (or other active material) strips or patches (or areas if the entire surface is covered with a piezo coating or disk) are commutated in a way that exerts a similar axial force on all of the waves at the same time. This force may not be very large (e.g., 0.5 newtons per strip on an 8" diameter disk) but the very high reduction ratios that are possible with this device and the low friction that is possible form a pure rolling contact between the disk and output members allows a high number of piezo strips to actuate at high frequency to produce a large amount of input power per revolution of the output members. Wire connections 50 connect the piezo strips to a power source.

Figure 33:
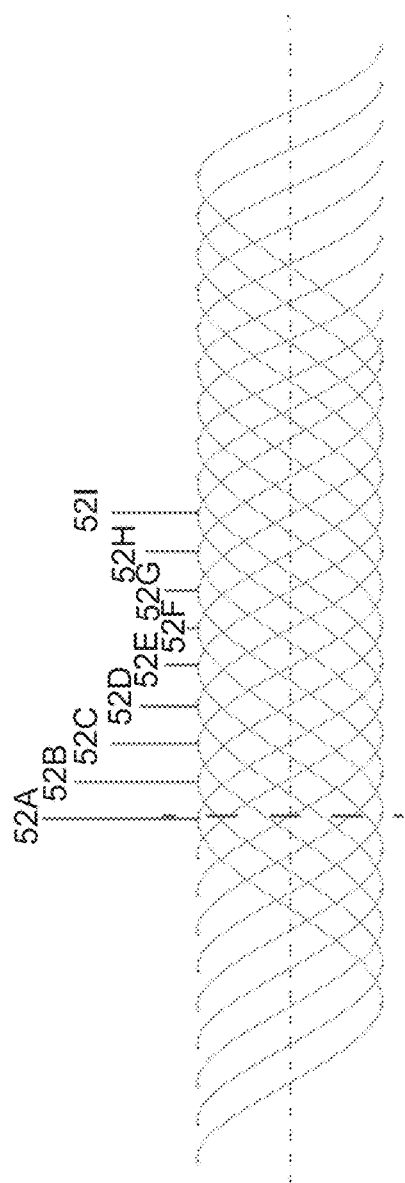
FIG. 33 is a graph showing the change in voltage over time at different poles of the device of FIG. 31 during commutation.
Figure 34:
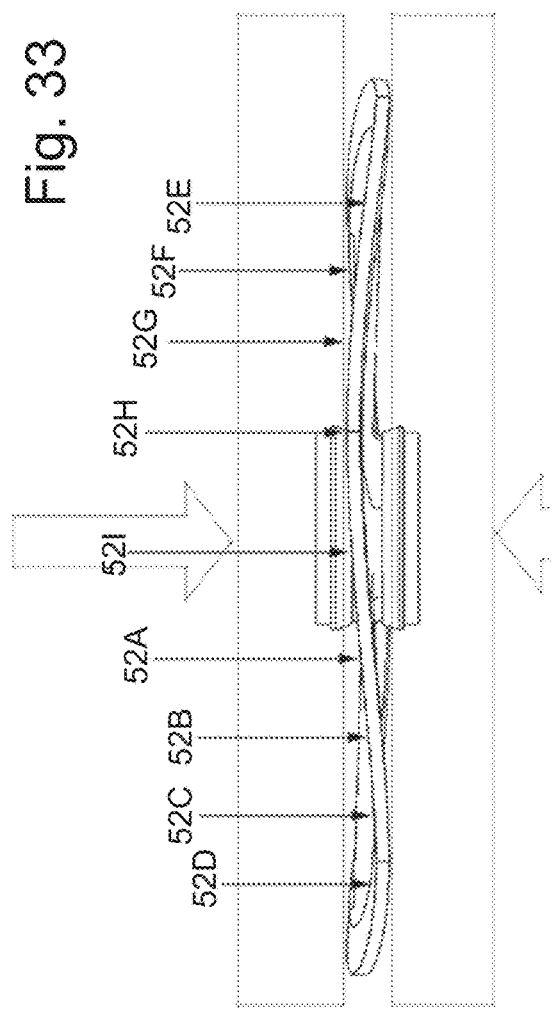
FIG. 34 is a radial view of the device of FIG. 31 showing the positions of the poles at the time indicated by the dashed line in FIG. 33.

The commutation of the piezo strips can be done a number of different ways such as but not limited to overlapping +- voltage sine wave forms as shown in FIG. 33. FIG. 33 is a graph showing applied voltage versus time for the different poles indicated by reference numerals 52A-52I. Each sine wave shown could also be a non-sine-wave shape, but simple sine waves are shown for simplicity. The commutation strategy represented by FIG. 33, while shown for piezo control, could be used for magnetic control or many other types of actuation means. FIG. 34 shows the position of poles 52A-52I on the wave disk in this example, at the point in time marked by the vertical dashed line in FIG. 33.

Each curve in FIG. 33 could represent the driving current (if, for a non-limiting example, the controller is driving an electromagnet array which is attracting and repelling an array of permanent magnets attached to the wave disk). If driving a piezo ceramic array on a wave disk, the waves shown in FIG. 33 could represent the voltage applied to each pole. A pole can consist of more than one magnet or piezo or other type of actuation means. The non-limiting example of FIG. 33 has nine poles corresponding with 18 piezo strips on both sides (total of 36 strips per disk) of a wave disk that is axially constrained to produce a three wave shape. With piezo strips on both sides of a three wave disk, one pole will preferably drive three equally spaced strips (at 120 degree increments) at the same polarity on one side of the disk, and for wiring simplicity, three piezo strips directly opposite (axially aligned) in whatever polarity necessary to produce the opposite axial deflection. Thus, both piezos in each pair of piezos have a radial section of the disk sandwiched between them and work to deform the disk in the same direction when energized with either a positive and negative polarity respectively. The first pole, indicated by reference numeral 52A in this example, would be at max positive voltage while the sixth pole, indicated by reference numeral 52F, would be at max negative voltage and pole 8, represented by 52H, would be at zero voltage at a wave apex and so on.

It should be noted that these same (or separate) piezo actuators (or other sensors such as strain gauges) attached to the disk can be used as sensors to provide the controller with information about the shape of the wave disk and the position of the waves. This data can be used, for example, as a wave disk encoder by sensing wave propagation angle, or to sense torque on the actuator (based on the asymmetrical deformation of the wave form).

It should be noted that many other control strategies or numbers of poles are anticipated by the inventor. This is only given as a non-limiting example of how the wave disk wave propagation can be accomplished and controlled.

The controller could be in many different configurations but could comprise, for example, a CPU that provides a variable voltage to an array of poles based on a programmed torque and/or motion requirement and feedback information from position sensors in the actuator.

Figure 35:
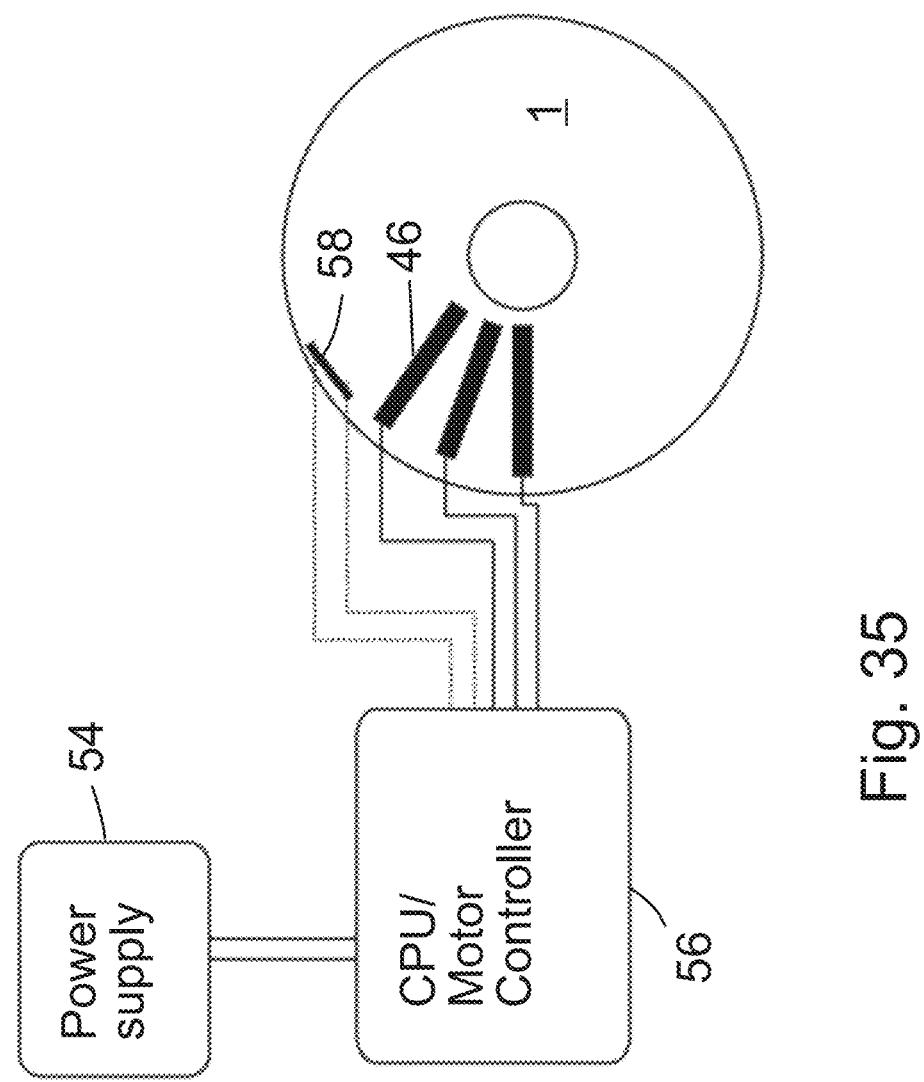
FIG. 35 is a simplified schematic diagram showing an embodiment of a control system to propagate waves on a wave disk.

FIG. 35 shows a simplified schematic of a non-limiting example of one of many ways the present device could be controlled to propagate the waves on the wave disk 1. A power supply 54 provides electrical power to the CPU/motor controller 56 which provides variable voltage to an array of piezo actuators 46 (only three shown here but any number could be used). The position of the waves and the torque on the wave disk can be sensed by one or more strain gauges 58 or other sensors (including, possibly, the use of the piezo or other type of actuators, which may be capable of sending a feedback signal to sense their deflection).

If a traction drive torque transfer is used with this device, it is preferable to have an encoder between the input and the output. This encoder can be relatively low resolution if the preload of the traction surfaces is adequate to provide predictable motion transfer over a range of speeds and torques and temperatures. To maximize the precision and the accuracy of the output based on a digital output encoder, for a non-limiting example, the high resolution feedback from one or more strain gauges on the wave disk would provide resolver-type of feedback to the motor controller. This feedback will tend to be very sensitive with regard to changes in wave disk shape but it will drift relative to the output rotation due to slippage between the wave disk and the output races. Due to the repeatable nature of this device, this slippage % can be measured empirically under a range of operating conditions and used to predict the amount of slippage between the wave disk and the output rings under various conditions as sensed by sensors on the disk and in the actuator.

Using a combination of sensors in this or a similar way will allow very precise control by monitoring the strain gauge or piezo (or other proportional sensors) and by resetting or recalibrating the position at every digital pulse feedback signal from the lower resolution output encoder.

Figure 36:
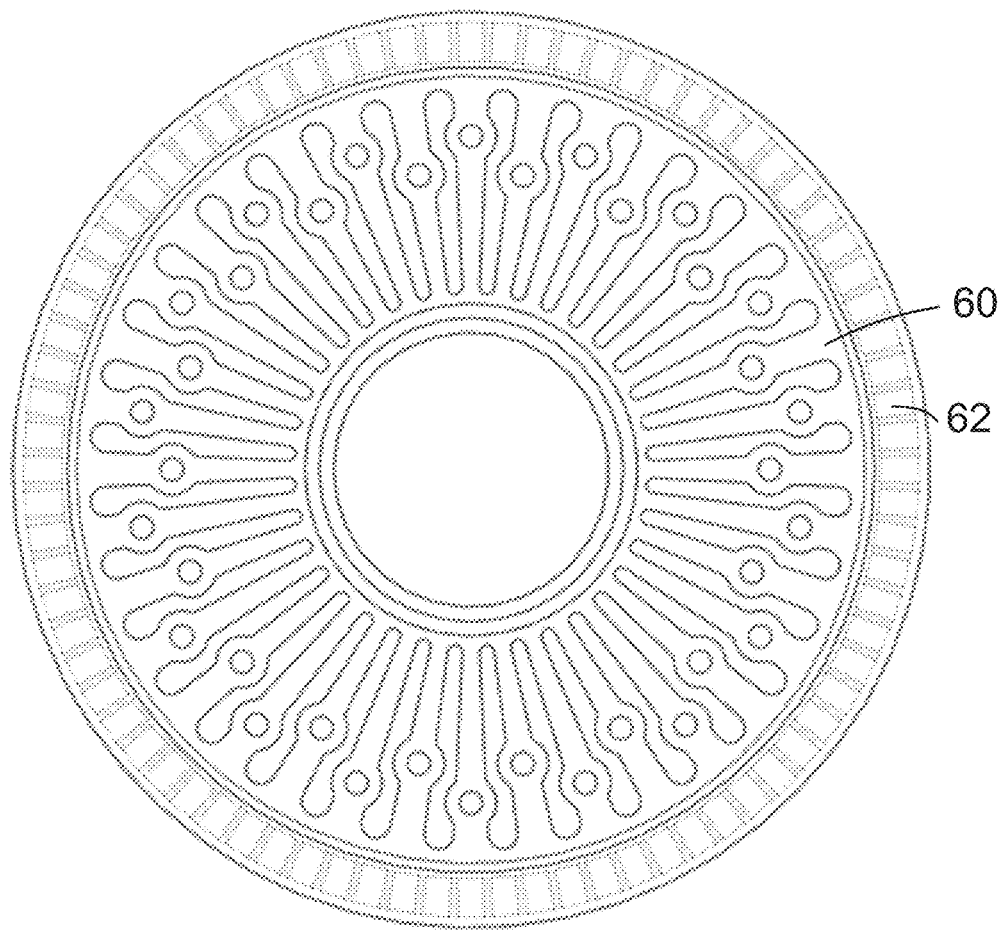
FIG. 36 is an axial view of an embodiment of a wave disk using injection molding with lower CTE inserts to achieve a wave shape when the disk cools before removal from mold.

An example of a low cost embodiment is shown in FIG. 36. It uses an injection molded disk 60 which is preferably made of a material that has a high shrinkage percentage when demolded. An array of more rigid (in compression) inserts 62 are molded into the ring during injection molding. These plugs can be of any material including permanent magnet material.

Figure 37:
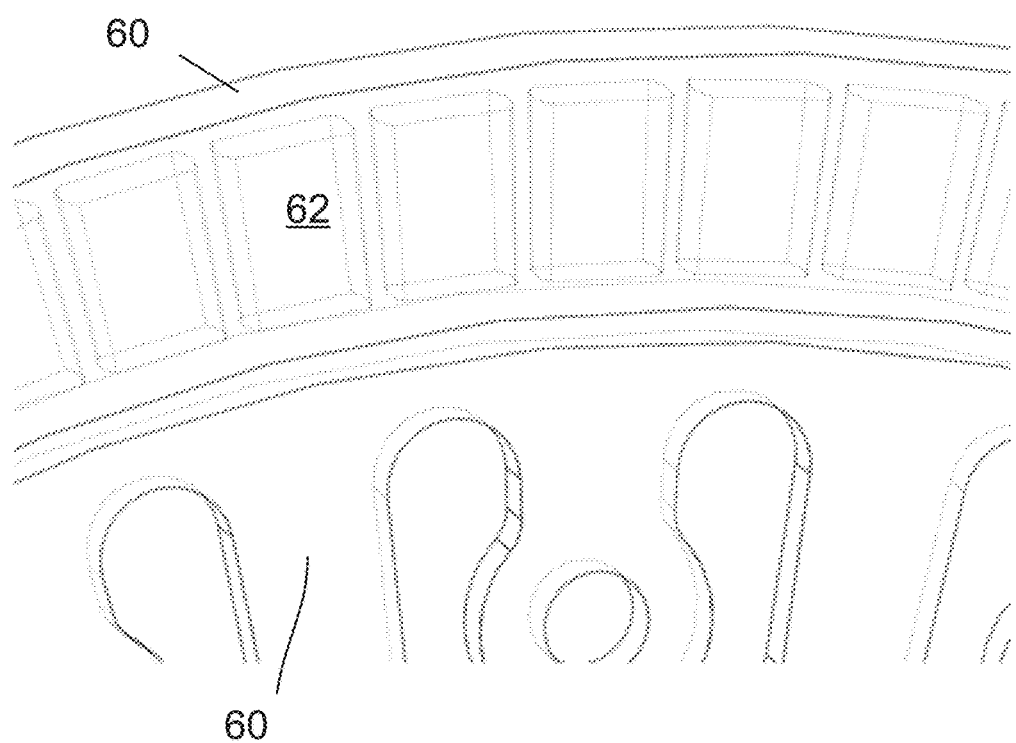
FIG. 37 is a close-up perspective view of the outer diameter ring of the embodiment of FIG. 36 with hidden lines visible to show the lower CTE inserts.

When demolded (preferably after the part has cooled to room temperature in the mold), the contraction of the disk material will cause the circumferentially more rigid (in compression) OD ring to buckle circumferentially. FIG. 37 shows a close-up view of the imbedded inserts with hidden lines made visible.

If permanent magnets are used for the inserts, they can possibly be magnetized after demolding to make assembly easier.

Figure 38:
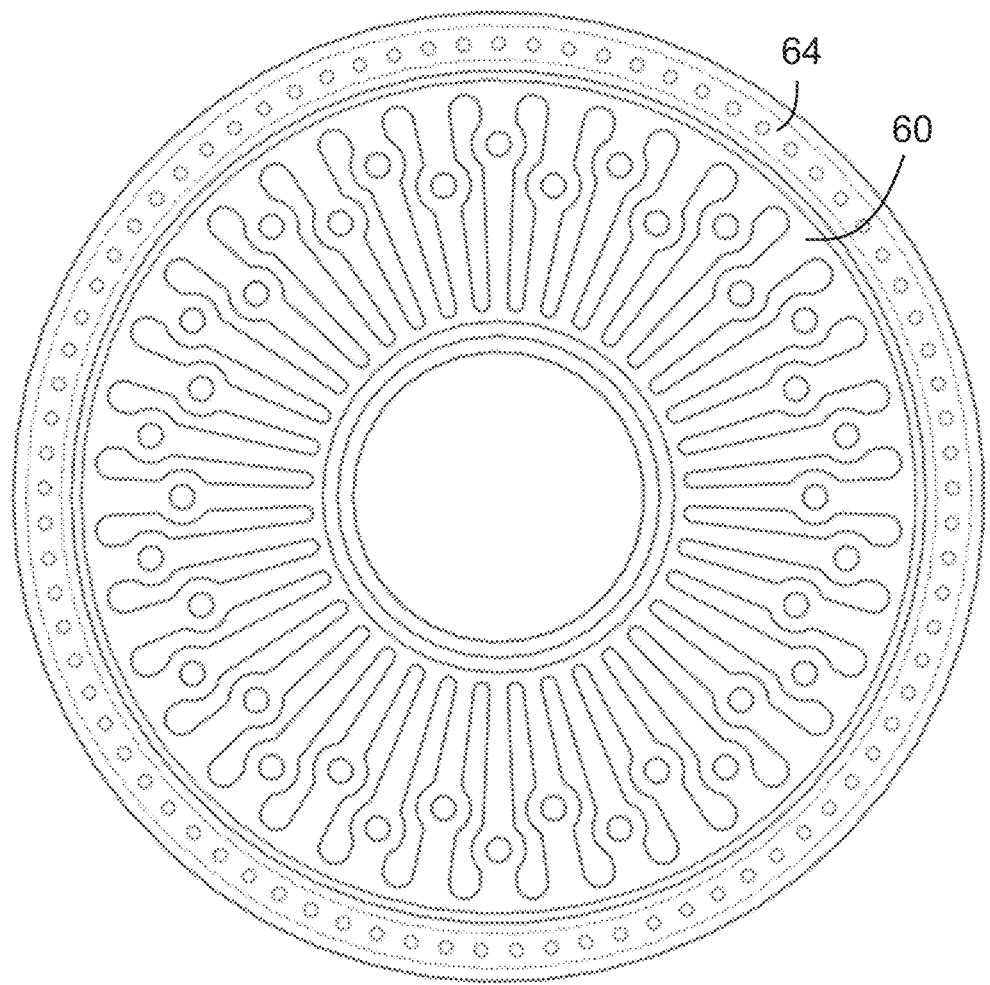
FIG. 38 is an axial view of another injection molded embodiment containing a continuous ring insert with a lower CTE than the injection molded ring.
Figure 39:
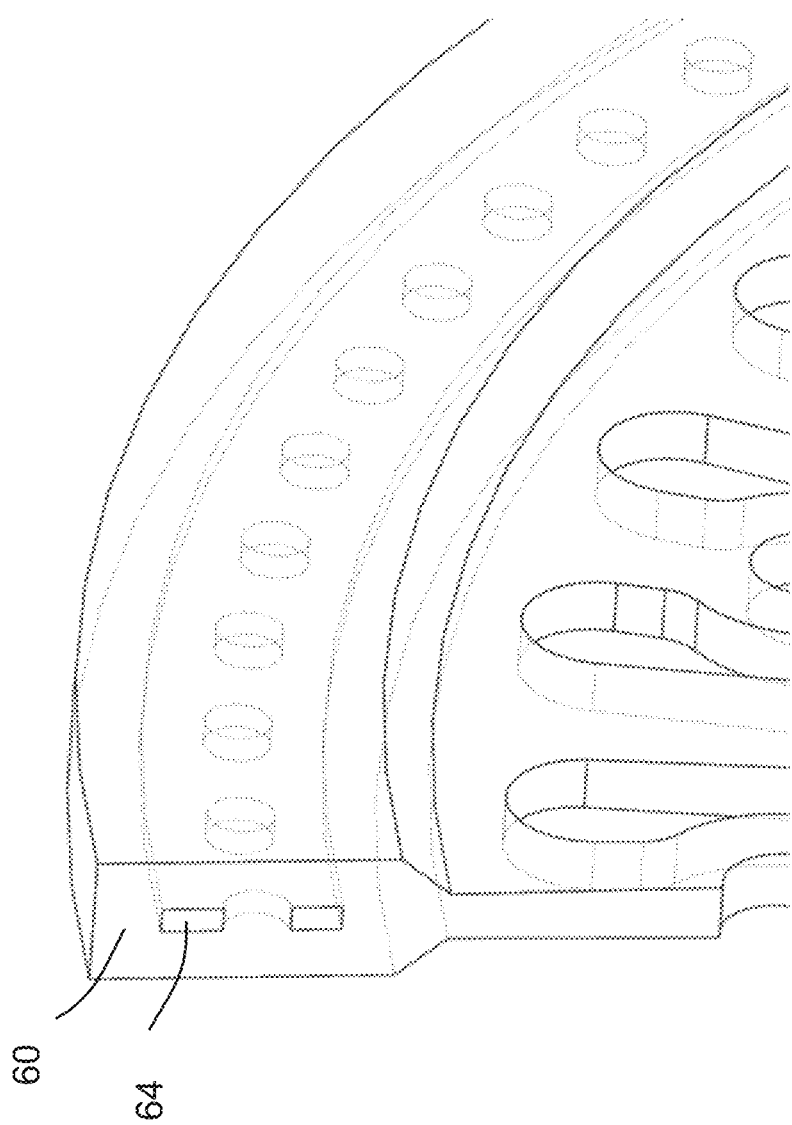
FIG. 39 is a close-up perspective section view of the embodiment of FIG. 38 showing the insert.

The inserts can be contacting or not contacting depending on the various material properties. The inserts may also be a single piece of material such as a ring 64 of steel or titanium etc. as shown in FIG. 38 and in closeup in FIG. 39. The insert ring 64 is stiffer in compression circumferentially and has a lower coefficient of thermal expansion (CTE) so when the disk cools after injection molding at high temperature, the surrounding plastic contracts and causes the inserted disk, which may be made of spring steel, for example, will buckle circumferentially to create the wave form.

Figure 40:
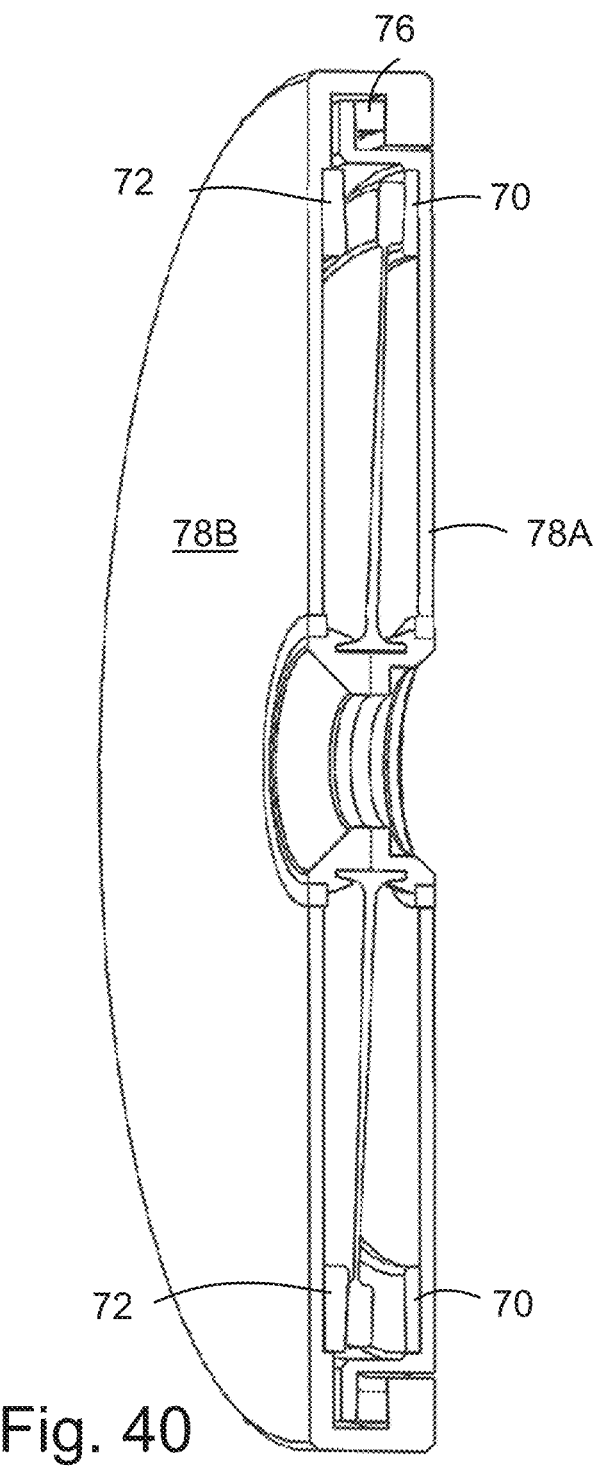
FIG. 40 is a perspective section view of an embodiment of a wave disk with an asymmetrical outer diameter ring allowing torque transfer between different sides of the housing.
Figure 41:
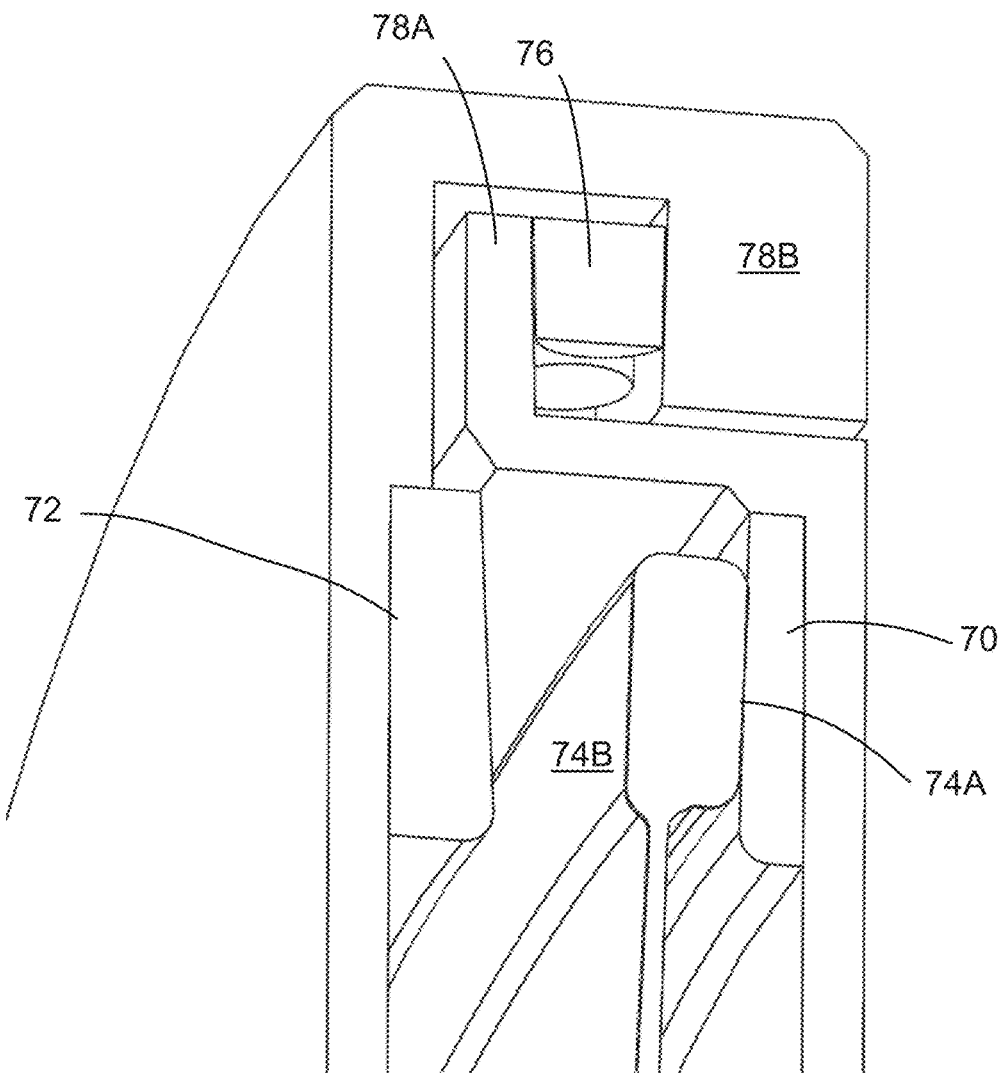
FIG. 41 is a close-up section view of the embodiment of FIG. 40.

A non-limiting example of an asymmetrical embodiment of the present device is shown in FIG. 40, with a close-up view in FIG. 41.

In this embodiment the torque transfer from reference member 70 to output member 72 is from one housing side to the other, instead of from the wave disk to a housing member. The wave disk is still transferring the torque from the reference member contact surface to the output member contact surface, but it is not rigidly attached to either.

With this embodiment, one of the contact surfaces 74A is constructed to allow greater circumferential length change for a given bend radius as compared to the other contact surface 74B. This differential circumference length change can be accomplished in a number of ways. Non-limiting examples include non-circumferential grooves that are deeper in one surface than the other so to allow the segments between the grooves to expand circumferentially more on one side compared to the other. Longer teeth or lobes on one surface can have a similar effect. The position of the inner disk relative to the two axial surfaces will affect the contact surface expansion as well. The surfaces may be traction surfaces or toothed or lobed surfaces. In any case, the difference in the amount of circumferential surface elongation from the contact surface on one side of the disk to the contact surface on the other side of the disk is believed to result in a differential rotation between the reference and output contact surfaces when the wave disk wave is propagated. This differential rotation can be very small allowing for very high reduction ratios and high precision control of the output angle.

Ratios of 1000:1 or more are believed possible in some configurations.

A thrust bearing 76 is provided between the two housing members 78A and 78B to allow the relative rotation. The wave propagation means is not shown but can be any type disclosed here or other types not disclosed.

Figures 42, 43:
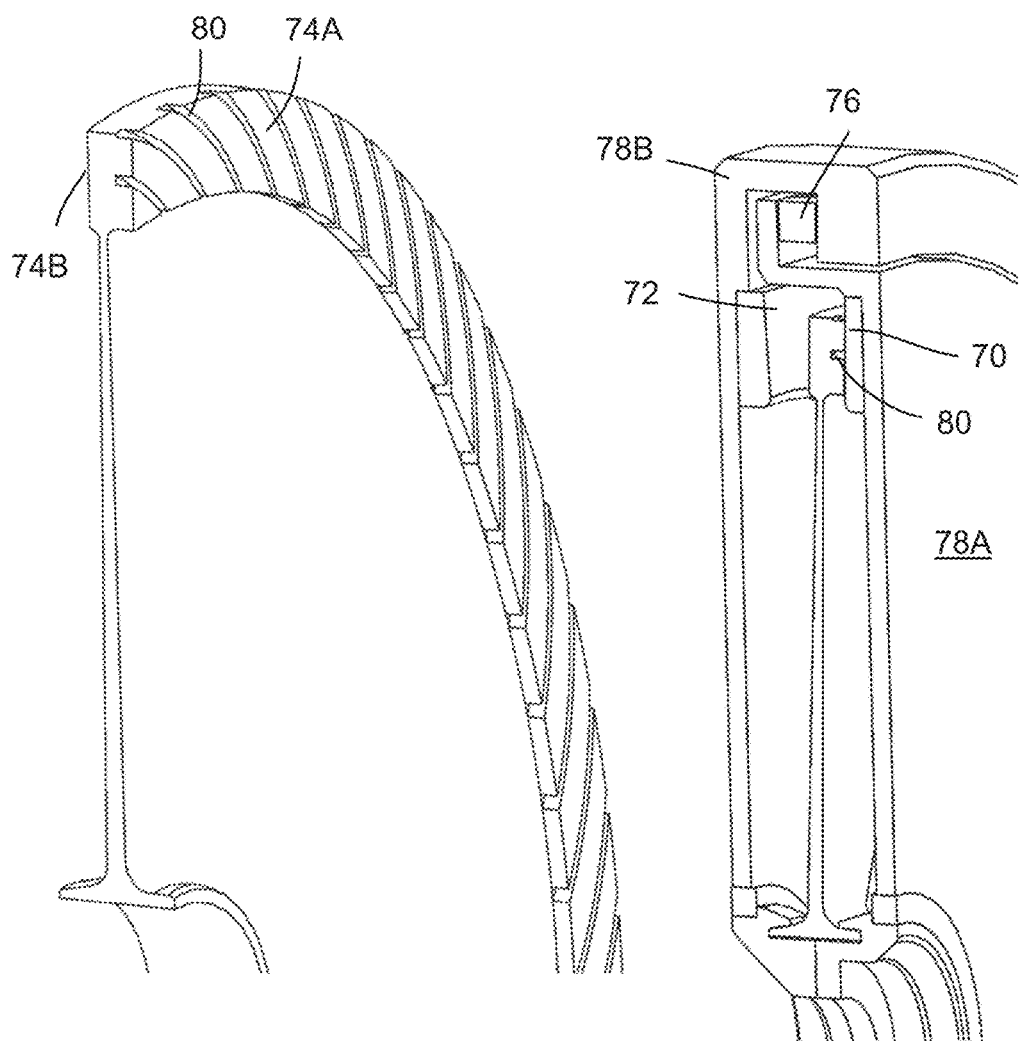
FIG. 42 is a perspective section view of an embodiment of an asymmetrical outer diameter ring having slots to allow circumferential expansion and contraction during wave propagation.
FIG. 43 is a perspective section view of the embodiment of FIG. 42 deployed in the split housing of FIG. 40.

A variation of the differential wave disk of FIGS. 40-41 is shown in FIG. 42 with slots 80 in the greater offset side of the OD ring. The slots can be of any shape including but not limited to radial or spiral as shown here. The purpose of the slots is not to create positive engagement like gear teeth, but to allow greater circumferential expansion of the slotted surface as compared to the non-slotted surface. The effect is believed to be a greater effective length change of the slotted surface as compared to the non-slotted surface for a greater differential effect between the reference race and the output race.

Slots of different depths may be used on both sides. Slots may be on one side or both sides and the disk may be symmetrical or non-symmetrical. The disk may be used, as shown in FIG. 43, in a device otherwise the same as that shown in FIGS. 40-41.

Figures 44, 45:
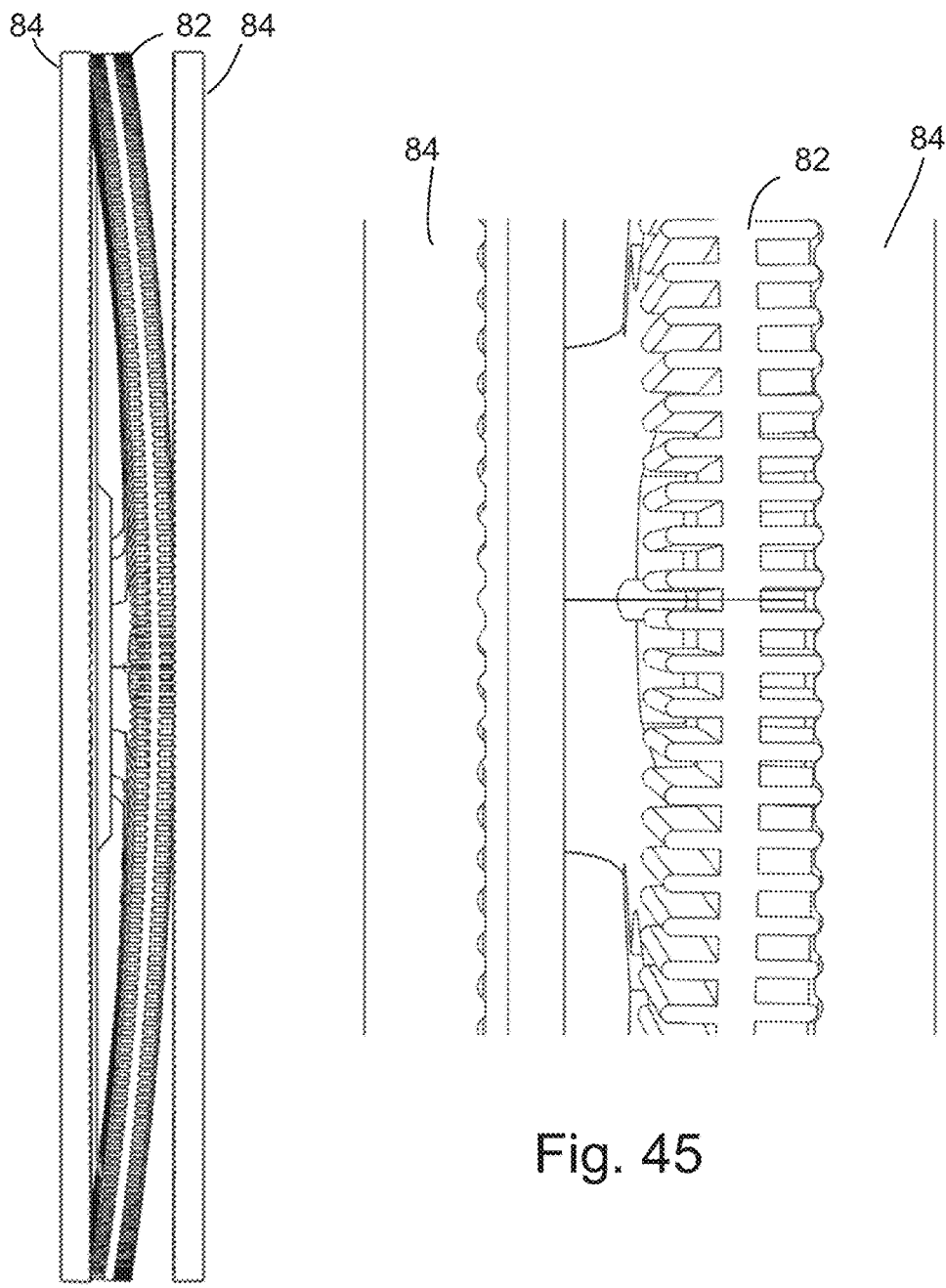
FIGS. 44-46 are an axial, close-up axial and perspective view respectively of a lobed configuration of wave disk and output rings.
Figure 46:
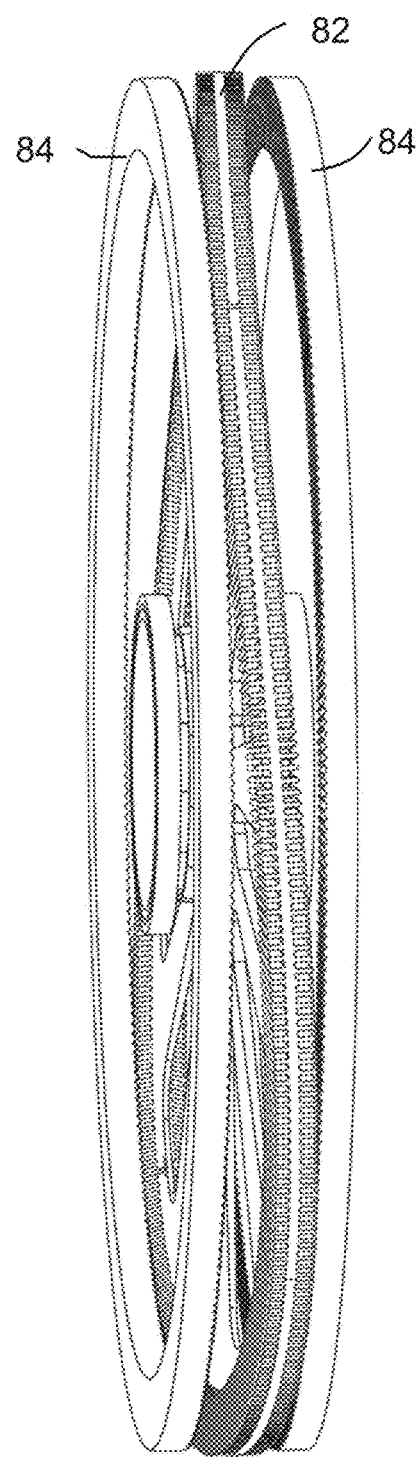

FIGS. 44-46 are some additional simplified partially assembled images of a lobed configuration showing how the wave disk OD ring 82 with lobes skips one or more lobes on the output circular lobe rings 84 with every wave. The disk shown here has symmetrical lobes on both axial contact surfaces but according to the principles of this device as disclosed here, the number of lobes on the two wave disk contacting faces could be a different number and/or they could be different lengths.

Additional Variations

One or more permanent or electromagnets can be attached to a spinning member that is coaxial to the wave disk. The magnets will attract the wave peaks of the disk and cause them to propagate when the magnet disk is rotated. The waves can also be propagated with a contacting roller bearing or bushing. The wave disk waves can be propagated with a noncontacting bearing such as an air bearing or a fluid dynamic bearing. The wave disk waves can be propagated using hydraulic pressure and/or fluid dynamic forces such as with compressible or incompressible fluid inertia or Coandă effects. High elasticity materials with high cycle life may be used such as, but not limited to, Nitinol metal. Nitinol is a nickel titanium alloy, for example in approximately equal atomic percentages. Nitinol or other memory or heat reactive materials can be used to provide very high forces for some applications. This material can be used in a similar way to the piezo actuators described here, or the nitinol can be used as wire spokes that are tensioned like bike spokes to achieve the initial preload and wave shape. Once the wave shape is set, the wires can be heated and cooled to propagate the wave. This may be useful for very large applications where high forces are needed but high speed is not important.

Figure 47:
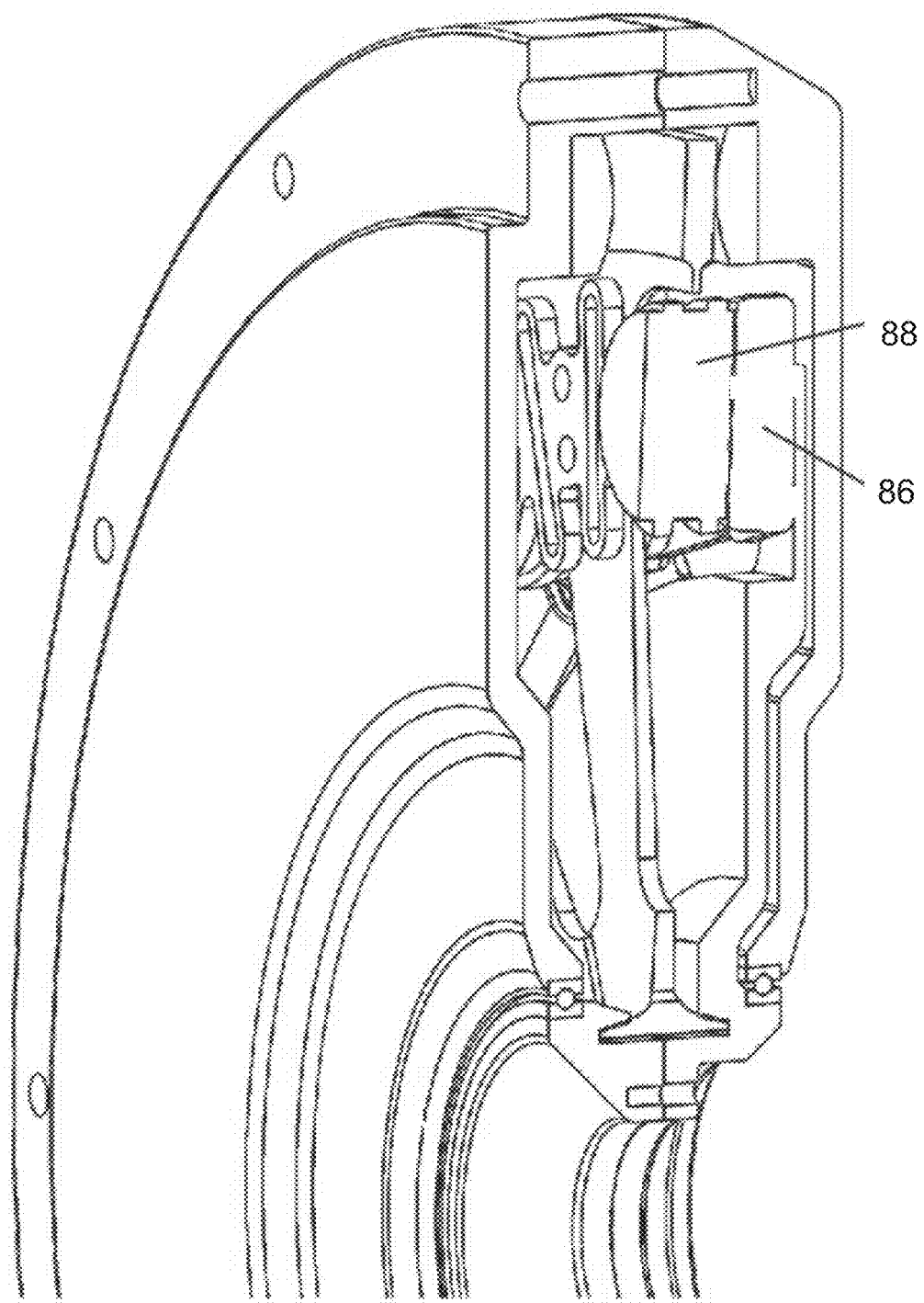
FIG. 47 is a perspective section view of an embodiment with permanent magnets on one or both sides of the wave disk and an array of electromagnetic coils attached to a housing disk.

FIG. 47 shows a non-limiting example of an embodiment with permanent magnets 86 on one or both axial sides of the disk and an array of electromagnetic coils 88 attached to the disk, for example with a flexible ring. This would operate more like an audio speaker with a moving coil with the advantage of potentially lower inertia and faster response time. The permanent magnets may be, for example stationary and fixed to the reference member and/or output member, or they may be attached to the disk hub member.

Many of the variations of the present device that are described here have features that can be applied to other embodiments with different features. This disclosure described examples of the variety of features of the present device in a variety of embodiments and variations so someone skilled in the art can combine the various features with different effects.

Other variations to this device are possible and conceived by the inventor. This disclosure is intended as an overview of the basic working principles and does not describe in detail all the ways these basic principles can be combined or configured.

An example of a variation not illustrated here is a multiple disk configuration where more than one disk are arranged as an axial array. The disks can be in parallel to increase torque or they can be in series to increase reduction ratio.

Many of the same principles described here in relation to wave disks may also be applied to linear actuators or semi spherical actuators.

They may also be applied to a ring actuator with an ID ring that is forged or formed according to the principles of this disclosure with the difference of the radial disk member being in compression loading so as to cause the expanded ID ring to buckle circumferentially. The wave can then be propagated according to any of the methods described for the OD buckled wave disk.

Figures 48, 49:
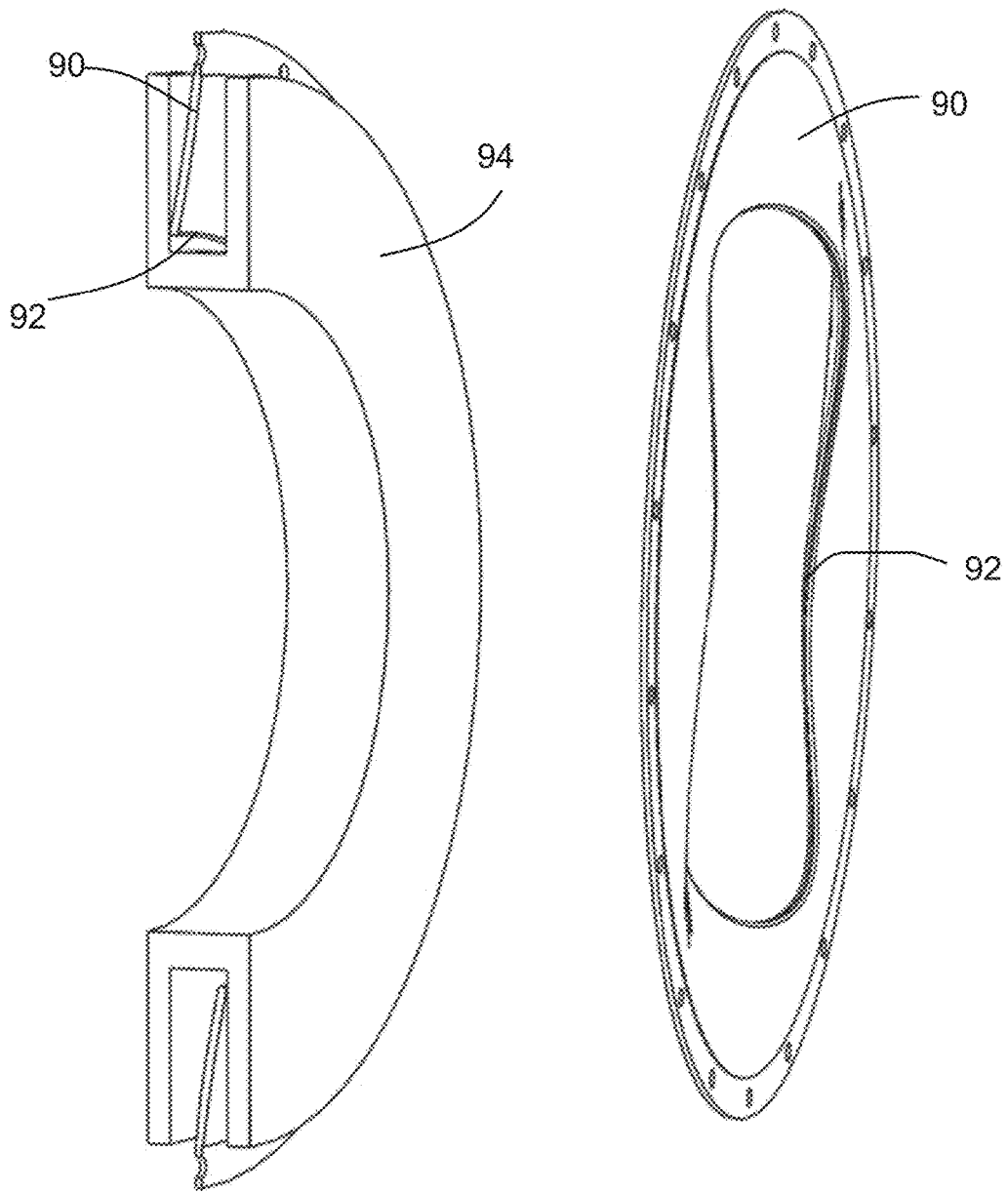
FIG. 48 is a perspective section view of a simplified partial assembly example of a three wave circumferentially buckled inner diameter ring disk, in a housing.
FIG. 49 is a perspective section view of the disk of FIG. 48 without the housing but buckled into a three wave shape as if axially preloaded by the housing.

FIGS. 48 and 49 show a non-limiting simplified partial assembly example of a three wave circumferentially buckled ID ring disk. The disk 90 is buckled on inner diameter 92 and connects to output races on inner housing 94.

FIG. 10 shows a cross section view of a wave disk with two housing contact races that use a circumferentially revolved ridge shape 26 on the disk and matching groove shapes 28 on the housing/output contact surfaces. The purpose of the grooves and ridges is to increase the contact pressure between the disk OD ring contact surface and the output ring contact surface/s through a wedging effect. The disk in this section is shown half way between the two contacts.

It is believed that a high angle will increase the tractive force dramatically and that a locking taper angle may even be beneficial and may work without undue friction due to the radial contracting of the ridges on the disk as they experience the smallest radius wave curvature just before coming into contact with the output contact grooves. This is expected to expand the ridges radially into the groves after contact has been made and before unwanted sliding can occur. When the disk bends again when the contact becomes non-contacting, the radial thickness of the ridges will again contract due to circumferential bending of the ridges, to unseat them from the locking taper engagement.

Figure 50:
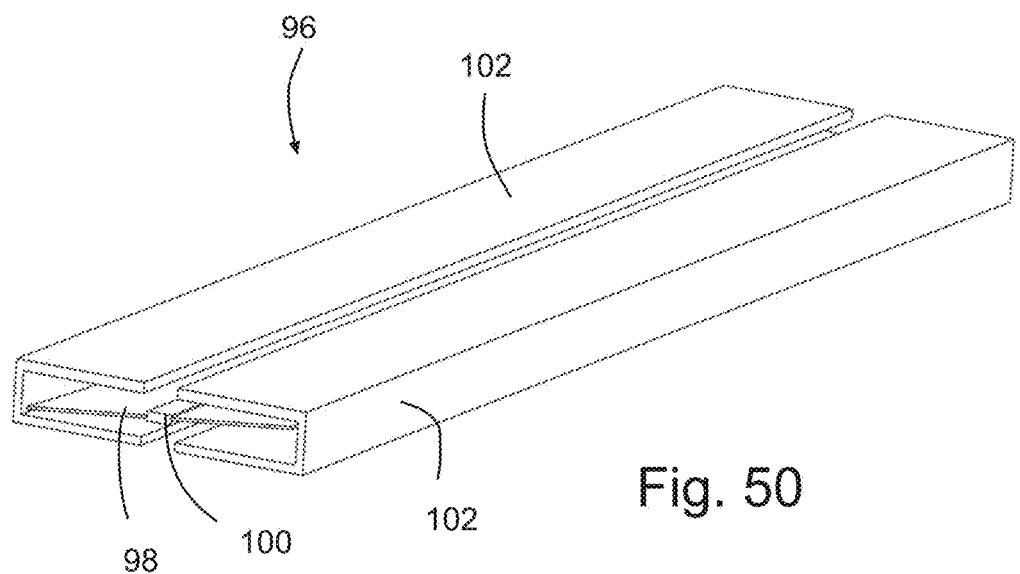
FIG. 50 is a schematic perspective section view of a linear actuator using the principles of the present disclosure.
Figure 51:
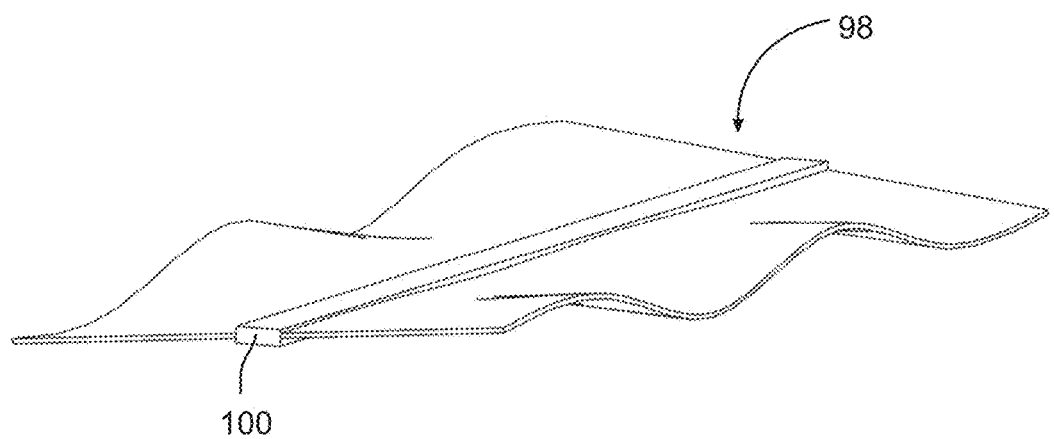
FIG. 51 is a schematic perspective section view of the linear actuator of FIG. 50 showing the wave plate only.

Shown in FIG. 50 is a simplified schematic view of a linear actuator 96 using the principles of the present disclosure. There are no bearings shown. The outer edges of the flex plate 98 are expanded in the linear direction compared to the centerline 100 which is attached to a fixed or reference member. The two housing members 102 are the output members. The waves can be propagated in the same way that the disk waves can be propagated with magnets or piezos etc. The flex plate alone is shown in FIG. 51.

Figure 52:
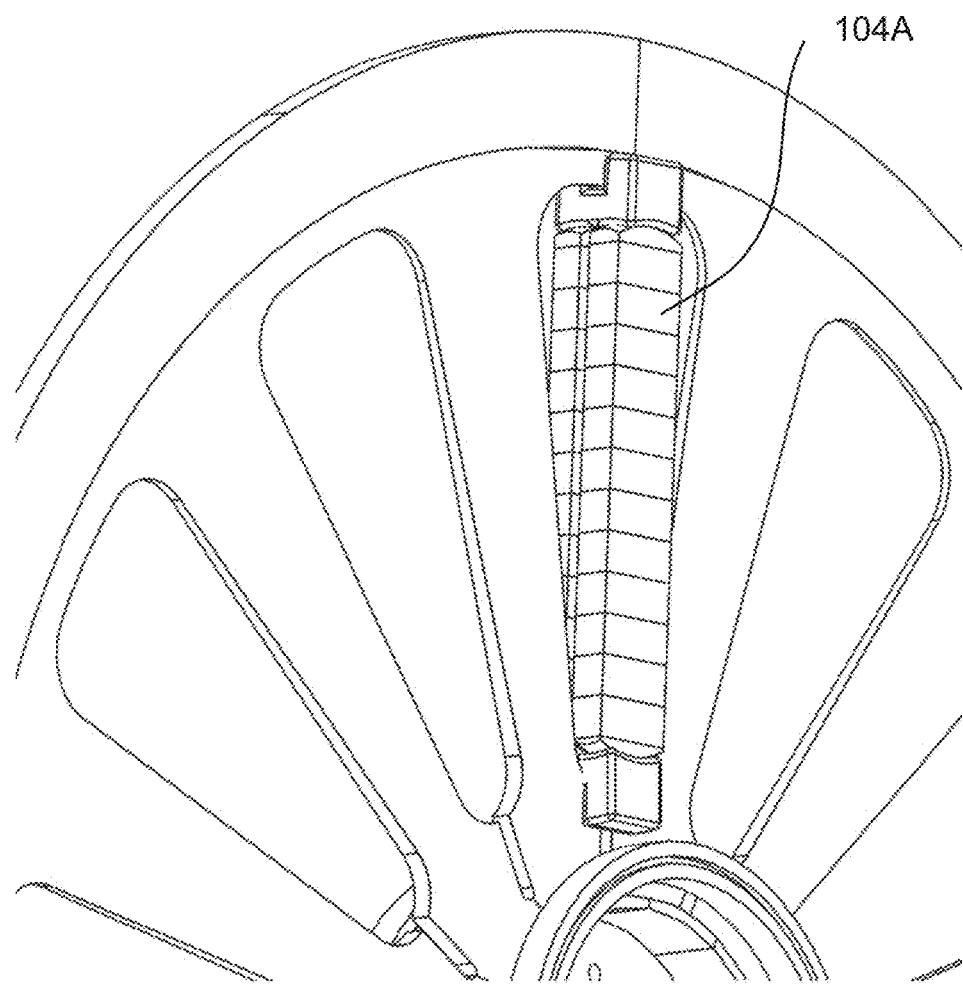
FIG. 52 is a partially assembled, partial perspective view of a wave plate having a stack of radially bending piezoelectric actuators used for commutation which apply an axial force on the wave disk.
Figure 53:
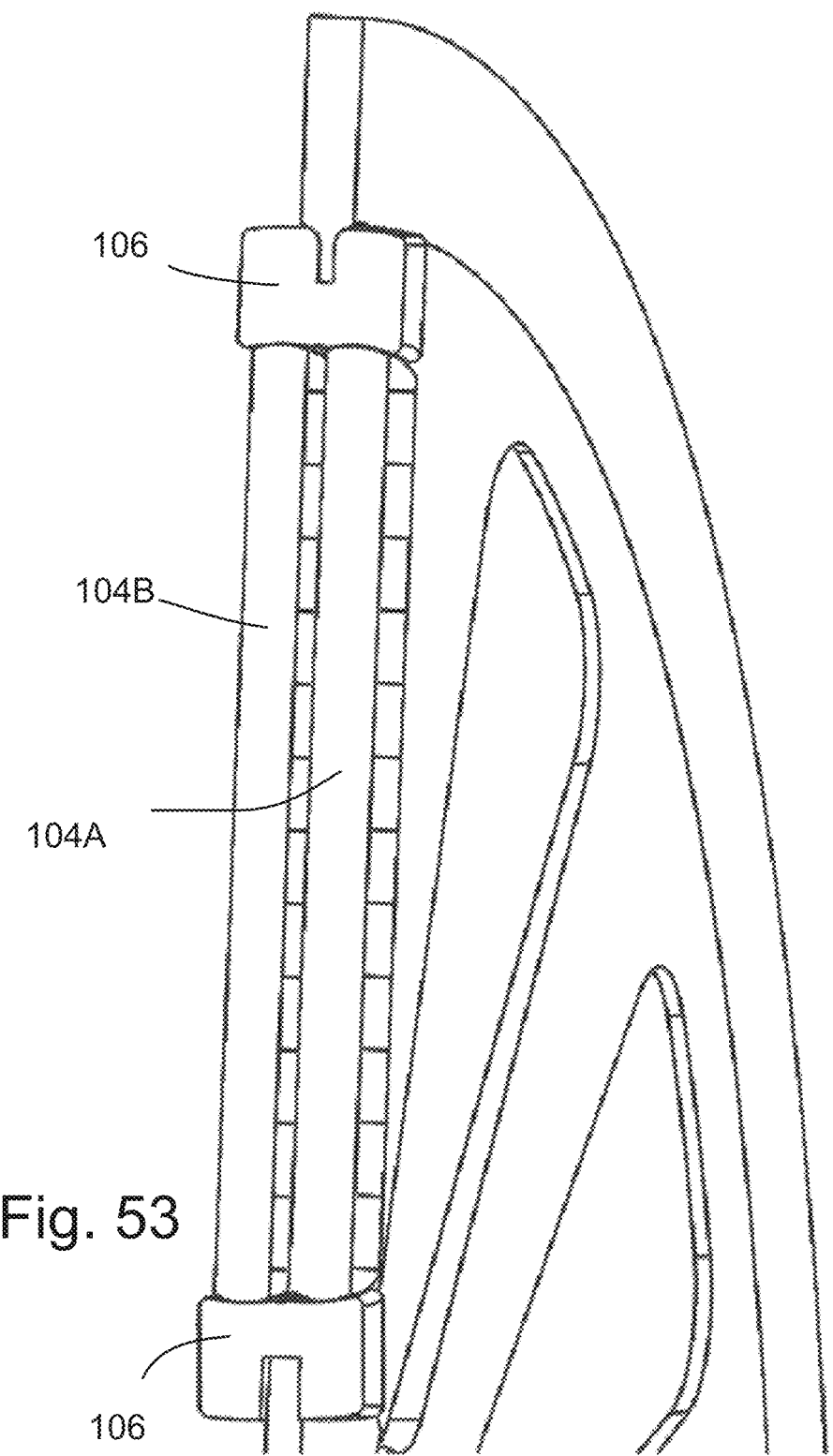
FIG. 53 is a section view of the wave plate and piezo stack of FIG. 52.
Figure 54:
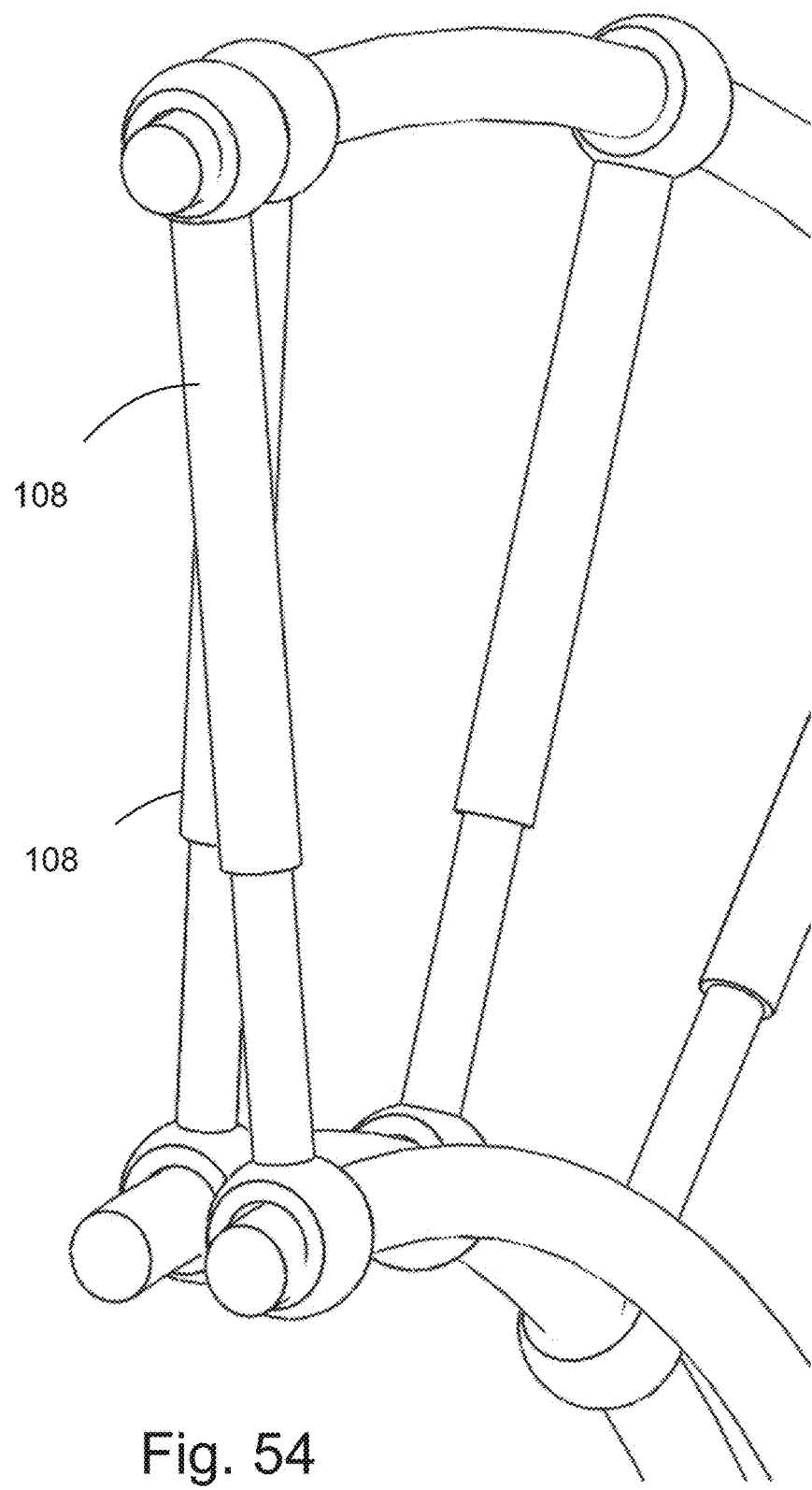
FIG. 54 is a sectional schematic example showing how radially expanding or contracting actuators can expand or contract to produce an axial wave propagation effect.

To exert greater force on the disk with piezo or other active material or other actuation means such as, but not limited to hydraulics or gas pressure, a piezo stack can be placed at a location where the lengthening of a stack will result in an axial movement of the OD ring, as shown in FIG. 52. An opposing stack can be used to provide force in the other direction. Only one set of opposing piezo stacks is shown in this example but an array of piezo stacks (or other actuator means) is preferred. Piezo stack actuators are shown as an example here but any kind of actuator that exerts a linear force can be used in a somewhat radial force angle alignment similar to that shown here. FIG. 53 shows a cutaway view of the piezo stacks, showing more clearly the opposing stacks 104A and 104B. The piezo stacks preferably have convex curved ends to allow angle change with no sliding. The ends 106 of the piezo stacks are preferably semi-spherical, or at least are rigidly or flexibly attached to the disk via concave curvature receiver members receiving convex curvature ends of piezo stacks. An advantage of this configuration of FIGS. 52 and 53 is the elimination of bending displacement on the piezos, as with the bonded piezo strip configurations. This allows much thicker and more powerful piezo actuators that act on the disk by exerting a radial or near-radial force slightly off-center so as to induce axial force on the disk FIG. 54 shows a sectional simplified schematic of a non-limiting example of how one or more actuators 108 of any radially or generally radially expanding type (such as, but not limited to piezo, or hydraulic or gas pressure or any type of electro-active or magnetostrictive or thermal expanding or memory metal material can expand or contract to produce an axial wave propagation effect. The angle of the offset, shown on the ID end of the actuator here, could also be on the OD end or both.

Additional Non-Limiting Examples of Linear Embodiments

Figure 55:
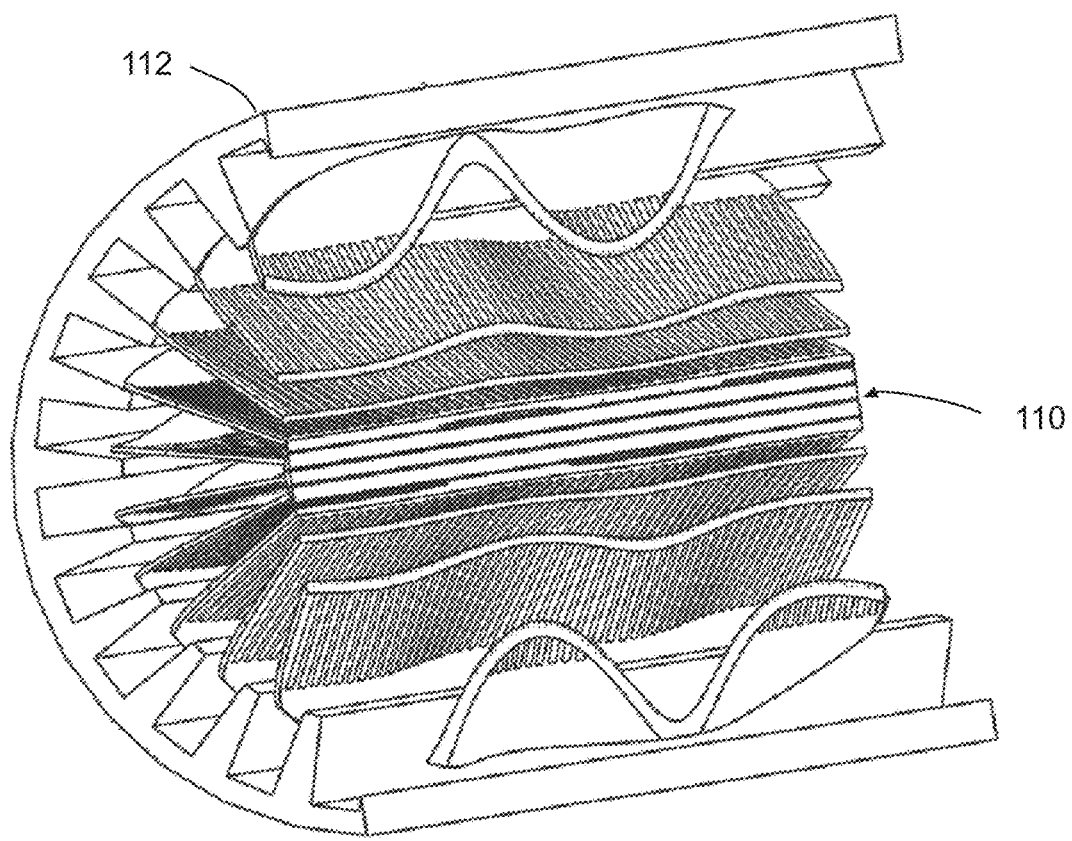
FIG. 55 is a perspective cutaway view of a schematic of a linear wave plate (or foil) with electroactive wave propagating elements adhered to the surfaces of the wave foils.
Figure 56:
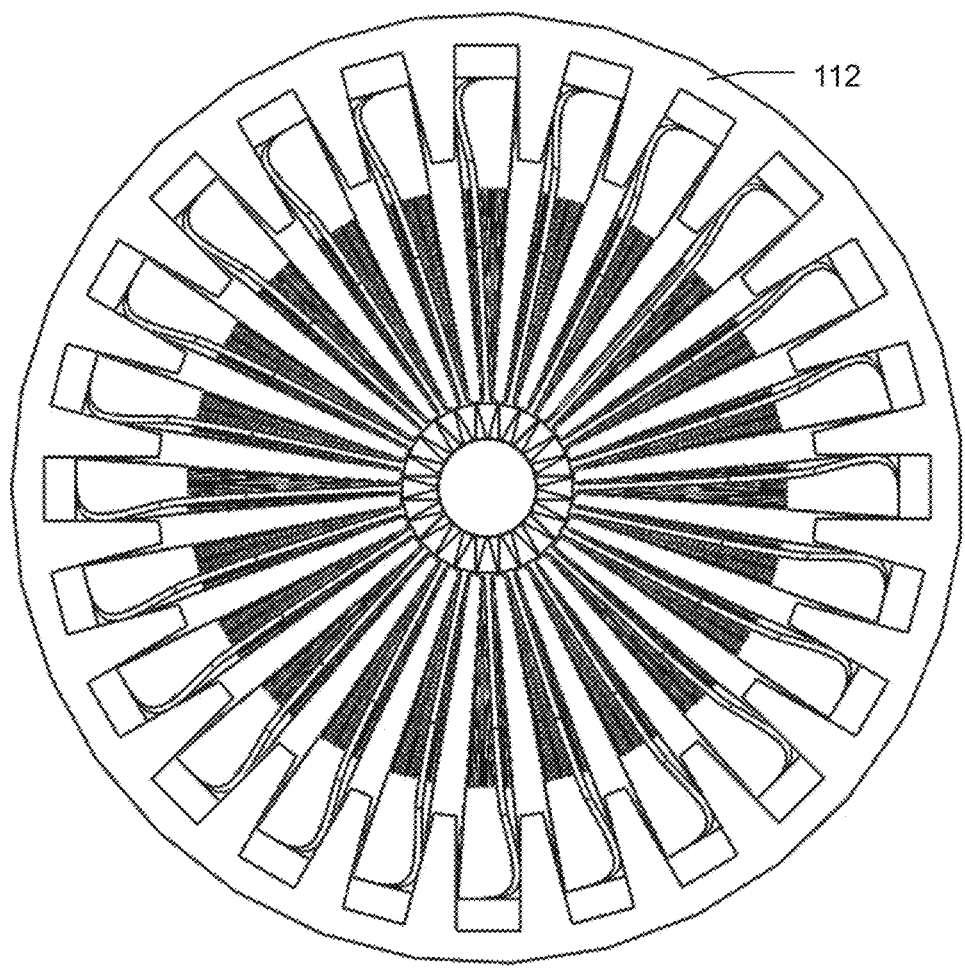
FIG. 56 is an end view of the schematic of FIG. 55.

FIG. 55 shows a simplified schematic non-limiting example of a linear wave plate (or foil) with electroactive wave propagating elements adhered to the surfaces of the wave foils. The foils are arrayed to form a wave plate array 110 around a fixed core and an array of output surfaces 112 moves as the waves on the array of foils are propagated in unison. FIG. 56 shows an end view of the same design.

Figure 57:
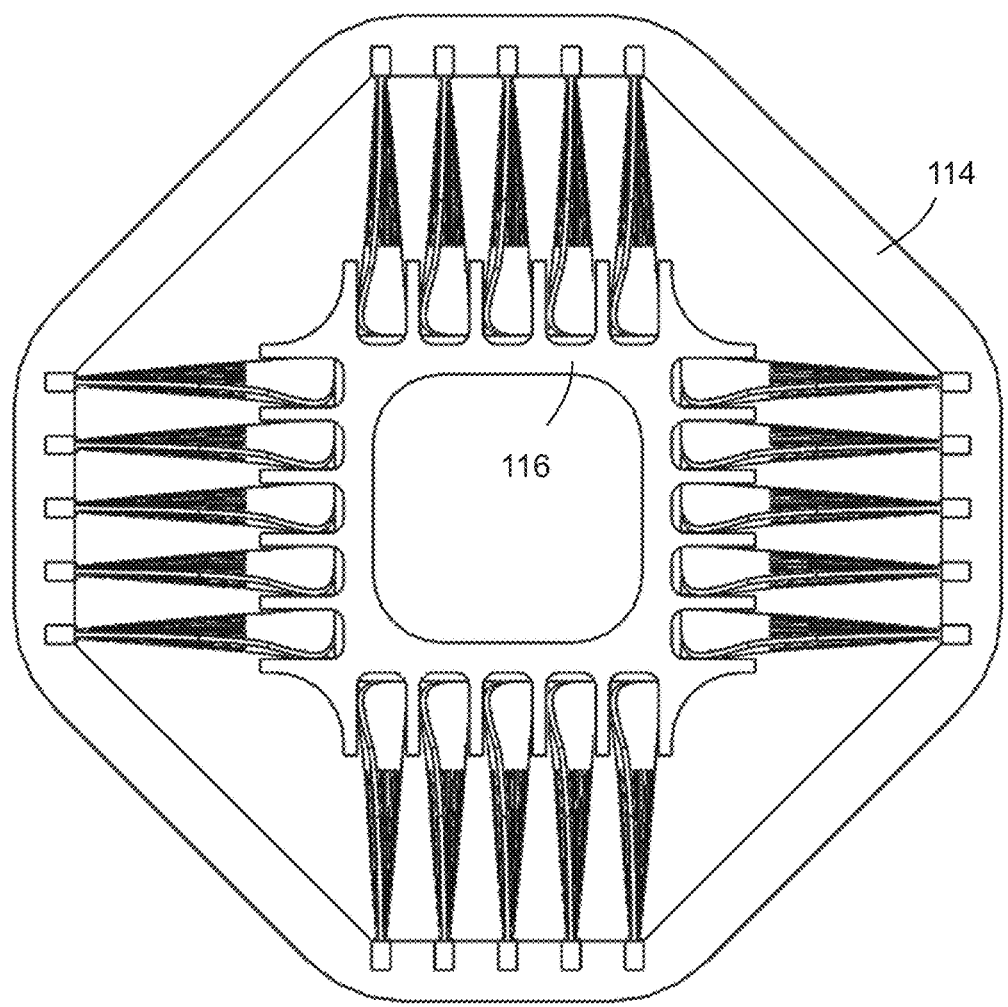
FIG. 57 is an end view of a linear actuator with the wave foils fixed to the outer member.
Figure 58:
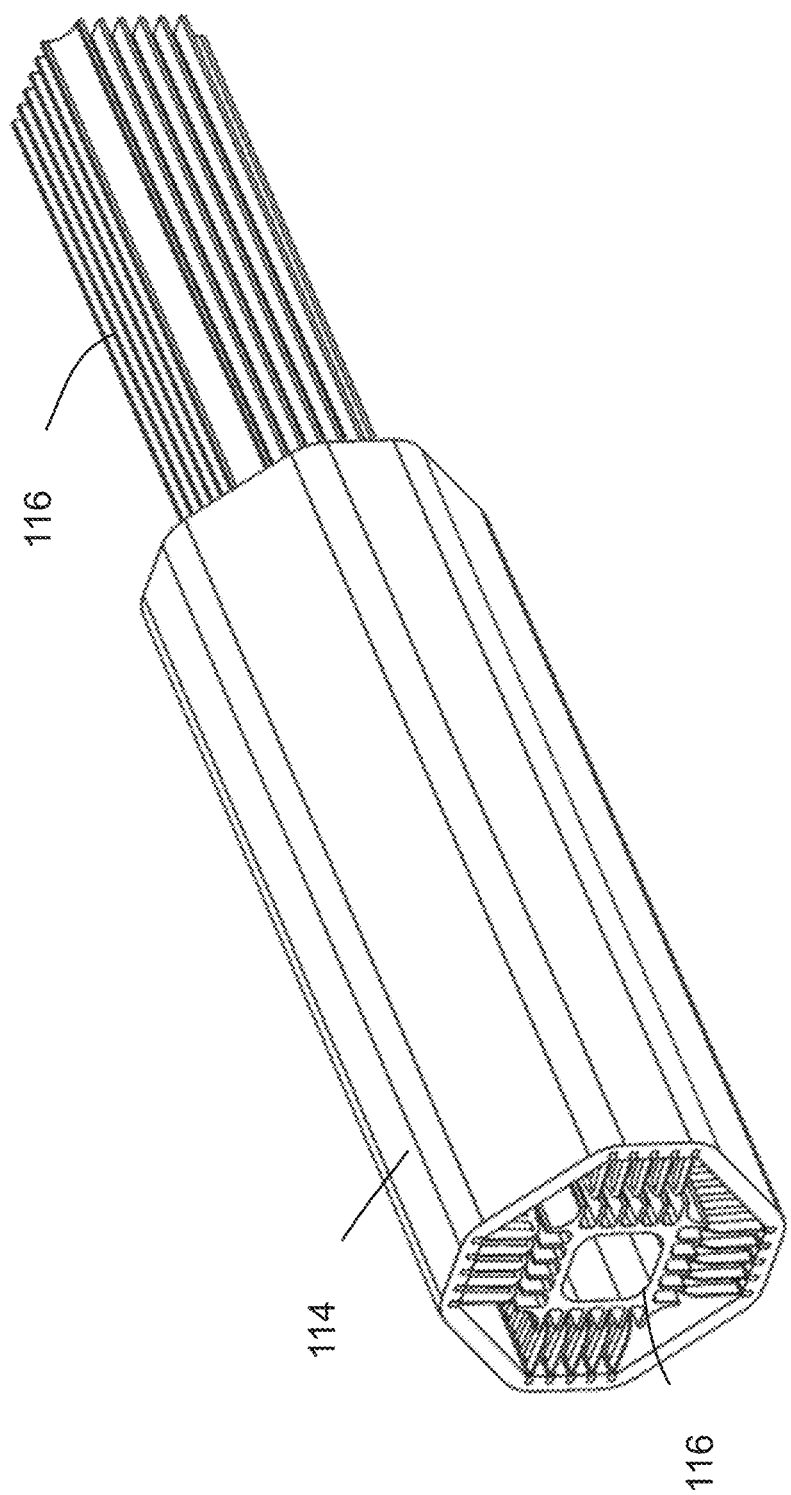
FIG. 58 is a perspective cutaway view of the linear actuator of FIG. 57.
Figure 59:
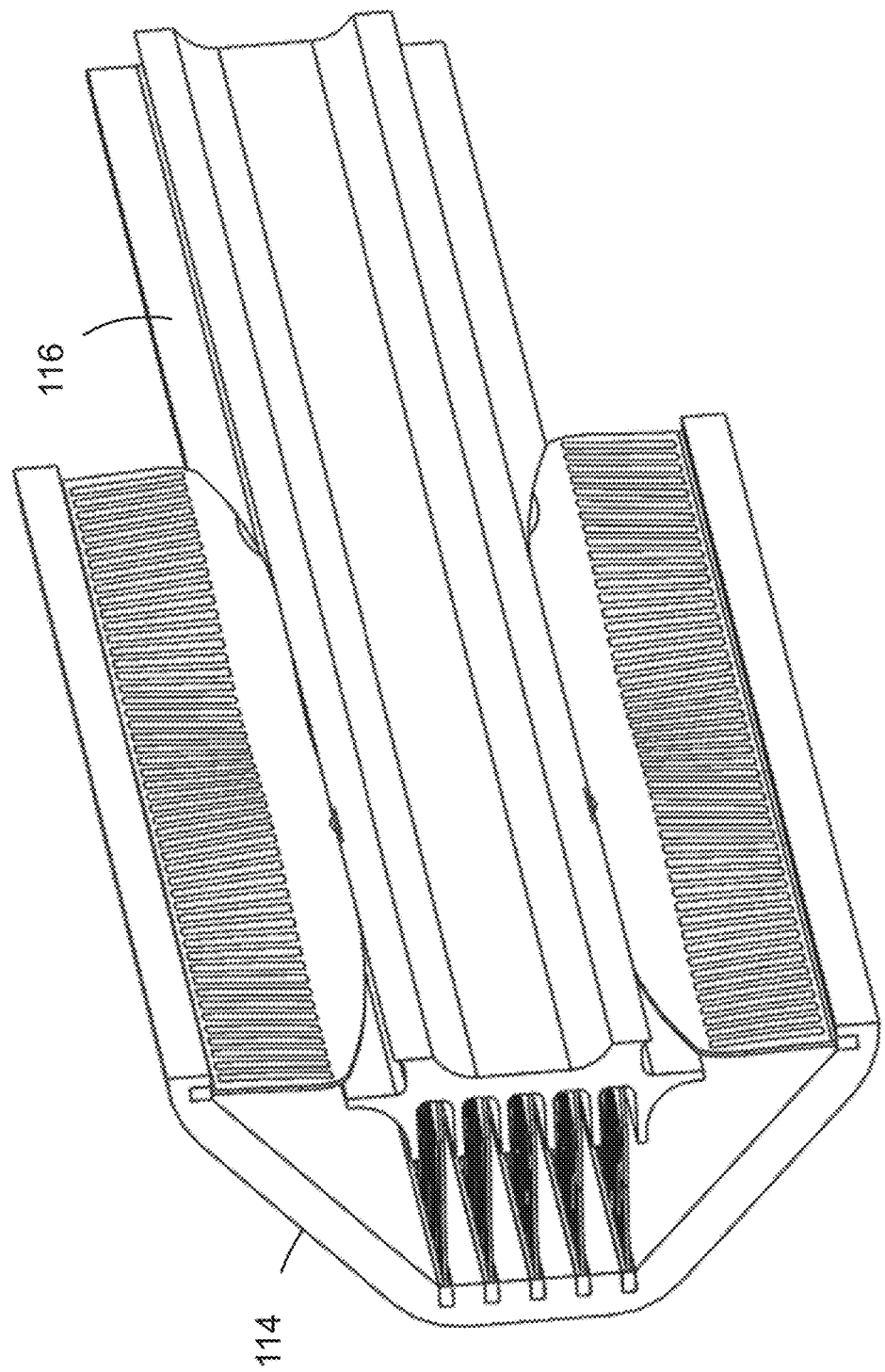
FIG. 59 is a section view of the linear actuator of FIG. 58.

FIGS. 57-59 show a linear actuator according to the principles of the present device with the wave foils fixed to the outer member. There are many ways to configure the various components of a linear embodiment that are anticipated by the inventor. In this example, one or more wave foils are attached to a movable outer member 114 with preferably two or more wave foils situated at an angle to each other (90 degrees is the most effective but other angles can work with different effects) to center the fixed/reference center spar 116 in two planes (each plane being perpendicular to the lengthwise direction of a wave foil).

FIGS. 60 and 61 show a partial view of a simplified schematic of a wave foil embodiment according to the present disclosure. Slots 118 are provided between the active material bending actuators 120 to allow wave creation (according to one or more of the various wave creation structures and methods in this disclosure) with reduced lengthwise bending of the plate where the actuators are attached. In embodiments that use piezo (or other active material) to propagate the wave/s, the actuator is more suited for lengthwise (lengthwise for the actuator, not the plate, in this example) bending than sideways bending. Slots in the foil, similar to those shown here, reduce this sideways bending of the actuators.

Non-Limiting Examples of Semi-Circular Actuators

One or more features of the present device as disclosed here can be applied to a semi-circular device which actuates over a limited angular distance. Here, "semi-circular" is taken not to be restricted to a half circle but to refer to any fraction of a circle. An advantage of such a system is the ability to semi-encircle a structure or body and apply a torque to it. Non-limiting examples include but are not limited to use on an exoskeleton where a semi-circular actuator can semi-encircle the user's joint (such as, but not limited to, a shoulder joint where the actuator can share the same pivot location as the user's shoulder joint. Another example would be a powered open-end ratcheting wrench that only needs 40-70 degrees of rotation to provide the necessary movement.

FIG. 62A and FIG. 62B are a top and end view respectively of the unstressed foil shape before creating the wave shape. Note that these are not partial sections of the arc foil. The arc can be of any angle. A 90 degree foil is shown here as an example of a partial disk foil configuration. Also, the wave can be on the ID and/or the OD of the semi-circular wave foil.

Figure 63:
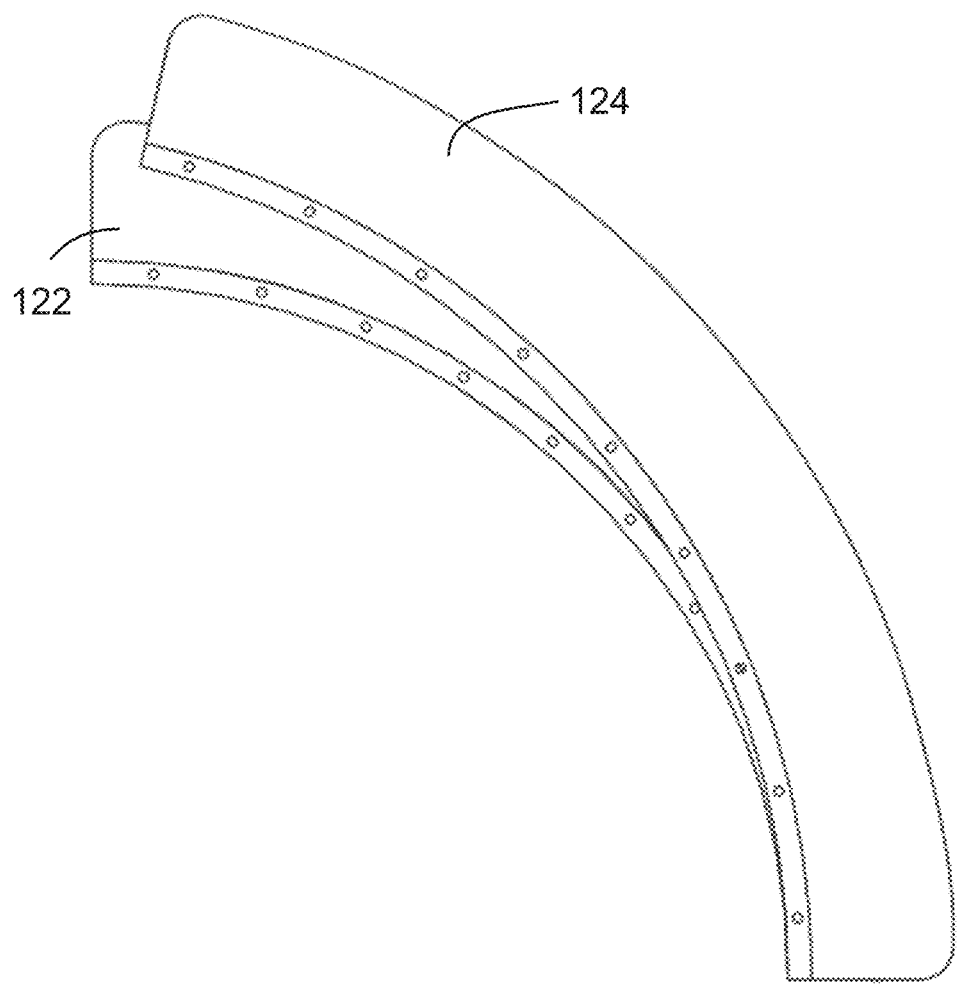
FIG. 63 is a top view of a buckled 90 degree arc foil superimposed on an at-rest arc foil.
Figure 64:
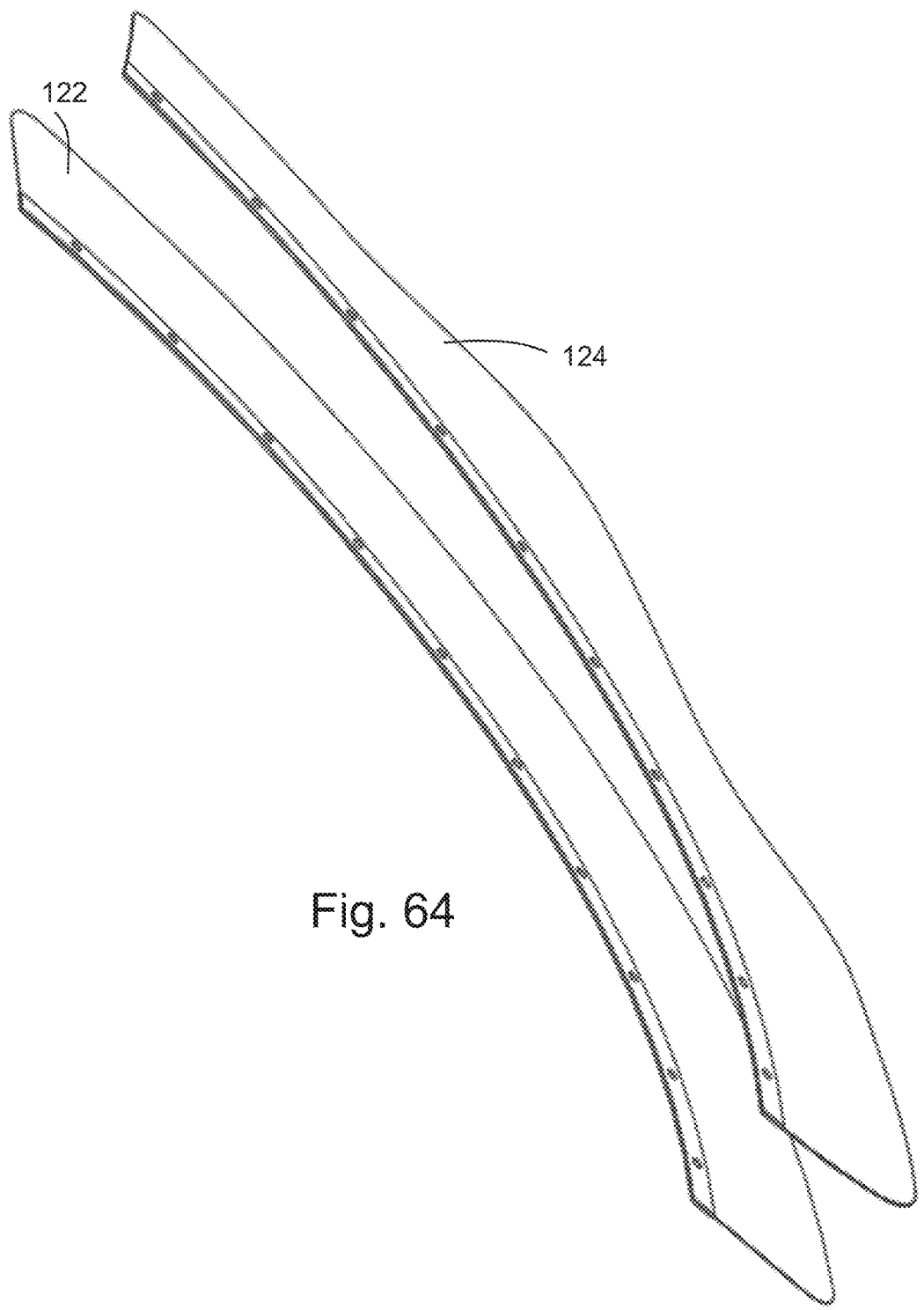
FIG. 64 is a perspective view of the superimposed foils of FIG. 63 showing the wave shape.

The wave is created by slightly straightening the non-wave edge of the foil, as shown in FIG. 63 and FIG. 64 with the wave-formed foil 124 superimposed above the at-rest foil 122.

Figure 65:
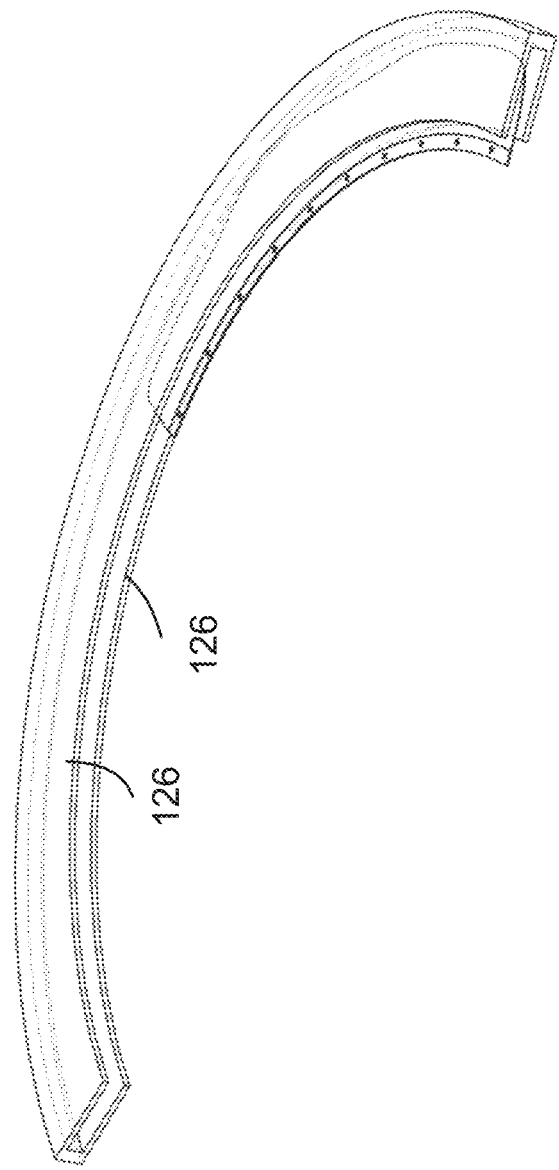
FIG. 65 is a perspective view of an arc foil between two output surfaces.

FIG. 65 shows a simplified incomplete assembly of the above semi-circular wave foil sandwiched between two output surfaces 126. Output surfaces are also preferably an arc shape and can be a complete circle or a semi-circle as shown here.

Figure 66:
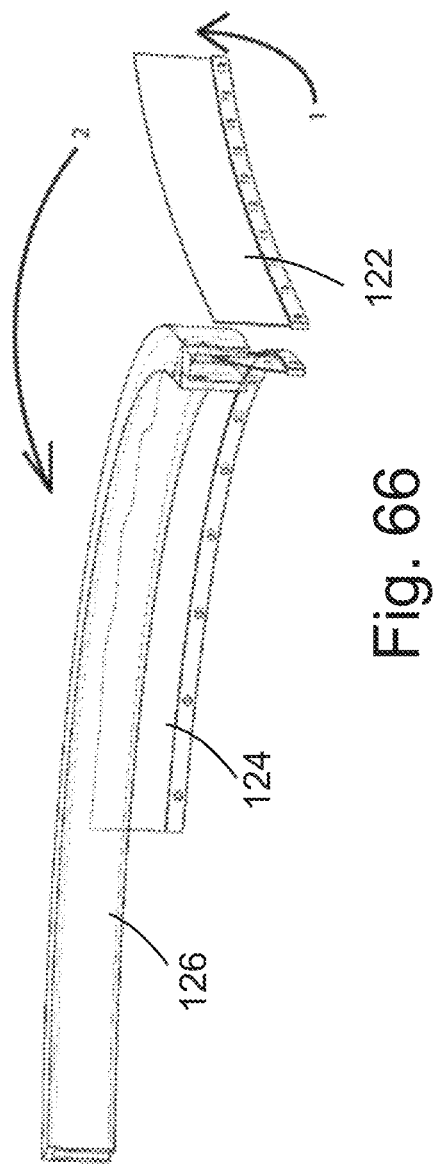
FIG. 66 is a perspective view showing an arc foil at rest on the right and bent on the left.

In the exemplary embodiment shown in FIG. 66, a curved semi-circular wave foil is planar when at rest and then curved in two planes. Straightening it slightly creates the initial wave-form. Curving it at 90 degrees to the first plane (or other angles can work) allows the wave to propagate between to concentric surfaces (cylindrical here, but can also be conical). Shown here is the at-rest foil 122 on the right which is planar with a slight curvature (and a preferably thicker section where it will be fixed when pre-loaded). On the left is the same foil 124 after straitening in direction 1 and bending in an arc in direction 2. The concentric output surfaces are preferably connected to each other and will rotate around the common arc center when the wave is propagated by means described in this disclosure for other wave member embodiments.

It should be noted that one or more of the features and methods which are described for the disk embodiments of the wave disk actuator can apply to the wave foils embodiments. These include but are not limited to:

Wave propagation by electromagnet commutation; and
Wave propagation by active materials such as, but not limited to, electroreactive materials.

Construction techniques which include but are not limited to molding of a material which shrinks when cooled with one or more inserts of a material along the wave edge that has a lower coefficient of thermal expansion.

Commutation of an electromagnet array, for example on or attached to one or both planar surface members, can be used to attract and/or repel the wave disk and/or magnets and/or soft magnetic portions of or inserts on the wave disk axially to hold or move the apex of one or more waves. If a geared interface is used, a wave apex will move promotionally to the rotation angle of the wave disk to a planar surface member. If the contact between the wave and the planar surface is a friction or traction interface, the wave propagation angle and wave disk rotation relative to a planar surface member will be variable. In both cases, sensors can be used to determine the angular position of a wave apex and the electromagnets. An axial force on the wave disk ahead of a wave apex will pull the wave apex in that direction. A repelling force on the wave disk behind of a wave apex will commutate the wave in the same direction as an attracting force ahead of the wave.

Figures 67, 68:
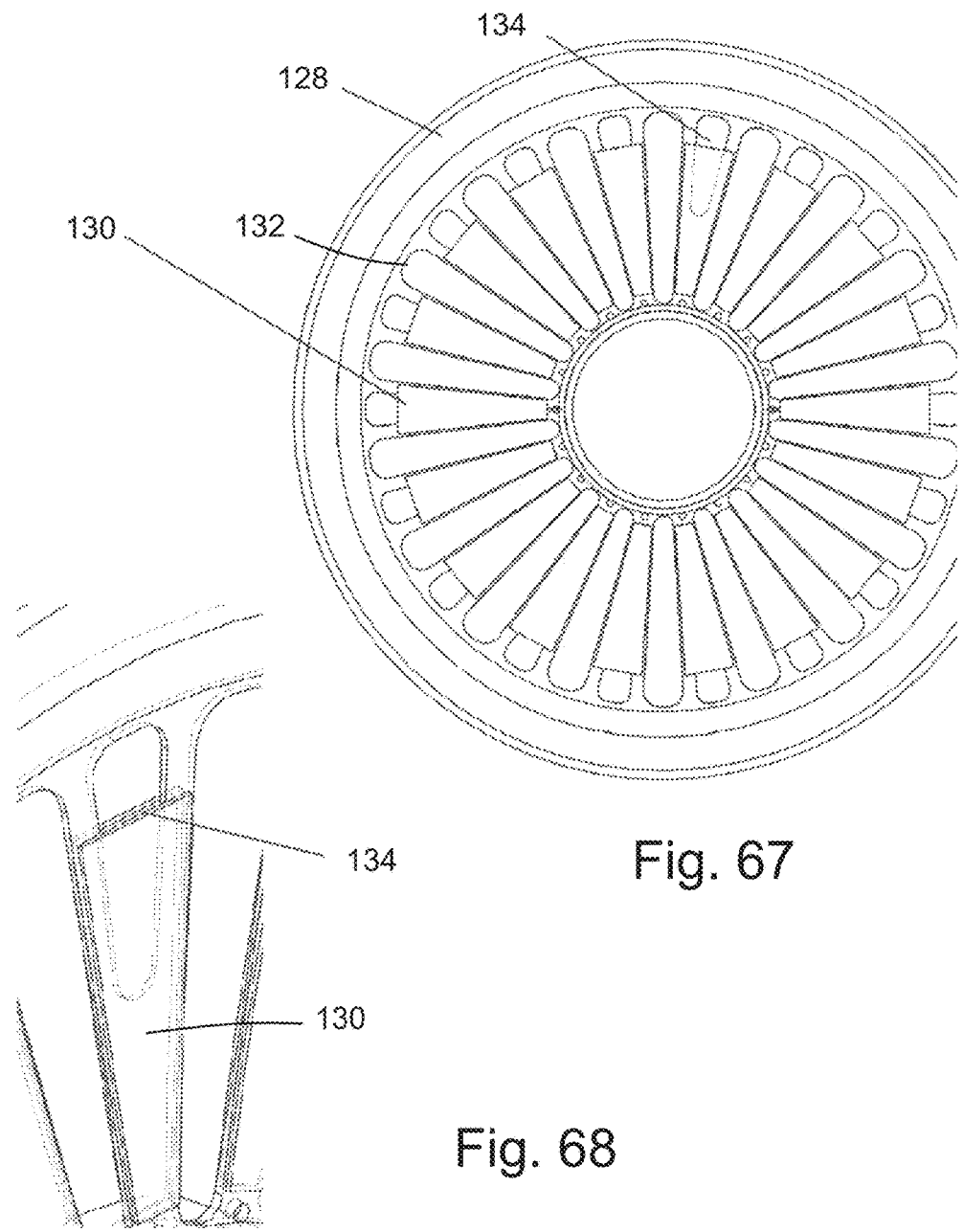
FIG. 67 is an axial view of a wave disk embodiment.
FIG. 68 is a detail view of a cutout along the centerline of a set of opposing actuators of the wave disk of FIG. 67.

A non-limiting exemplary embodiment of a wave disk 128 according to the present disclosure is shown in FIG. 67 with a preferred construction. It uses piezo or other bimorph actuators 130 adhered to preferably both side of the inner disk area. Radial cut-outs 132 are arranged such that circumferential flexibility of the inner wave disk area is increased. An array of bimorph actuators are attached to the wave disk surface/s so that radial contraction of an actuator causes deformation of the disk axially toward that actuator. In order to reduce the circumferential deformation and stress on an actuator, a radial cutout 134 in the inner disk area is located within the circumferential width of an actuator for all or preferably at least the outward end of an actuator. This allows the outermost ends of the spokes to which said actuator is attached to, to act as a flexure to reduce the circumferential deformation of the inner wave disk from causing as much circumferential deformation and stress on said actuator during wave propagation. FIG. 68 shows a detail view of a radial cutout 134 located within the circumferential width of an actuator.

Figure 69:
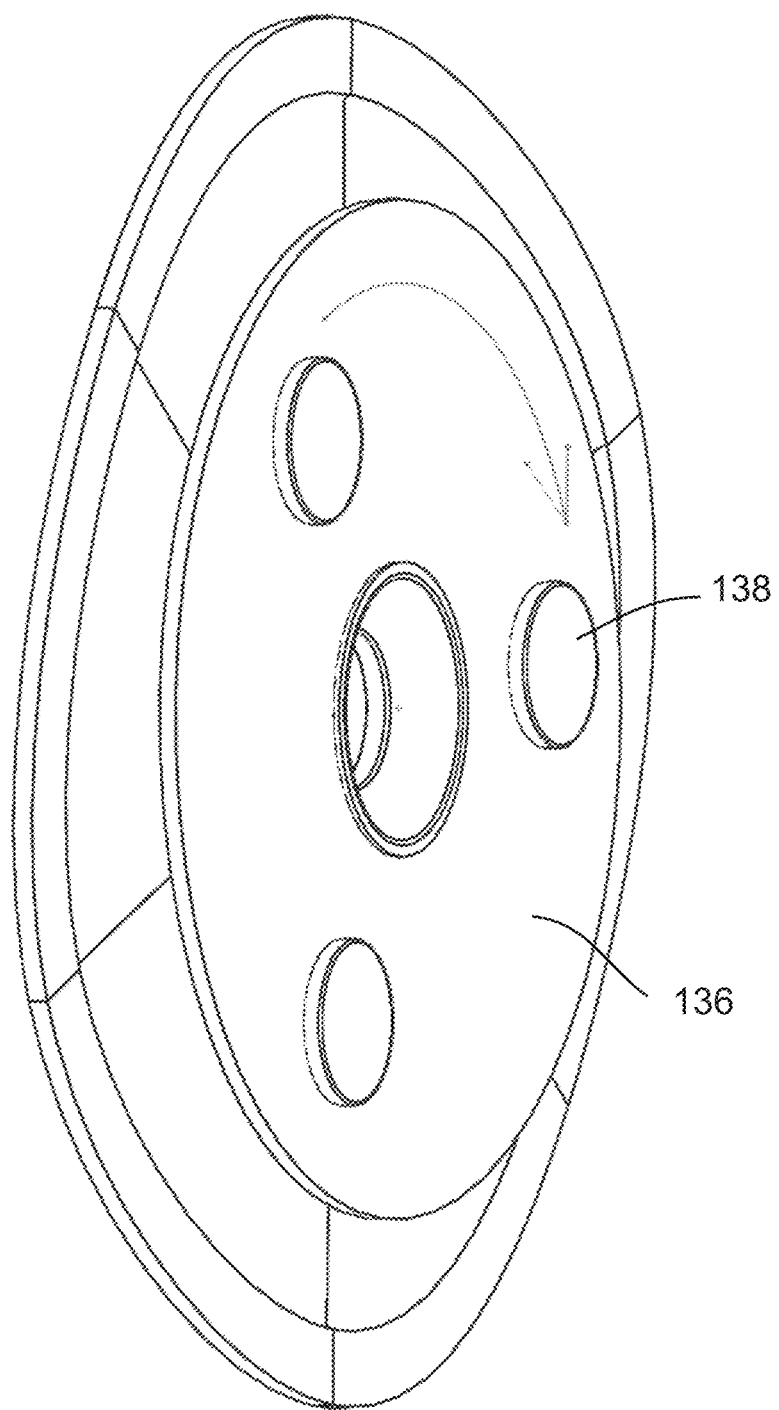
FIG. 69 is a perspective view of a simplified partial assembly of a rotating non-contacting permanent magnet wave propagation configuration.

FIG. 69 shows a simplified partial assembly of an exemplary embodiment of a rotating input configuration for a wave disk. It has a rotating member 136 that houses permanent magnets 138 that rotate with it and pull a wave along.

Figure 70:
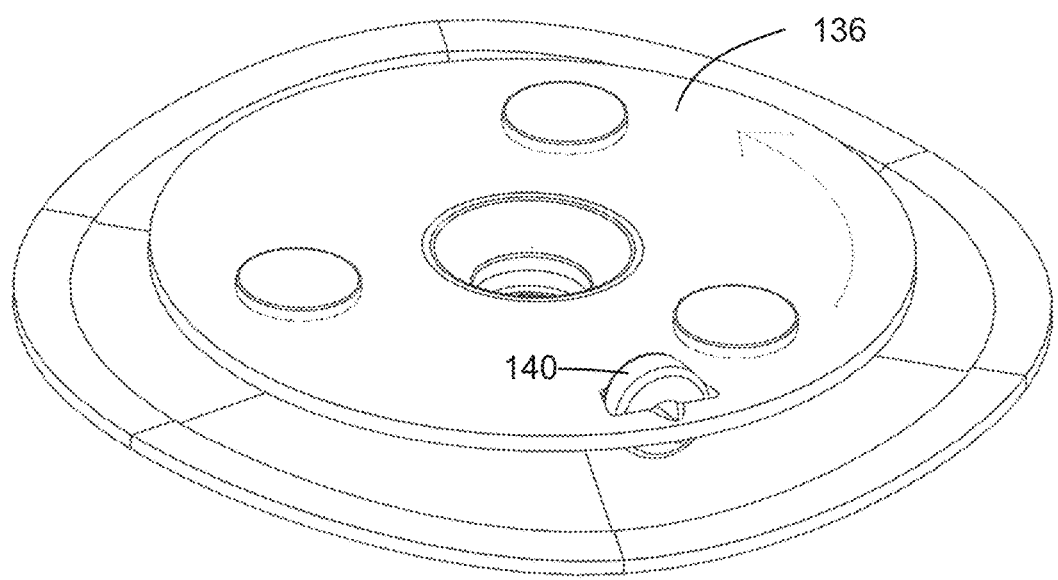
FIG. 70 is a perspective view of a spinning input member with non-contacting permanent magnets and a contacting rolling wave propagation member.

FIG. 70 shows an example of a spinning input member with a contacting rolling wave propagation member. Wheel 140 in rotating member 136 contacts the wave disk to propagate the wave.

Axial Lobes

FIGS. 71 and 72 show a detailed view of a partial assembly of a non-limiting exemplary embodiment of an axially lobed wave disk 142. Both output rings 144 in this example are at a fixed axial distance from each other and connected for simultaneous rotation around the actuator center axis. The output members are preferably axially preloaded toward each other with the wave disk sandwiched between them. This conforms the wave disk lobe tips to the planar (or conical) lobe roots on the output rings for preferably three or more lobe tips per engagement (although more or less than three teeth may have benefit under some conditions).

The benefit of three or more lobe tips in engagement is a smoother transfer of each lobe tip from non-contacting to contacting as the disk axially "flattens" against the output rings.

Another beneficial effect of this flattening is the increased elastic deformation of the disk just before contact (at a smaller radius of curvature circumferential wave section). This has the effect of splaying the lobe tips to increase the circumferential distance between the disk lobe tips just before engagement. The lobes are longer in the axial direction than a conventional involute tooth profile would be. The exact length needs to be determined by analysis and/or testing for each application, but the inventor has found that an aspect ratio of lobe axial length to width of somewhere between 2:1 and 6:1 can provide the desired results, although aspect ratios smaller or greater may also work in certain applications.

The result of the elongated lobes and lobe tip splaying is a delaying of the disk lobe tip contact with the output ring lobe roots until the disk lobe tips are closer to the bottom of the output ring lobe roots. The benefit of this is reduced sliding of the disk lobe tips and the output ring lobe roots. Less sliding results in reduced friction, reduced wear, and the possibility of operation without lubrication in certain applications.

As shown in FIG. 71, the contact area (as indicated by reference numeral 146) of the disk conforms to the output ring because of axial preload of the ring on the disk. The smallest/tightest curvature of the disk due to axial displacement happens just before engagement of disk with ring, as indicated by reference numeral 148. This causes axially elongated disk lobes to splay circumferentially, delaying contact of disk lobe tips with ring lobe roots until disk lobe tips are more fully engaged in ring lobe roots.

FIG. 72 is a detail view of the embodiment of FIG. 71 showing playing of lobe tips to prevent disk lobe tip contact with ring lobe until disk lobe tips are preferably at ring lobe roots. As shown in FIG. 72, disk lobes are axially elongated to produce a splaying effect in the circumferential direction, indicated by the arrow marked with reference number 150, as the wave is propagated. This splaying effect is greatest as the tightest curvature just before disk lobe contact with ring lobe roots. The result is a delay of contact at the locations marked by reference numeral 152 until the disk conforms to the ring in the contact zone where curvature is reduced and lobe tips transmit torque with reduced sliding at locations marked by reference numeral 154. Lobes are preferably not contacting at locations marked with reference number 156. Lobes on one output member (h1) may be longer than the lobes on the opposed output member (h2), for example by 10%. The teeth or lobes on one axial side of the wave disk may be axially longer than the teeth on the other axial side of the wave disk as shown in FIG. 71. The longer teeth may be of the same number as the other teeth but of a different circumferential pitch, or they may be of the same circumferential pitch as the other teeth but of a different number. Other variations of tooth pitches and numbers are possible, the objective for a differential output configuration being that the ratio of movement between the wave disk and one output member is slightly different than the ratio of movement between the wave disk and the other output member during wave propagation.

The disk may be made of a metallic material such as nitinol with a non-metal contact surface such as a polymer on one or more of the contact surfaces between the disk and output or reference members. This provides for reduced noise and/or increased traction. For example, aluminum on nylon is a unique combination that can provide high friction without galling the aluminum. Many other combinations of materials can be used. A high durometer urethane is another material that can provide high traction, resilience and low hysteresis for low rolling resistance. If a resilient material is used, the wave disk contact surface can have a non-smooth finish to increase traction.

The disk may be made of an injection molded part of a material having a first coefficient of thermal expansion (CTE) but with an imbedded ring near the OD of the disk with a lower coefficient of thermal expansion (CTE). As the injection molded disk cools (preferably in the mold), the radially inward tension created as the injection molded material cools will create a circumferential compression load on the lower CTE ring which is sufficient at the operating temperature of the actuator to cause and maintain a circumferentially buckled waveform.

In a method of manufacturing, the creation of waves in the disk may be done by greater axial plastic compressive deformation of the outer ring. This circumferentially elongates the outer ring to the point of causing it to circumferentially buckle. Axial plastic compression deformation of the entire outer ring can be done at once with a single or multiple compression procedures (such as forging), or it can be done by roll forming the outer ring with one or more sets of rollers which progressively circumferentially lengthen the outer wave ring. The disc may also be made by roll forming.

Figure 73:
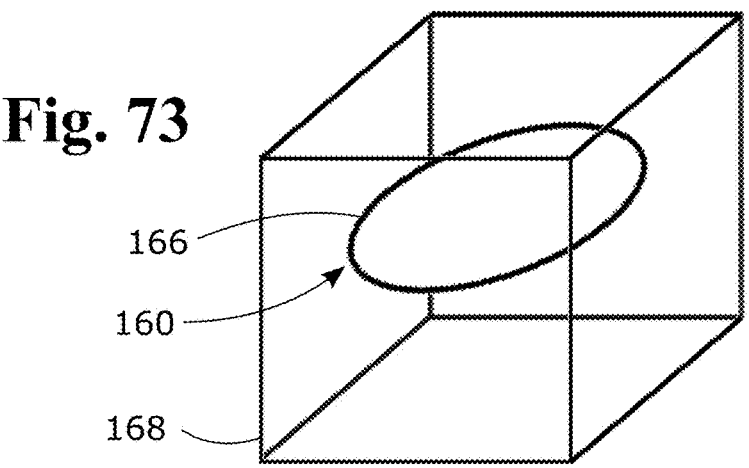
FIGS. 73-75 show steps in a method of manufacture of a wave actuator.
Figure 74:
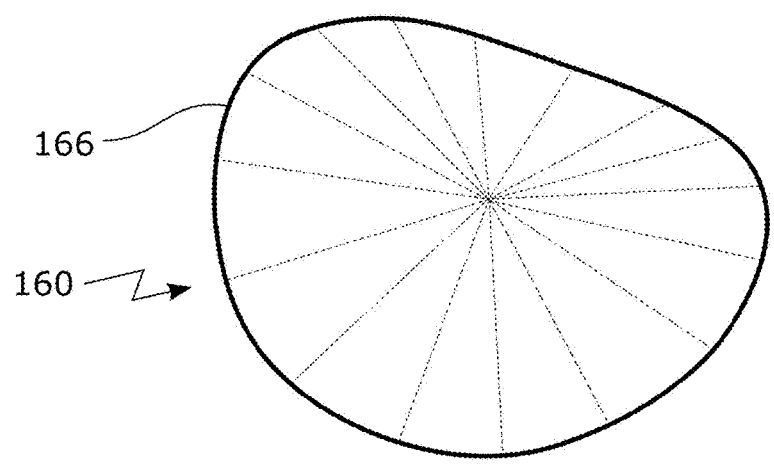
Figure 75:
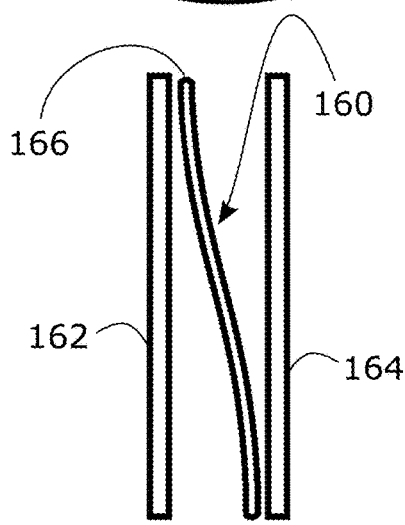

Referring to FIGS. 73-75, a method of manufacture of a wave actuator is shown. A disk 160 is provided with a circumference, the disk being in an initial state, typically flat. The disk is loaded in tension across the disk and compression along the circumference to cause the disk to buckle and form a wave shape with waves, as shown in FIG. 74. The disk 160 is constrained between output members 162, 164 with the output members contacting the disk at one or more wave apexes such that force can be transferred from the disk to the output members when a wave is propagated along the disk. The output members exert enough force on the disk member to increase the number of waves from the initial state when the wave circumference is loaded in compression and before contacting the output members. The disk and output members may be provided with teeth and meshing respective teeth of the disk and output members. Loading the disk in tension across the disk and compression along the circumference may comprise providing the disk with a ring 166, and the disk 160 and ring 166 being made of materials of different coefficients of thermal expansion, and subjecting the disk to a temperature set to cause the disk and ring to expand or contract differentially.

Figure 76:
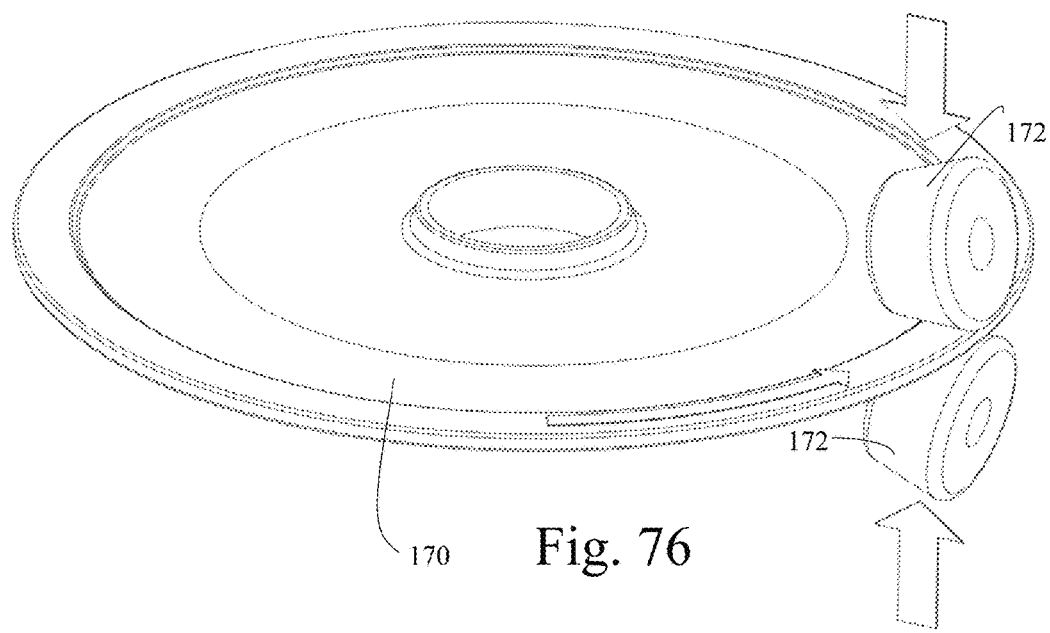
FIG. 76 shows a schematic of a roll forming manufacturing method.

FIG. 76 shows a schematic of a roll forming manufacturing method. A rotationally symmetrical disk 170 is fabricated and then spun around its axis while increasing axial force is applied through the rollers 172. The contact force of the rollers 172 is sufficient to exceed the plastic deformation limit of the ring. This circumferentially lengthens the ring to the point where the lowest energy state is a circumferentially buckled wave.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The invention claimed is:

1. A wave actuator comprising:
 a two dimensional structure having at least a portion in compression in a first direction of the two dimensional structure to form a wave shape having waves along the first direction;

an output arranged in contact with the waves of the wave shape, the output and the two-dimensional structure movably arranged in relation to one another; and a wave propagator arranged to propagate the waves along the first direction to move the output relative to the two dimensional structure, in which the two dimensional structure is loaded by a tension member in a second direction or set of directions across the two dimensional structure different from the first direction to compress the two dimensional structure in the first direction.

2. The wave actuator of claim 1 in which the output comprises a first output member and a second output member, the wave shape being constrained between the first output member and the second output member.

3. The wave actuator of claim 2 in which the first output member is rigidly connected to the second output member.

4. The wave actuator of claim 2 in which the wave shape comprises a first contact surface that contacts the first output member and a second contact surface that contacts the second output member, one of the contact surfaces being offset in a direction generally perpendicular to the two-dimensional structure to cause the wave actuator to differentially move the first output member and the second output member.

5. The wave actuator of claim 4 further comprising a slot in the one of the contact surface that is offset in the direction generally perpendicular to the two-dimensional structure.

6. The wave actuator of claim 1 in which the wave propagator comprises piezo actuators attached to the two dimensional structure and aligned within the two dimensional structure generally perpendicular to the first direction.

7. The wave actuator of claim 1 in which the wave propagator comprises electromagnets.

8. The wave actuator of claim 1 in which the output is in friction contact with the waves of the wave shape.

9. The wave actuator of claim 1 in which the output is in geared contact with the waves of the wave shape.

10. The wave actuator of claim 1 further comprising a reference member, the wave shape being constrained between the output and the reference member.

11. The wave actuator of claim 2 in which the wave shape is compressed between the output members to create two or more contact patches on the first output member and an equal number of contact patches on the second output member.

12. The wave actuator of claim 11 in which the first output member and the second output member compress the wave shape with sufficient contact pressure to create flattened portions of the two dimensional structure where the two dimensional structure contacts the first output member and the second output member.

13. The wave actuator of claim 1 further comprising grooves extending generally in the first direction in each of the two dimensional structure and the output.

14. The wave actuator of claim 13 in which the grooves have angled shapes to increase contact pressure as a result of loading of the two dimensional structure against the output.

15. The wave actuator of claim 1 in which the two dimensional structure comprises a first material having a first coefficient of thermal expansion, and a second material having a second coefficient of thermal expansion, the first coefficient of thermal expansion being different from the second coefficient of thermal expansion.

16. The wave actuator of claim 1 in which the two dimensional structure is a belt.

17. The wave actuator of claim 16 in which an edge portion along an edge of the belt is in compression by a tension member applying a compressive force parallel to the edge to a portion of the belt parallel to but offset from the edge.

18. The wave actuator of claim 1 in which the two dimension structure comprises an arc and the portion in compression is an edge portion at an outer edge of the arc, the edge portion in compression tangentially to the edge.

* * * * *